(12) United States Patent
Suenaga et al.

(10) Patent No.: US 8,492,687 B2
(45) Date of Patent: *Jul. 23, 2013

(54) POWER CONTROL APPARATUS FOR HIGH-FREQUENCY DIELECTRIC HEATING AND POWER CONTROL METHOD FOR THE SAME

(75) Inventors: Haruo Suenaga, Osaka (JP); Kenji Yasui, Nara (JP); Shinichi Sakai, Nara (JP); Nobuo Shirokawa, Nara (JP); Hideaki Moriya, Nara (JP); Manabu Kinoshita, Nara (JP)

(73) Assignee: Panasonic Corporation, Osaka (JP)

( * ) Notice: Subject to any disclaimer, the term of this patent is extended or adjusted under 35 U.S.C. 154(b) by 538 days.

This patent is subject to a terminal disclaimer.

(21) Appl. No.: 12/620,824

(22) Filed: Nov. 18, 2009

(65) Prior Publication Data

US 2010/0065553 A1 Mar. 18, 2010

Related U.S. Application Data

(62) Division of application No. 12/094,257, filed as application No. PCT/JP2006/323344 on Nov. 22, 2006.

(30) Foreign Application Priority Data

| Nov. 25, 2005 | (JP) | 2005-340555 |
| Nov. 25, 2005 | (JP) | 2005-340556 |
| Nov. 25, 2005 | (JP) | 2005-340557 |
| Nov. 25, 2005 | (JP) | 2005-340558 |

(51) Int. Cl.
*H05B 6/66* (2006.01)
*H05B 6/68* (2006.01)

(52) U.S. Cl.
USPC .......................... 219/702; 219/715; 219/716

(58) Field of Classification Search
USPC ................. 219/702, 715, 716, 717, 718, 719, 219/721, 761, 660, 600, 626, 627, 661, 678; 315/39.51, 224, 247, 283; 331/185, 186; 363/16, 49, 74, 17, 98; 323/319, 235, 236
See application file for complete search history.

(56) References Cited

U.S. PATENT DOCUMENTS

2004/0074900 A1 4/2004 Suenaga et al.
2007/0195561 A1 8/2007 Suenaga et al.

(Continued)

FOREIGN PATENT DOCUMENTS

EP 0 318 645 A1 6/1989
EP 0 489 725 A2 6/1992

(Continued)

OTHER PUBLICATIONS

European Search Report dated Mar. 18, 2010 for European Patent Application No. 09177066.9-2214.

(Continued)

*Primary Examiner* — Quang Van
*Assistant Examiner* — Hung D Nguyen
(74) *Attorney, Agent, or Firm* — Pearne & Gordon LLP

(57) ABSTRACT

A power control unit for high-frequency dielectric heating is provided, and includes an input current detection section for detecting input current from the AC power supply to the inverter circuit and outputting input current waveform information. A conversion section converts the input current waveform information into a drive signal of the switching transistor of the inverter circuit so that instantaneous fluctuation of the input current waveform information is suppressed. A mix circuit mixes the input current waveform information and power control information for controlling so that current or voltage at an arbitrary point of the inverter circuit becomes a predetermined value and generates an on voltage signal. The conversion section converts the on voltage signal into the drive signal so that the on time is shortened in the portion where the input current is large and that the on time is prolonged in the portion where the input current is small.

11 Claims, 33 Drawing Sheets

U.S. PATENT DOCUMENTS

| | | |
|---|---|---|
| 2009/0289056 A1 | 11/2009 | Suenaga et al. |
| 2010/0065553 A1 | 3/2010 | Suenaga et al. |
| 2010/0065554 A1 | 3/2010 | Suenaga et al. |

FOREIGN PATENT DOCUMENTS

| | | | |
|---|---|---|---|
| JP | 07-176375 | | 7/1995 |
| JP | 08-227790 | A | 9/1996 |
| JP | 2000-243548 | A | 9/2000 |
| JP | 2001-196159 | | 7/2001 |
| JP | 2002-270360 | | 9/2002 |
| JP | 2003-257613 | A | 9/2003 |
| JP | 2003-308960 | A | 10/2003 |
| JP | 2004-030981 | | 1/2004 |
| JP | 2004-319134 | A * | 11/2004 |
| JP | 2005-044670 | | 2/2005 |
| JP | 2006-286523 | | 10/2006 |
| JP | 2007-149444 | A | 6/2007 |
| JP | 2007-149446 | A | 6/2007 |
| WO | 2004/093498 | A1 | 10/2004 |
| WO | 2005/099309 | A1 | 10/2005 |

OTHER PUBLICATIONS

European Search Report dated Mar. 18, 2010 for European Patent Application No. 09177069.3-2241.

European Search Report dated Mar. 18, 2010 for European Patent Application No. 06833166.9-2214.

International Search Report for PCT/JP2006/323344; Feb. 5, 2007.

* cited by examiner

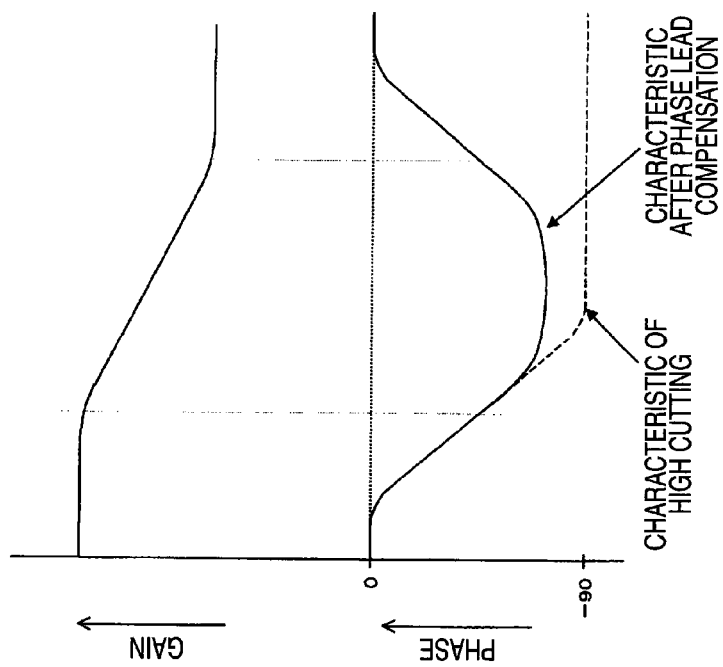
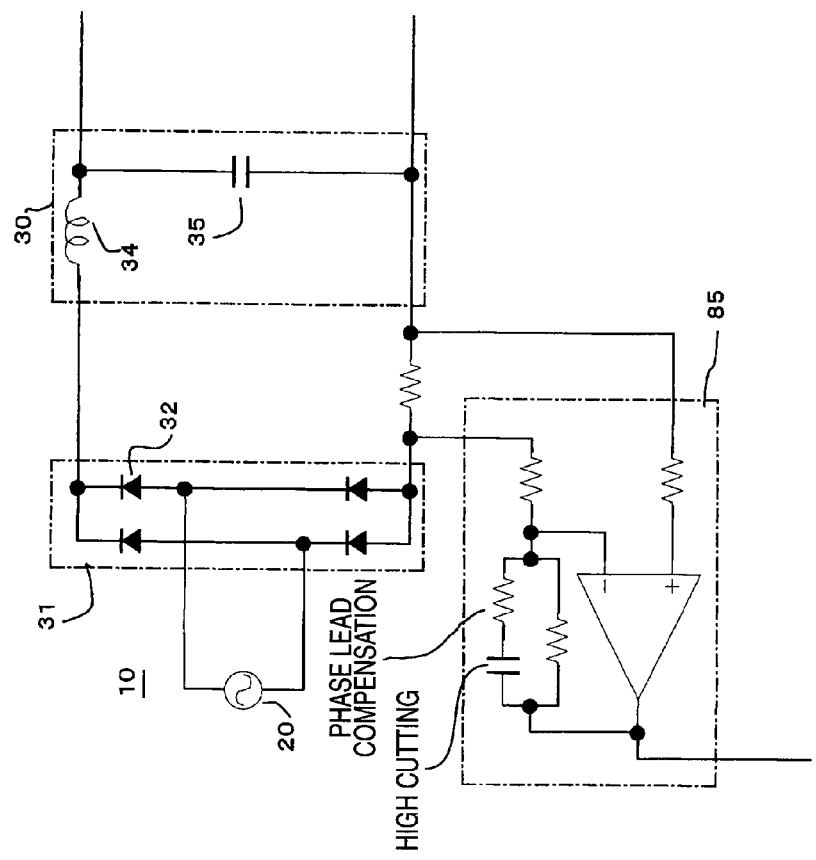

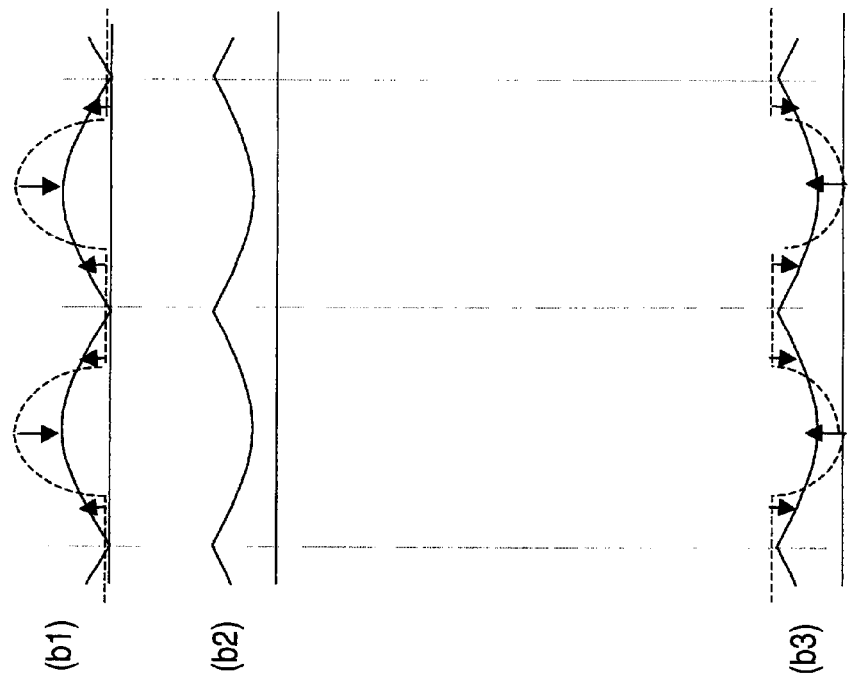
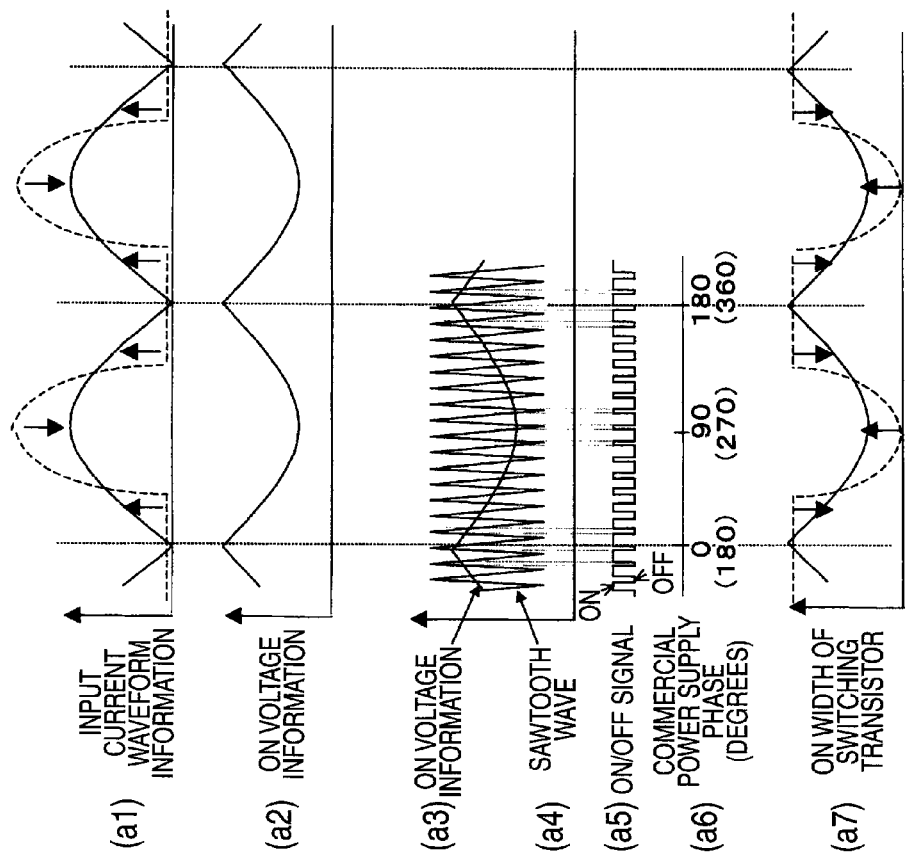
FIG. 5(a)
FIG. 5(b)

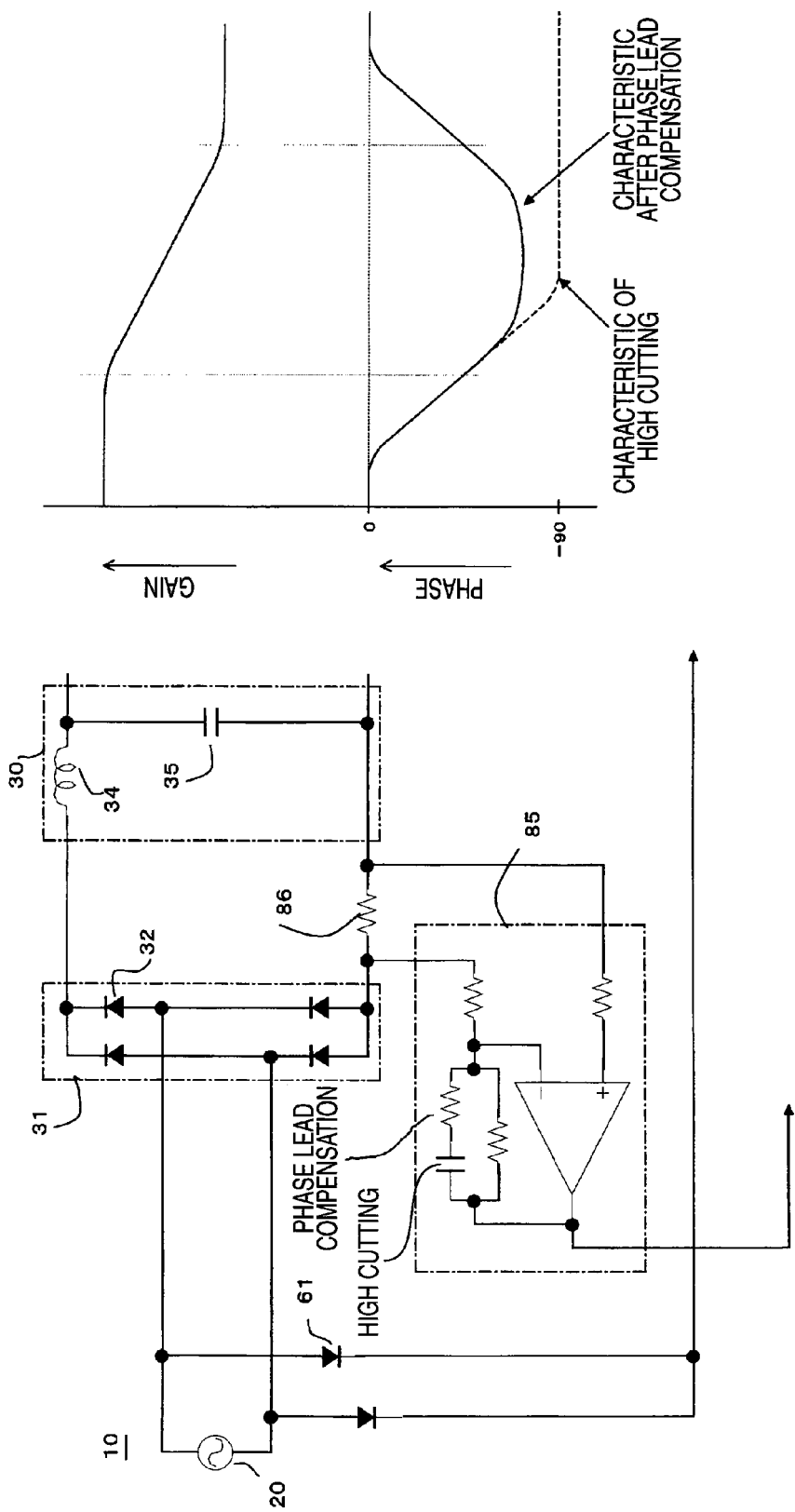

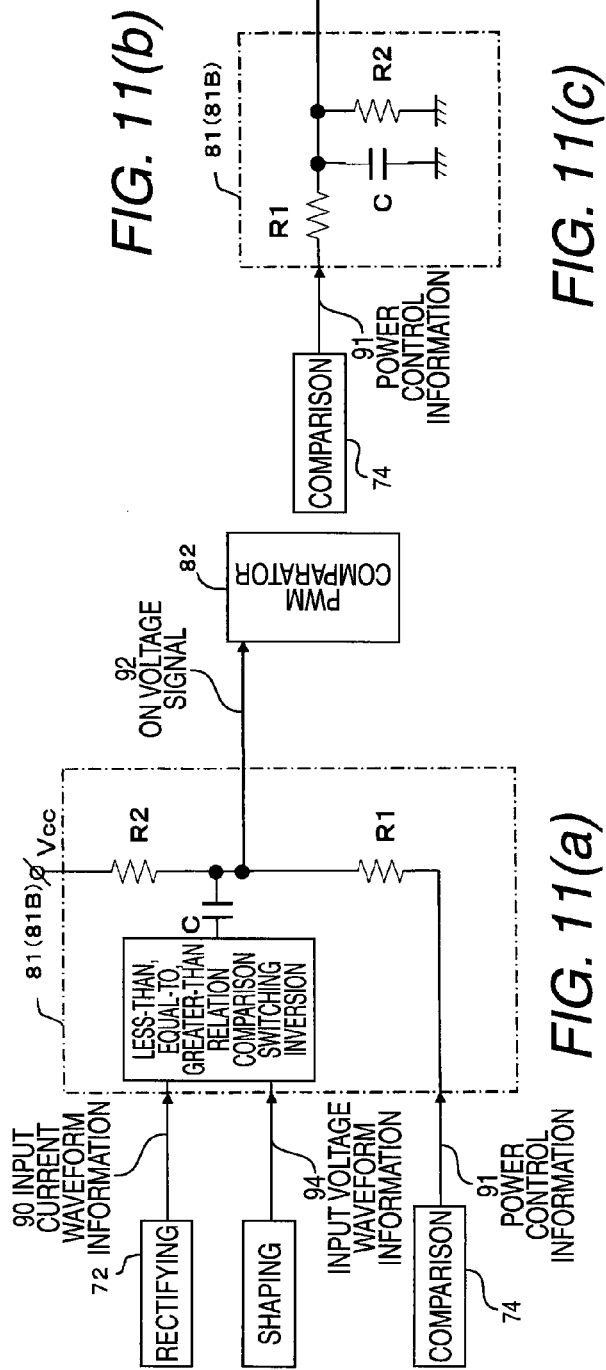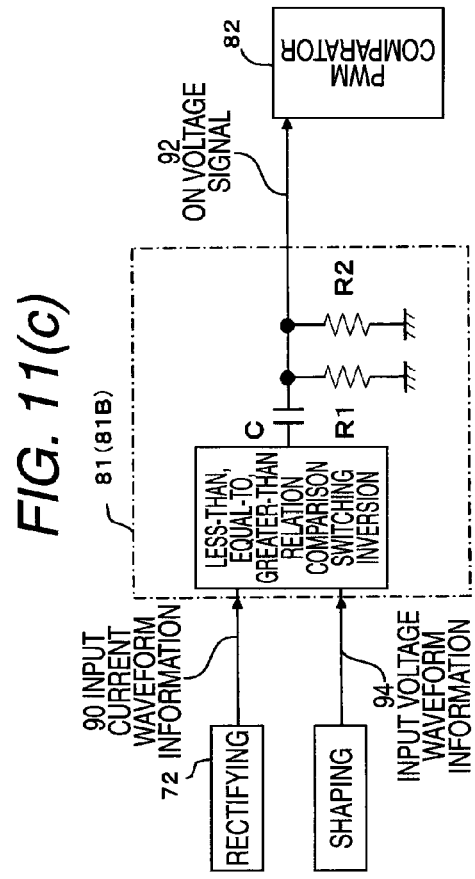
FIG. 11(a), FIG. 11(b), FIG. 11(c)

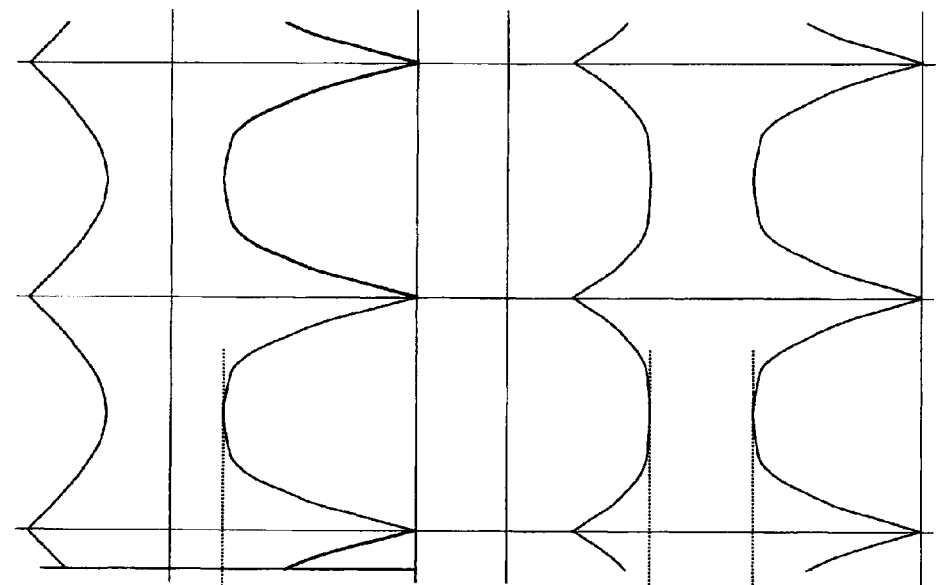
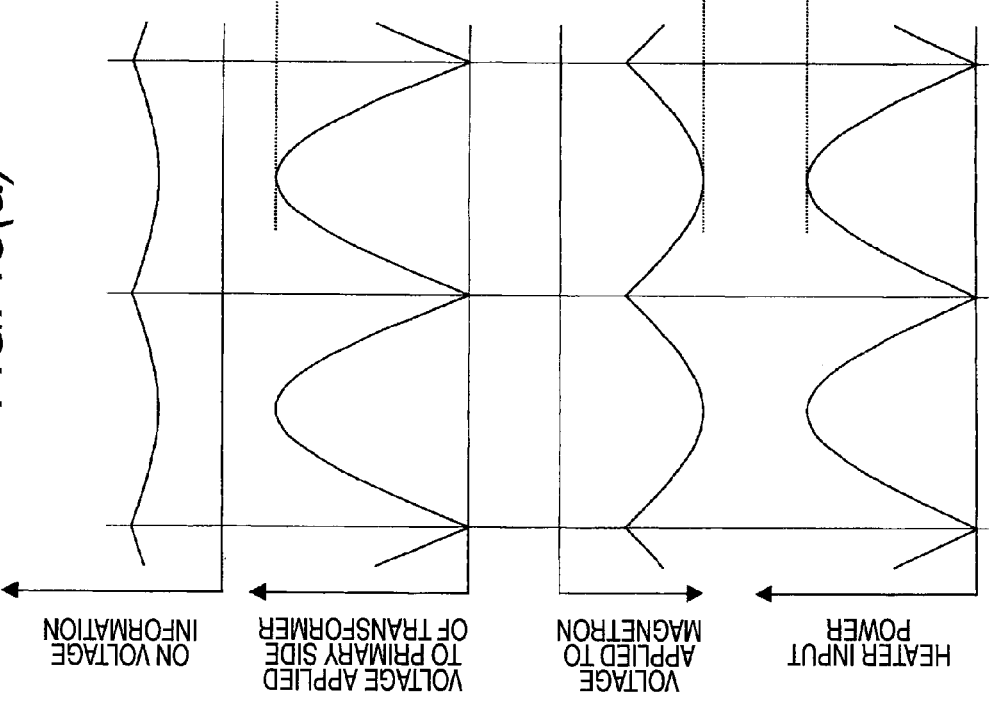

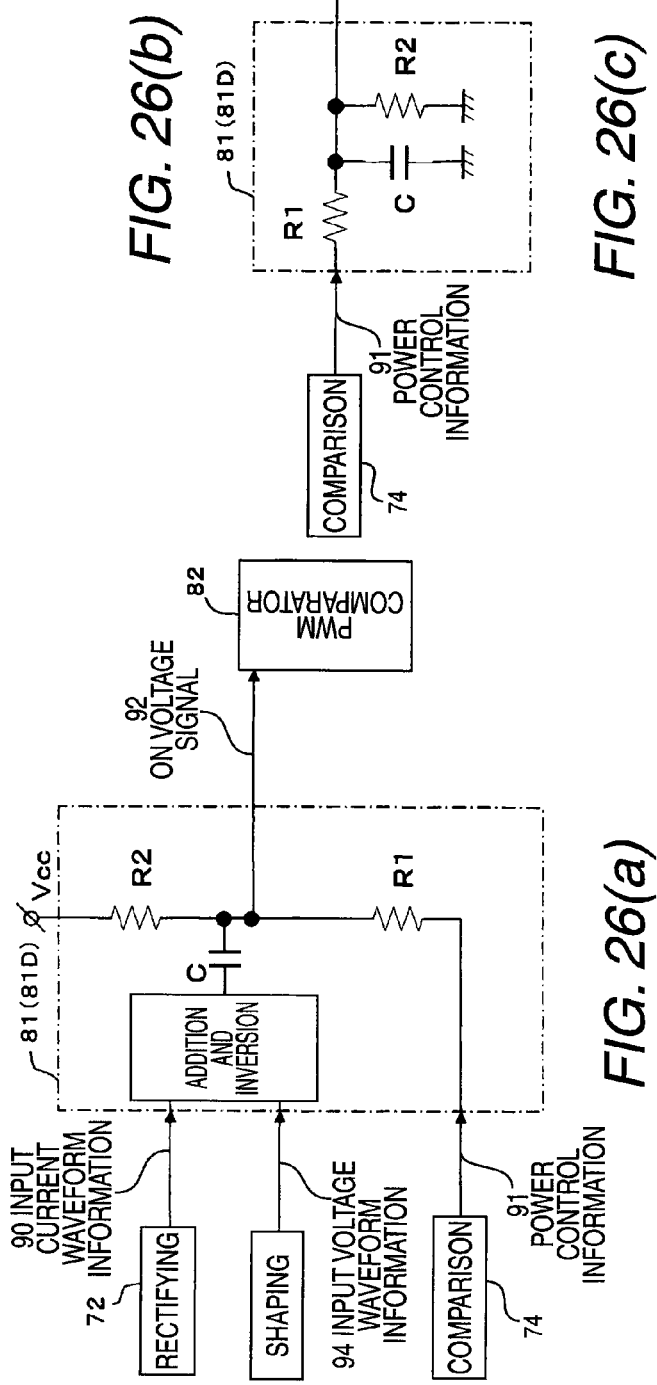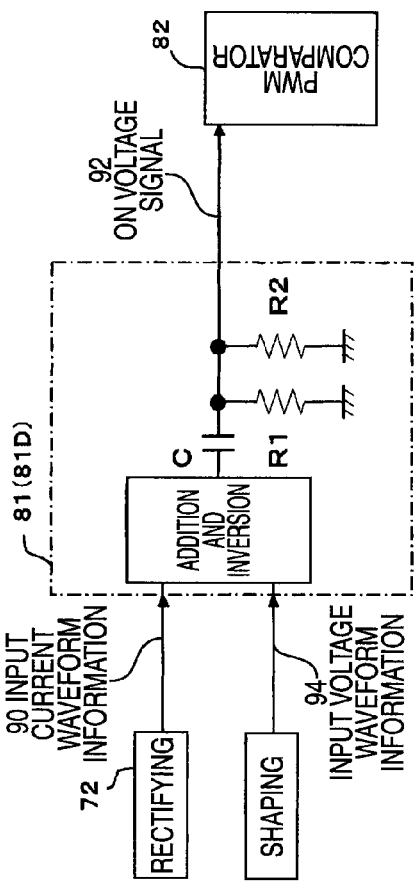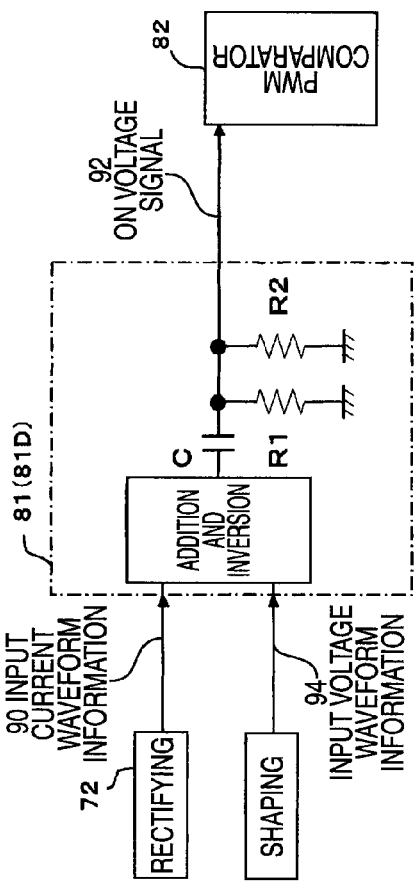

POWER CONTROL APPARATUS FOR HIGH-FREQUENCY DIELECTRIC HEATING AND POWER CONTROL METHOD FOR THE SAME

This application is a divisional of U.S. patent application Ser. No. 12/094,257 filed May 19, 2008, which is incorporated herein by reference in its entirety.

TECHNICAL FIELD

This invention relates to a power control for high-frequency dielectric heating using a magnetron such as a microwave oven and in particular to high-frequency dielectric heating not affected by variations or types of characteristics of magnetrons or the difference in the temperatures, etc., of anodes of magnetrons.

BACKGROUND ART

A known high-frequency heating unit in a related art adjusts power supplied to a magnetron according to the width of the output pulse from an inverter control circuit. As the output voltage of signal superposition means becomes higher, the output pulse width of the inverter control circuit widens and the power supplied to the magnetron increases. This configuration makes it possible to change the output voltage of the signal superposition means for continuously changing the heating output of the magnetron.

Since a heater also serves as a cathode of the magnetron, a transformer for supplying power to the magnetron also supplies power to the heater and thus the power supplied to the heater also changes in response to change in the power supplied to the magnetron. Thus, if an attempt is made to maintain the heater temperature in an appropriate range, the heating output can be changed only in a slight range and it is impossible to continuously change the heating output; this is a problem.

As a high-frequency heating unit to solve this problem, a control system disclosed in the patent document 1 is available. FIG. 30 is a diagram to describe a high-frequency heating unit for executing the control system. In FIG. 30, the heating control system includes a magnetron 701; a transformer 703 for supplying power to a heater 715 of the magnetron 701 at the same time as supplying high-voltage power to a high-voltage rectifying circuit 702 for supplying secondary winding power to the magnetron 701; an inverter circuit 705 for rectifying an AC power supply 704, converting it into predetermined-frequency AC, and supplying the AC to the transformer 703; power detection means 706 for detecting input power to or output power from the inverter circuit 705; an output setting section 707 for outputting an output setting signal corresponding to any desired heating output setting; a power regulation section 708 for making a comparison between the output of the power detection means 706 and the output setting signal and controlling the DC level of a power regulation signal so as to provide any desired heating output; oscillation detection means 719 for outputting an oscillation detection signal which makes a LOW to HIGH transition if the output of the power detection means 706 becomes equal to or larger than an output level of reference voltage generation means 718; a comparison voltage generation circuit 716 for generating a voltage corresponding to the output setting signal, a waveform shaping signal comparing the output setting signal by a level conversion circuit 720; a waveform shaping circuit 721 for shaping output of a rectifying circuit 710 for rectifying the AC power supply voltage 704 based on the waveform shaping signal and the oscillation detection signal; a comparison circuit 711 for comparing an output signal of the waveform shaping circuit 721 with output of the comparison voltage generation circuit 716 and outputting a comparison reference voltage when the former is smaller than the latter or executing inverting amplification when the former is larger than the latter; signal superposition means 712 for superposing a fluctuation signal of output of the comparison circuit 711 on the power regulation signal and outputting a pulse width control signal; an oscillation circuit 713, and an inverter control circuit 714 for executing pulse width modulation of output of the oscillation circuit 713 by the pulse width control signal and driving the inverter circuit 5 according to the modulation output.

The high-frequency heating unit regulates the power supplied to the magnetron 701 based on the output pulse width of the inverter control circuit 714. As the output voltage of the signal superposition means 712 becomes higher, the output pulse width of the inverter control circuit 714 widens and the power supplied to the magnetron 701 increases. In the unit, the output voltage of the signal superposition means 712 is changed continuously, whereby it is made possible to continuously change the heating output of the magnetron 701.

According to the configuration, shaping is performed in response to the output setting by the waveform shaping circuit 721 for inputting the rectification voltage of the AC power supply 704 and outputting to the comparison circuit 711. Inverting amplification of the output of the waveform shaping circuit 721 is performed by the comparison circuit 711 having the comparison voltage generation circuit 716 for generating a reference signal at the level corresponding to the heating output setting signal as a reference voltage and the inverting amplification signal and the output of the power regulation section 708 are superposed on each other, whereby as for the pulse width control signal output by the signal superposition means 712, the level in the vicinity of the maximum amplitude of the AC power supply 704 becomes lower and the level in the magnetron non-oscillation portion becomes higher at the low output time as compared with the time when the heating output setting is high output and thus the oscillation period per power supply cycle of the magnetron is prolonged. Accordingly, the power supplied to the heater increases. Further, at the high output time, the input current waveform of the inverter becomes a waveform which is upward convex in the envelope peak vicinity and is close to the shaped waveform of a sine wave, and harmonic current is suppressed.

Thus, the pulse width control signal is controlled so that the heater current is much entered at the low output time and power supply current harmonic lessens at the high output time by the waveform shaping circuit 721, whereby the power supply current harmonic can be kept low, change in the heater current can be made small, and a highly reliable high-frequency heating unit can be realized.

However, in the control, it turned out that waveform shaping cannot follow up variations or types of characteristics of magnetrons, ebm (anode-cathode voltage) fluctuation caused by the temperature of an anode of a magnetron and the load in a microwave oven, or power supply voltage fluctuation because waveform shaping based on "prospective control system" is executed so that the input current waveform becomes close to a sine wave by performing pulse width modulation using a modulation waveform provided by processing and shaping a commercial power supply waveform for an ON/OFF drive pulse of a switching transistor.

The variations and types of characteristics of magnetrons motivating the invention will be briefly discussed. Since VAK (anode cathode voltage)-Ib characteristic of a magnetron is nonlinear load as shown in FIG. 31, the ON width is modulated in response to the phase of commercial power supply and the input current waveform is brought close to a sine wave for improving the power factor.

The nonlinear characteristic of the magnetron varies depending on the type of magnetron and also fluctuates due to the magnetron temperature and the heated substance (load) in the microwave oven.

FIG. 31 is anode cathode application voltage-anode current characteristic drawings of magnetrons; (a) is a drawing to show the difference depending on the magnetron type; (b) is a drawing to show the difference depending on good and bad of matching of power supply of magnetrons; and (c) is a drawing to show the difference depending on the magnetron temperature. In the drawings, (a) to (c), the vertical axis indicates anode-cathode voltage and the horizontal axis indicates anode current.

Then, referring to (a), A, B, and C are characteristic drawing of three types of magnetrons. For the magnetron A, only a slight current of IA1 or less flows until VAK becomes VAK1 (=ebm). However, if VAK exceeds VAK1, current IA rapidly starts to increase. In this region, IA largely changes with a slight difference of VAK. Next, for the magnetron B, VAK2 (=ebm) is lower than VAK1 and for the magnetron C, VAK3 (=ebm) is further lower than VAK2. Since the nonlinear characteristic of the magnetron thus varies depending on the magnetron type A, B, C, for a modulation waveform matched with a magnetron with low ebm, the input current waveform becomes distorted when a magnetron with high ebm is used. The units in the related arts cannot deal with the problems. Then, producing a high-frequency dielectric heating circuit not affected by the magnetron type is a problem.

Likewise, referring to (b), the characteristic drawing of the three types of magnetrons shows good and bad of heating chamber impedance matching viewed from each magnetron. If the impedance matching is good, VAK1 (=ebm) is the maximum and becomes smaller as worse. Thus, the nonlinear characteristic of the magnetron also varies largely depending on whether the impedance matching is good or bad and therefore producing a high-frequency dielectric heating circuit not affected by the magnetron type is a problem.

Likewise, referring to (c), the characteristic drawing of the three types of magnetrons shows high and low of the temperatures of the magnetrons. If the temperature is low, VAK1 (=ebm) is the maximum and as the temperature becomes gradually higher, ebm becomes lower. Therefore, if the magnetron temperature is matched with a low temperature, when the magnetron temperature becomes high, the input voltage waveform becomes distorted.

Thus, the nonlinear characteristic of the magnetron also varies largely depending on the magnetron temperature difference and therefore producing a high-frequency dielectric heating circuit not affected by the magnetron type is a problem.

Patent document 2 discloses a control system to deal with the problems described above. FIG. 32 is a block diagram to describe a high-frequency heating unit for executing the control system.

In FIG. 32, AC voltage of an AC power supply 220 is rectified by a diode bridge type rectifying circuit 231 made up of four diodes 232 and is converted into a DC voltage through a smoothing circuit 230 made up of an inductor 234 and a capacitor 235. Then, the DC voltage is converted into a high-frequency AC by an inverter circuit made up of a resonance circuit 236 made up of a capacitor 237 and a primary winding 238 of a transformer 241 and a switching transistor 239, and a high-frequency high voltage is induced in a secondary winding 243 of the transformer 241 through the transformer 241.

The high-frequency high voltage induced in the secondary winding 243 is applied between an anode 252 and a cathode 251 of a magnetron 250 through a voltage multiplying rectifier 244 made up of a capacitor 245, a diode 246, a capacitor 247, and a diode 248. The transformer 241 also contains a tertiary winding 242 for heating the heater (cathode) 251 of the magnetron 250. The described circuitry is an inverter circuit 210.

Next, a control circuit 270 for controlling the switching transistor 239 of the inverter will be discussed. First, current detection means 271 of a CT, etc., detects an input current to the inverter circuit, a rectifying circuit 272 rectifies a current signal from the current detection means 271, a smoothing circuit 273 smoothes the signal, and a comparison circuit 274 makes a comparison between the signal and a signal from an output setting section 275 for outputting an output setting signal corresponding to heating output setting. Since the comparison circuit 274 makes a comparison to control the magnitude of power, in place of the above-described input signal, an anode current signal of the magnetron 250, a collector current signal of the switching transistor 239, or the like may be an input signal.

On the other hand, the AC power supply 220 is rectified through a diode 261 and a shaping circuit 262 shapes the waveform. Then, an inversion and waveform processing circuit 263 inverts a signal from the shaping circuit 262 and performs waveform processing. A gain variable amplifier circuit 291 (described later) varies the output signal from the shaping circuit 262 and outputs a reference waveform signal. A waveform error detection circuit 292 outputs a difference between the input current waveform signal from the rectifying circuit 272 and the reference waveform signal from the gain variable amplifier circuit 291 as a waveform error signal. A mix and filter circuit 281 (which will be hereinafter referred to as "mix circuit") mixes and filters the waveform error signal from the waveform error detection circuit 292 and a current error signal from the comparison circuit 274 and outputs an ON voltage signal. A comparison is made between the ON voltage signal and a sawtooth wave from a sawtooth wave generation circuit 283 in the comparator 282 and pulse width modulation is performed for controlling turning on/off of the switching transistor 239 of the inverter circuit.

FIG. 33 shows an example of the mix circuit 281. The mix circuit 281 has three input terminals; an auxiliary modulation signal is applied to a terminal 811, the waveform error signal is applied to a terminal 812, and the current error signal is applied to a terminal 813. The signals are mixed in an internal circuit as shown in the figure. Numeral 810 denotes a high-frequency cut filter having a function of removing a high frequency component of the current error signal whose high frequency component is not required. If a high frequency component exists, when the current error signal is mixed with the waveform error signal, the fluctuation of the waveform error signal is not finely output.

As described above, the variable amplifier circuit 291 automatically creates the waveform reference following the magnitude of the input current, the waveform error detection circuit 292 makes a comparison between the waveform reference and the input current waveform provided by the current detection means 271 and provides waveform error information, and the provided waveform error information is mixed with output of input current control for converting into an on/off drive signal of the switching transistor 239 of the inverter circuit for use.

Thus, a control loop operates so that the input current waveform matches the waveform reference following the magnitude of the input current. Therefore, if there are variations in the types and the characteristics of magnetrons or if there is ebm (anode-cathode voltage) fluctuation caused by the temperature of the anode of the magnetron and the load in the microwave oven or further if there is power supply voltage fluctuation, input current waveform shaping not affected by them is made possible.

Patent document 1: JP-A-7-136375
Patent document 2: JP-A-2004-30981

DISCLOSURE OF THE INVENTION

Problems to be Solved by the Invention

However, in the configuration described in patent document 2, waveform shaping is performed using the auxiliary modulation signal 811 from the inversion and waveform processing circuit 263 as shown in FIG. 32. This is based on the reason that waveform shaping can be well performed by using the auxiliary modulation signal 811 in addition to the waveform error signal 812 reflecting the actually flowing current in waveform shaping. However, the inversion and waveform processing circuit 263 needs to be adopted and further the rectifying circuit 272, etc., becomes necessary and thus the structure becomes complicated and large-scaled; this is a problem.

As the auxiliary modulation signal 811 is adopted, it newly becomes necessary to adjust the auxiliary modulation signal 811 in response to the type and the characteristic of the magnetron and finally discrete design for each circuit responsive to the target magnetron becomes necessary; this is a problem.

Further, the output voltage waveform of smoothing circuit 30 just before the first on operation start of the transistor 239 becomes DC regardless of the phase of the commercial power supply and thus, as the auxiliary modulation signal 811 is adopted, it is necessary to control the phase of the commercial power supply at the on operation start in the vicinity of 90 degrees, 270 degrees where the auxiliary modulation signal 811 becomes the minimum, namely, the on duration of the transistor 239 becomes the narrowest for preventing an excessive voltage from being applied to the magnetron, and control adjustment for this purpose becomes complicated; this is a problem.

Since the magnetron is a kind of vacuum tube as well known, a delay time until oscillation output of an electromagnetic wave since supply of a current to a heater of the magnetron (which will be hereinafter described simply as the start time) occurs. Although the start time is shortened by enhancing the heater current, since the impedance between the anode and the cathode of the magnetron is infinite within the start time, the voltage applied to both ends becomes high and thus a measure for preventing the voltage from becoming excessive needs to be taken; this is a problem.

It is therefore an object of the invention to provide a power control unit for high-frequency dielectric heating and its control method for making it possible to simplify the configuration of the unit and more miniaturize the unit and being capable of improving running efficiency without being affected by variations in the types or the characteristics of magnetrons, ebm (anode-cathode voltage) fluctuation caused by the temperature of the anode of a magnetron or the load in a microwave oven, or power supply voltage fluctuation if present.

It is also an object of the invention to provide a high-frequency dielectric heating method and unit for preventing applied voltage to a magnetron from becoming excessive relative to the dielectric strength of each component and shortening the starting time. It is another object of the invention to provide a power control unit for high-frequency dielectric heating and its control method capable of suppressing lowering of the power factor when power control is performed to a small value and thus the effect of nonlinear load of a magnetron becomes large.

Means for Solving the Problems

The invention provides a power control unit for high-frequency dielectric heating to control an inverter circuit for rectifying voltage of an AC power supply, modulating the on time of high frequency switching of a switching transistor, and converting into high frequency power, and the unit includes an input current detection section for detecting input current from the AC power supply to the inverter circuit and outputting input current waveform information; and a conversion section for converting the input current waveform information into a drive signal of the switching transistor of the inverter circuit so that instantaneous fluctuation of the input current waveform information is suppressed.

The power control unit for high-frequency dielectric heating can further be provided with a mix circuit being connected between the input current detection section and the conversion section for mixing the input current waveform information and power control information for controlling so that current or voltage at an arbitrary point of the inverter circuit becomes a predetermined value and generating an on voltage signal. In this case, the conversion section converts the on voltage signal into the drive signal so that the on time is shortened in the portion where the input current is large and that the on time is prolonged in the portion where the input current is small.

The mix circuit can be configured so as to mix the input current waveform information and power control information for controlling so that the output of the input current detection section becomes a predetermined value and generate the on voltage signal.

Preferably, the input current waveform information is input directly to the mix circuit, which then inverts the input current waveform information directly input and mixes the inverted input current waveform information and the power control information.

The input current detection section can have a current transformer for detecting the input current and a rectifying circuit for rectifying the detected input current and outputting the result.

The unit can further be provided with a comparison circuit for making a comparison between the input current and an output setting signal and outputting the power control information.

The input current detection section can be configured so as to detect and output a unidirectional current after the input current of the inverter circuit is rectified. The input current detection section can be provided with a shunt resistor for detecting the unidirectional current after the input current of the inverter circuit is rectified and an amplification circuit for amplifying voltage occurring across the shunt resistor, and inputs output provided by the amplification circuit directly to the mix circuit as the input current waveform information. A comparison circuit for making a comparison between the output provided by the amplification circuit and an output setting signal and outputting the power control information can further be provided.

The mix circuit can further have a configuration for cutting a high component of the power control information.

Further, the mix circuit can be switched between the circuit configuration when controlling so that the input current increases (which will be hereinafter referred to as "at the increase control time") and the circuit configuration when controlling so that the input current decreases (which will be hereinafter referred to as "at the decrease control time"). In this case, the mix circuit has a time constant increased at the increase control time of the input current and decreased at the decrease control time of the input current.

Collector voltage control information for controlling collector voltage of the switching transistor to a predetermined value can be input to the mix circuit and the circuit configuration can be switched in response to the magnitude of the collector voltage. In this case, the time constant of the mix circuit increases when the collector voltage is low and decreases when the collector voltage is high.

Further, the input current detection section can be provided with a filter circuit for attenuating the high-order frequency portion of a commercial power supply and the high-frequency portion of high-frequency switching frequency, etc. Phase lead compensation may be added to the filter circuit.

The conversion section can be implemented as a pulse width conversion circuit for superposing the on voltage signal and a predetermined carrier on each other to generate the drive signal of the switch transistor.

The power control unit for high-frequency dielectric heating can further be provided with an input voltage detection section for detecting input voltage from the AC power supply to the inverter circuit and outputting input voltage waveform information and a selection section for selecting the input current waveform information or the input voltage waveform information, whichever is larger, and the conversion section can be configured so as to convert the selected input current waveform information or input voltage waveform information into the drive signal of the switching transistor of the inverter circuit.

The selection section can be implemented as a mix circuit being connected between the input current detection section and the conversion section for mixing the input current waveform information or the input voltage waveform information and power control information for controlling so that current or voltage at an arbitrary point of the inverter circuit becomes a predetermined value and generating an on voltage signal, and the conversion section can be configured so as to convert the on voltage signal into the drive signal so that the peak of the voltage applied to the magnetron is suppressed.

The mix circuit can be configured so as to mix either of the input current waveform information and the input voltage waveform information and power control information for controlling so that the output of the input current detection section becomes a predetermined value and generate the on voltage signal.

The input current waveform information and the input voltage waveform information can be input directly to the mix circuit, which then can select the input current waveform information or input voltage waveform information directly input and can mix the selected input current waveform information or input voltage waveform information with the power control information.

The input voltage detection section can be made up of a pair of diodes for detecting the input voltage from the AC power supply to the inverter circuit and a shaping circuit for shaping the input voltage detected by the diodes and outputting the shaped voltage.

The shaping circuit may have a configuration for attenuating the high-order frequency portion of the input voltage.

The shaping circuit may further have phase lead compensation.

The unit can further be provided with an oscillation detection circuit for detecting oscillation of the magnetron, and the magnitude of the input voltage waveform information from the input voltage detection section can also be switched in response to oscillation or non-oscillation of the magnetron detected by the oscillation detection circuit.

The power control unit for high-frequency dielectric heating can further be provided with an oscillation detection section for detecting oscillation of the magnetron and a changeover switch for allowing the input voltage detection section to output the input voltage waveform information until the oscillation detection section detects oscillation of the magnetron, and the conversion section can be configured so as to add the input current waveform information and the input voltage waveform information output until oscillation of the magnetron is detected, and convert the result into the drive signal of the switching transistor of the inverter circuit.

The unit can further be provided with a mix circuit being connected between the input current detection section and the conversion section for mixing the input current waveform information, the input voltage waveform information output until oscillation of the magnetron is detected, and the power control information for controlling so that current or voltage at an arbitrary point of the inverter circuit becomes a predetermined value and generating an on voltage signal, and the conversion section can be configured so as to convert the on voltage signal into the drive signal so that the peak of the voltage applied to the magnetron is suppressed.

The mix circuit may mix the input current waveform information, the input voltage waveform information, and the power control information for controlling so that the output of the input current detection section becomes a predetermined value and may generate the on voltage signal.

The input current waveform information and the input voltage waveform information can be input directly to the mix circuit, which then can add and invert the input current waveform information or input voltage waveform information directly input and can mix the information with the power control information.

The oscillation detection section may be implemented as an oscillation detection circuit connected between the input current detection section and the input voltage detection section, and the changeover switch may be provided at a connection point of the oscillation detection circuit and the input voltage detection section.

The power control unit for high-frequency dielectric heating can further be provided with an addition section for adding the input current waveform information and the input voltage waveform information, and the conversion section can be configured so as to convert the addition result of the input current waveform information and the input voltage waveform information into the drive signal of the switching transistor of the inverter circuit.

The addition section can be implemented as a mix circuit being connected between the input current detection section and the conversion section for mixing the input current waveform information, the input voltage waveform information, and power control information for controlling so that current or voltage at an arbitrary point of the inverter circuit becomes a predetermined value and generating an on voltage signal, and the conversion section can be configured so as to convert the on voltage signal into the drive signal so that the peak of the voltage applied to the magnetron is suppressed.

The unit can further be provided with an oscillation detection circuit for detecting oscillation of the magnetron, and the magnitude of the input voltage waveform information from the input voltage detection section can be switched in response to oscillation or non-oscillation of the magnetron detected by the oscillation detection circuit.

The invention also includes a power control method for high-frequency dielectric heating executed by each of the power control units for high-frequency dielectric heating described above for controlling an inverter circuit for converting voltage of an AC power supply into high frequency power.

Advantages of the Invention

According to the invention, the input current waveform information of the inverter circuit for rectifying AC power supply voltage and converting into AC of a predetermined frequency is converted into the drive signal of the switching transistor of the inverter circuit to suppress instantaneous fluctuation of the input current waveform information. For example, the input current waveform information is converted into an on/off drive signal of the switching transistor of the inverter circuit according to an on time modulation system for use. Therefore, a control loop is formed for correcting input current by inverting so that the portion where the input current is large becomes small and the portion where the input current is small becomes large. Therefore, if there are variations in the types and the characteristics of magnetrons or if there is ebm (anode-cathode voltage) fluctuation caused by the temperature of the anode of the magnetron and the load in the microwave oven or further if there is power supply voltage fluctuation, input current waveform shaping not affected by them can be obtained according to a simpler configuration and stable output of the magnetron is accomplished according to a simple configuration.

According to the invention, the input current waveform information of the inverter circuit for rectifying AC power supply voltage and converting into AC of a predetermined frequency is converted into the on/off drive current of the switching transistor of the inverter circuit for use. Thus, a control loop is formed for correcting input current so that the portion where the input current is large becomes small and the portion where the input current is small becomes large, and if there are variations in the types and the characteristics of magnetrons or if there is ebm (anode-cathode voltage) fluctuation caused by the temperature of the anode of the magnetron and the load in the microwave oven or if there is power supply voltage fluctuation, input current waveform shaping not affected by them is made possible according to a very simple configuration.

Since the input voltage waveform information is also input to the control loop, there are the advantages that the starting time of the magnetron is shortened and that the power factor at the time of low input current is improved.

BRIEF DESCRIPTION OF THE DRAWINGS

FIG. 3 is a circuit diagram to show the details of an amplification circuit shown in FIG. 2.

FIG. 5 is waveform drawings of parts of the power control unit for high-frequency dielectric heating shown in FIG. 1.

FIG. 10 is a detailed diagram of the input current detection section shown in FIG. 9.

FIG. 11 is a circuit diagram of a mix circuit according to a tenth embodiment of the invention.

FIG. 13 is waveform drawings to describe the operation of the power control unit for high-frequency dielectric heating shown in FIG. 8.

FIG. 26 is a circuit diagram of a mix circuit according to twelfth and twenty-first embodiments of the invention.

DESCRIPTION OF REFERENCE NUMERALS

Figure 1:
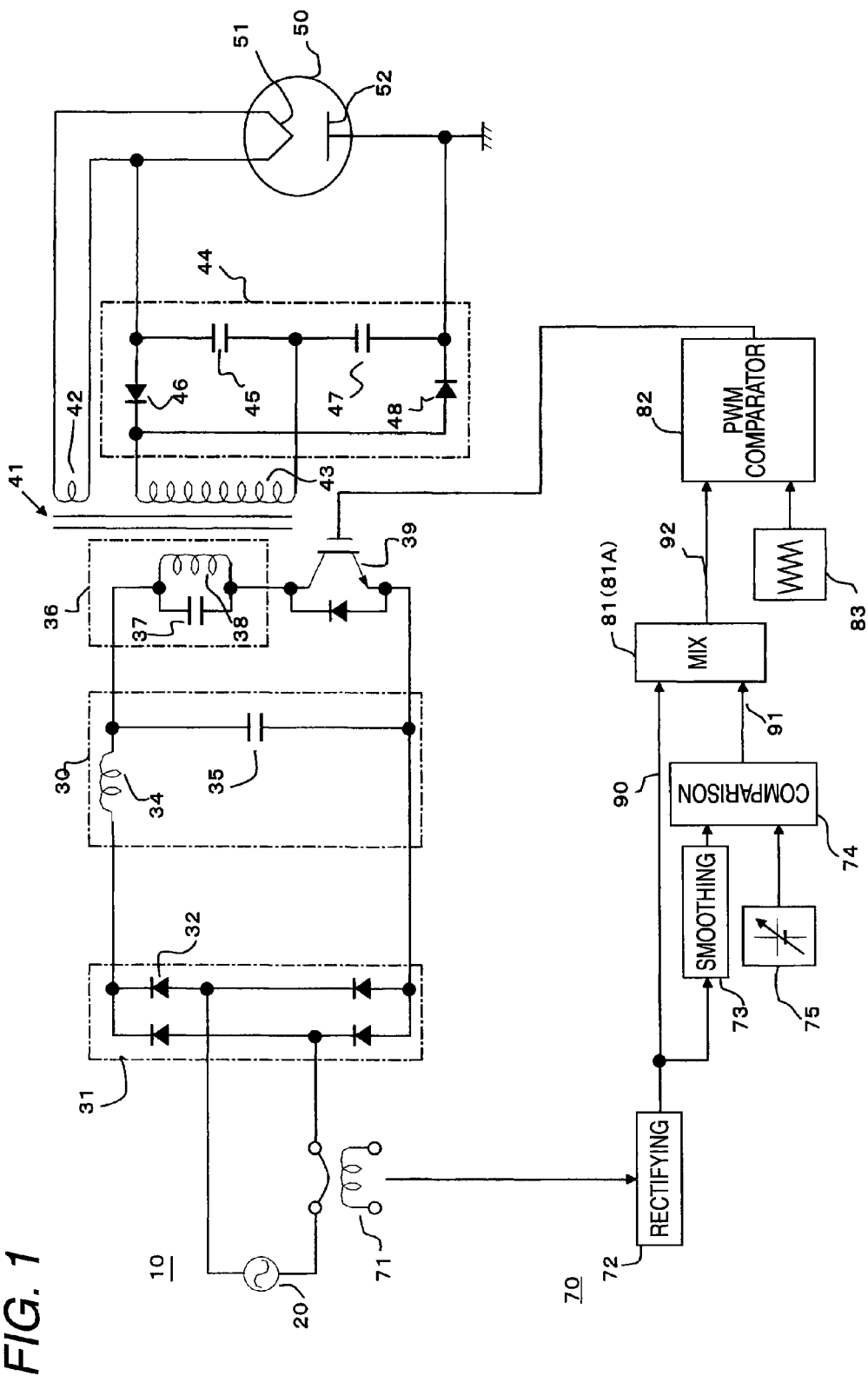
FIG. 1 is a diagram of the configuration of a power control unit for high-frequency dielectric heating according to a first embodiment of the invention.

10 Inverter circuit
20 AC power supply
30 Smoothing circuit
31 Diode bridge type rectifying circuit
32 Diode
34 Inductor
35 Capacitor
36 Resonance circuit
37 Capacitor
38 Primary winding
39 Switching transistor
41 Transformer
42 Tertiary winding
43 Secondary winding
45 Capacitor
46 Diode
47 Capacitor
48 Diode
50 Magnetron
51 Cathode
52 Anode
61 Diode
62 Shaping circuit
63 Oscillation detection circuit
70 Control circuit
71 Current detection circuit
72 Rectifying circuit
73 Smoothing circuit
74 Comparison circuit
75 Output setting section
81 Mix circuit
82 PWM comparator
83 Sawtooth wave generation circuit
85 Amplification circuit
86 Shunt circuit
90 Input current waveform information
91 Power control information
92 ON voltage information
93 Collector voltage control information
94 Input voltage waveform information

BEST MODE FOR CARRYING OUT THE INVENTION

Embodiments of the invention will be discussed in detail with the accompanying drawings.

First Embodiment

FIG. 1 is a block diagram to describe a high-frequency heating unit according to a first embodiment of the invention. In FIG. 1, the high-frequency heating unit is made up of an inverter circuit 10, a control circuit 70 for controlling a switching transistor 39 of an inverter, and a magnetron 50.

The inverter circuit 10 includes an AC power supply 20, a diode bridge type rectifying circuit 31, a smoothing circuit 30, a resonance circuit 36, the switching transistor 39, and a voltage multiplying rectifier 44.

The AC voltage of the AC power supply 20 is rectified by the diode bridge type rectifying circuit 31 made up of four diodes 32 and is converted into a DC voltage through the smoothing circuit 30 made up of an inductor 34 and a capacitor 35. Then, the DC voltage is converted into a high-frequency AC by the resonance circuit 36 made up of a capacitor 37 and a primary winding 38 of a transformer 41 and the switching transistor 39, and a high-frequency high voltage is induced in a secondary winding 43 of the transformer 41 through the transformer 41.

The high-frequency high voltage induced in the secondary winding 43 is applied between an anode 52 and a cathode 51 of the magnetron 50 through the voltage multiplying rectifier 44 made up of a capacitor 45, a diode 46, a capacitor 47, and a diode 48. The transformer 41 also contains a tertiary winding 42 for heating the heater (cathode) 51 of the magnetron 50. The described circuitry is the inverter circuit 10. Next, the control circuit 70 for controlling the switching transistor 39 of the inverter will be discussed. First, a current detection section made up of a CT (Current Transformer) 71, etc., provided between the AC power supply 20 and the diode bridge type rectifying circuit 31 is connected to a rectifying circuit 72 and the CT 71 and the rectifying circuit 72 make up an input current detection section for detecting an input current to the inverter circuit. The input current to the inverter circuit is insulated and detected in the CT 71 and output thereof is rectified by the rectifying circuit 72 to generate input current waveform information 90.

The current signal provided by the rectifying circuit 72 is smoothed by a smoothing circuit 73 and a comparison circuit 74 makes a comparison between the signal and a signal from an output setting section 75 for outputting an output setting signal corresponding to heating output setting. To control the magnitude of power, the comparison circuit 74 makes a comparison between the input current signal smoothed by the smoothing circuit 73 and the setting signal from the output setting section 75. Therefore, an anode current signal of the magnetron 50, a collector current signal of the switching transistor 39, a collector voltage signal of the switching transistor 39, or the like can also be used as an input signal in place of the input current signal smoothed by the smoothing circuit 73. That is, the comparison circuit 74 outputs power control information 91 so that output of the input current detection section becomes a predetermined value, but the comparison circuit 74 and the power control information 91 are not indispensable as described later.

Figure 2:
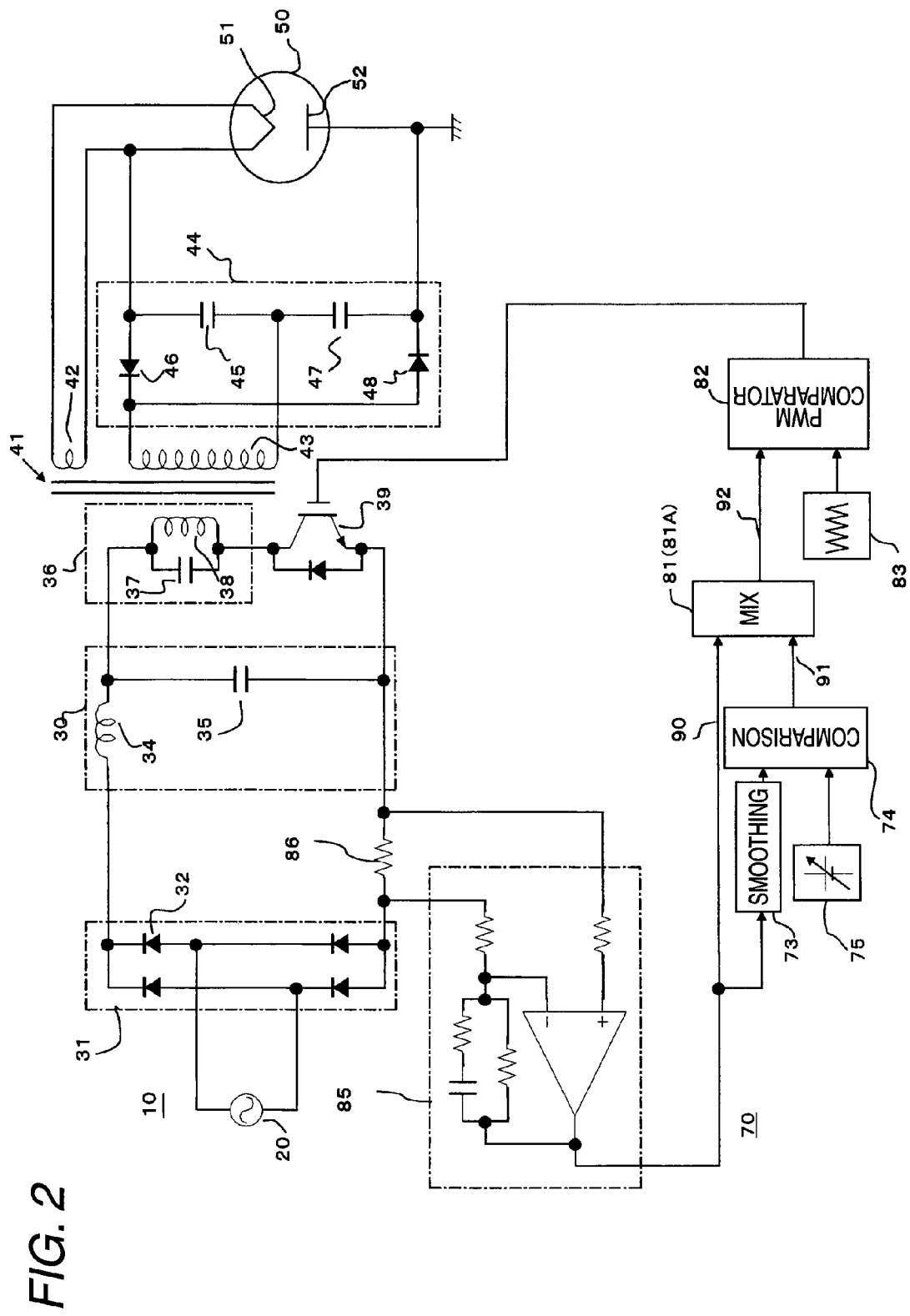
FIG. 2 is a diagram of the configuration of a power control unit for high-frequency dielectric heating having an input current detection section implemented as an amplifier according to a third embodiment of the invention.

Likewise, as shown in FIG. 2, a current detection section of a shunt resistor 86 provided between the diode bridge type rectifying circuit 31 and the smoothing circuit 30 and an amplification circuit 85 for amplifying the voltage across the shunt resistor may make up an input current detection section and output thereof may be adopted as input current waveform information 90. The shunt resistor 86 detects an input current after rectified in a single direction by the diode bridge type rectifying circuit 31.

In the embodiment, an input current waveform information detection system is simplified in such a manner that a mix circuit 81 (81A) mixes and filters the input current waveform information 90 and the power control information 91 from the comparison circuit 74 and outputs an ON voltage signal 92 and a comparison is made between the ON voltage signal and a sawtooth wave from a sawtooth wave generation circuit 83 in a PWM comparator 82 and pulse width modulation is performed for controlling turning on/off of the switching transistor 39 of the inverter circuit. Particularly in the embodiment, a configuration wherein the input current waveform information 90 is directly input to the mix circuit 81A is adopted.

The PWM comparator 82 is a pulse width modulation circuit for superposing the ON voltage information 92 and a sawtooth wave of a predetermined carrier on each other to generate a drive signal of the switching transistor 39. However, this portion may be configured as a conversion section for converting the ON voltage information 92 into a drive signal of the switching transistor of the inverter circuit so that the on time is shortened in the portion where the input current from the AC power supply 20 is large and the on time is prolonged in the portion where the input current is small; the configuration is not limited.

For the on/off control of the switching transistor 39 relative to the input current waveform information, conversion is executed at the polarity for shortening the on time when the input current is large and prolonging the on time when the input current is small. Therefore, to provide such a waveform, the input current waveform information is subjected to inversion processing in the mix circuit 81A (described later) for use.

Figure 4A:
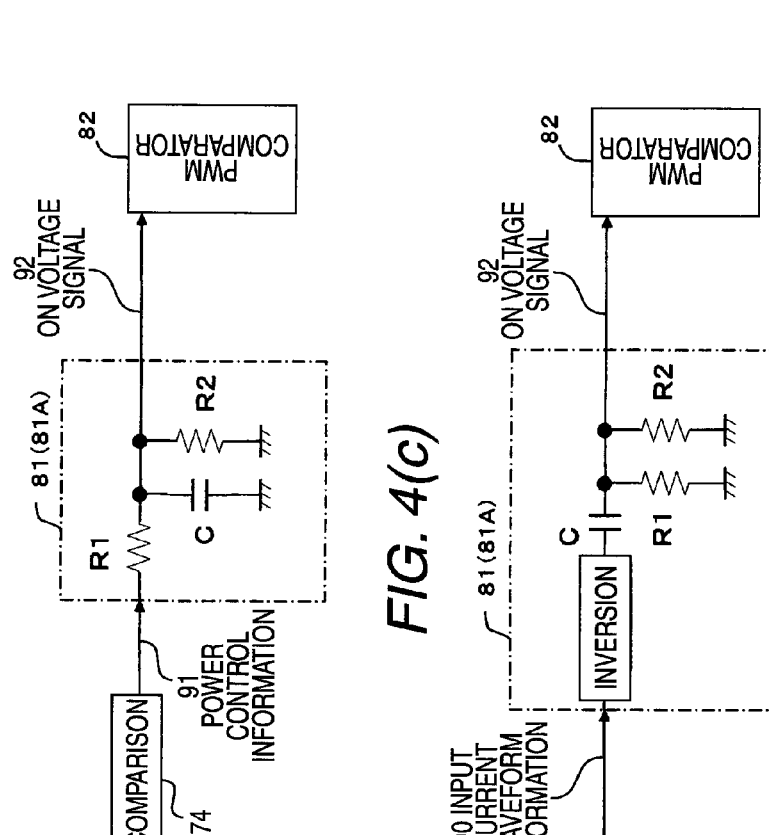
FIG. 4 is a circuit diagram of a mix circuit according to a fourth embodiment of the invention.
Figure 4B:
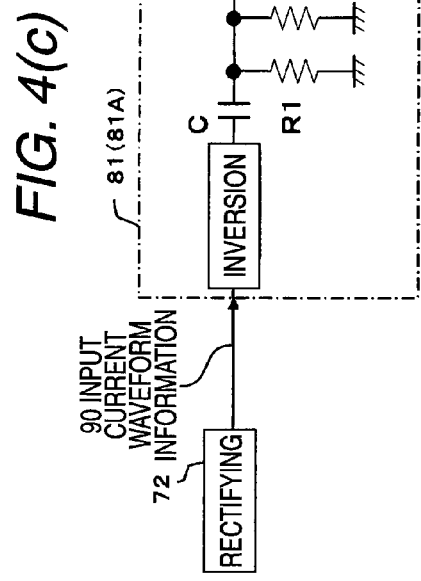
Figure 4C:
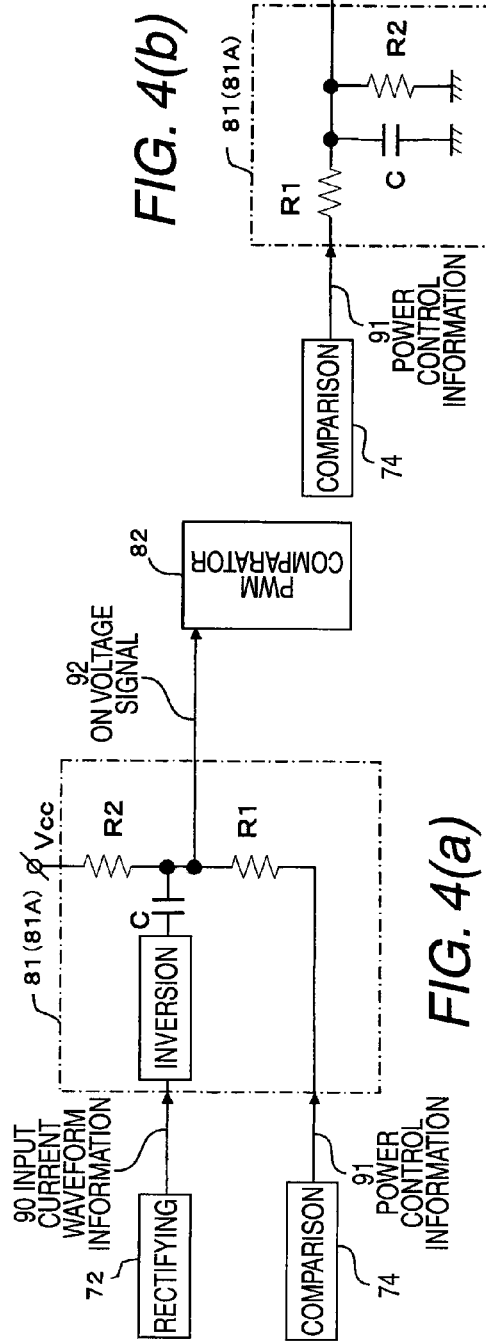

FIG. 4 (*a*) shows an example of the mix circuit 81A. The mix circuit 81A has two input terminals. The power control information 91 is added to one and the input current waveform information 90 is added to the other and they are mixed in an internal circuit as shown in the figure. The input current waveform information 90 is input to the mix circuit 81A and is subjected to inversion processing in an inverting circuit to generate a correction signal.

As in FIG. 4 (*b*), a high-frequency cut filter is formed as shown in an AC equivalent circuit in the mix circuit 81A between the power control information 91 and output. Thus, the filter cuts the high frequency component contained in power control as interference with the input current waveform information 90 to shape the input current waveform.

As shown in FIG. 4 (*c*), a low-frequency cut filter is formed as shown in an AC equivalent circuit in the mix circuit 81A between the input current waveform information 90 and output. Therefore, the power control information 91 is converted into a DC component of output of the mix circuit 81A and the input current waveform information 90 is converted into an AC component.

The first embodiment thus converts the input current waveform information into an on/off drive signal of the switching transistor 39 of the inverter circuit for use. Generally, the inverter used with a microwave oven, etc., is known; a commercial AC power supply of 50 to 60 cycles is rectified to DC, the provided DC power supply is converted into a high frequency of about 20 to 50 kHz, for example, by the inverter, the provided high frequency is raised with a step-up transformer, and high voltage further rectified by a voltage multiplying rectifier is applied to a magnetron.

As the inverter circuit system, for example, a (half) bridge circuit system as often used in a region where the commercial power supply is 230 V, etc., for alternately turning on two switching transistors connected in series and controlling the switching frequency for changing output and an on time modulation system using a so-called 1-transistor voltage resonance type circuit using one switching transistor 39 to perform switching and changing the on time of a switching pulse for changing output are available. The 1-transistor voltage resonance type circuit system is a system capable of providing a simple configuration and simple control using one switching transistor 39 in such a manner that if the on time is shortened, output lowers and if the on time is prolonged, output increases.

FIG. 5 is a drawing to describe waveforms provided according to the first embodiment of the invention; (a) shows the case where input current is large and (b) shows the case where input current is small. The solid line represents the signal shape after correction by a power control unit of the invention mainly used in the description to follow and the dashed line represents the signal shape of instantaneously fluctuating output before correction from the AC power supply 20, as described later.

In FIG. 5 (*a*), the waveform of input current waveform information in (a1) at the top is the input current waveform information 90 output by the rectifying circuit 72 in FIG. 1 and output by the amplifier 85 in FIG. 2, and the dashed line indicates the waveform before correction caused by the non-linear load characteristic of the magnetron. (a2) of FIG. 5 (*a*) shows the ON voltage information 92 of correction output of the mix circuit 81A; the ON voltage information 92 changes in size following the input current waveform information 90 and the power control information 91 and further is output as an inverted waveform of (a1) to make complementary, correction of the distortion component of the input current.

(a3) of FIG. 5 (*a*) shows ON voltage information equivalent to the ON voltage information 92 shown in (a2) and the PWM comparator 82 makes a comparison between the ON voltage information and a sawtooth wave from the sawtooth wave generation circuit 83 for modulation shown in (a4) to generate a PWM signal of an on/off signal of the switching transistor 39. That is, as shown in the figure, the ON voltage information 92 in (a3) as a PWM command signal and the sawtooth wave in (a4) are input to the PWM comparator 82 for making a comparison therebetween and on time modulation of a pulse is executed with the time period over which the sawtooth wave and the ON voltage information 92 cross each other as the pulse width of the on time. In the portion where the amplitude value of the command signal (ON voltage information) 92 is large (in the proximity of 0 degrees, 180 degrees, where the input current is small), the time period crossing with the sawtooth wave is also large and thus the on time becomes long and the pulse width widens and correction is made to the polarity for raising the input current. In the portion where the amplitude value of the ON voltage information 92 is small (in the proximity of 90 degrees, 270 degrees, where the input current is large), the time period crossing with the sawtooth wave is also small and thus the on time becomes short and the pulse width also narrows and correction is made to the polarity for lowering the input current, namely, a pulse string of the on and off time periods as in (a5) is output as PWM signal. That is, since the ON voltage information (a2) is inverted as a correction waveform relative to the input current waveform information (a1), the on time is shortened like the pulse string signal in (a4) in the portion where the input of the input current waveform information (a1) is large (in the proximity of 90 degrees, 270 degrees) and the on time is prolonged in the portion where the input of the input current waveform information (a1) is small (in the zero cross proximity of 0 degrees, 180 degrees) for conversion to inversion output opposite to (a1). Accordingly, the correction effect of the input waveform is provided; particularly the effect is large in the zero cross proximity.

The waveform in (a7) at the bottom shows the ON width of the switching transistor 39. The ON voltage information (a3) of the correction waveform provided by inverting the 50-Hz (or 60-Hz) input current waveform information shown in (a1) is compared with the high-frequency sawtooth wave in (a4), whereby the input current waveform information is converted into a high frequency of 20 kHz to 50 kHz, etc., by the inverter to generate the on/off signal in (a5). The switching transistor 39 is driven in response to the on/off signal (a5) and high frequency power is input to the primary side of the step-up transformer and raised high voltage is generated on the secondary side of the step-up transformer. To visualize how the on time of each pulse of the on/off signal (a5) changes within the period of commercial power supply, (a7) plots the on time information on the Y axis and connects the points.

In the description given above, the same signal as the state in which the input current from the AC power supply 20 is obtained in an ideal state (for example, sine wave) is shown. However, generally the input current from the AC power supply 20 is alienated from the ideal sine wave and fluctuates when viewed instantaneously. The dashed-line signal indicates such an actual state. As indicated by the dashed line, generally the actual signal is alienated from the state of the ideal signal and instantaneous fluctuation occurs even if it is viewed in the instantaneous time period of the half period of the commercial power supply (0 to 180 degrees). Such a signal shape occurs due to the voltage raising action of the transformer and the voltage doubler circuit, the smooth characteristic of the voltage doubler circuit, the magnetron characteristic that an anode current flows only when the voltage is ebm or more, etc. That is, it can be said that it is inevitable fluctuation in the inverter circuit for the magnetron.

In the power control unit of the invention, the input current detection section provides the input current waveform information (see (a1)) indicated by the dashed line reflecting the fluctuation state of the input current and the later control is performed based on the input current waveform information. The control is performed so that the instantaneous fluctuation of the input current waveform information occurring in the period like a half period, for example, is suppressed so as to approach the ideal signal as indicated by the arrow. The suppression is accomplished by adjusting the drive signal of the switching transistor 39. Specifically, if the input current waveform information is smaller than the ideal signal, the above-described on time is made longer and the pulse width is made wider. If the input current waveform information is larger than the ideal signal, the above-described on time is made shorter and the pulse width is made narrower. Also in the instantaneous fluctuation in a further shorter time period, the fluctuating waveform is reflected on the on time information and a correction is made in a similar manner to that described above.

Correction as indicated by the arrow is made to the input current waveform information by the instantaneous fluctuation suppression action of the switching transistor 39 to which a drive signal is given, and input close to the ideal wave is given to the magnetron at all times. Illustration of (a3) and (a5) after the correction is omitted. The above-mentioned ideal signal is a virtual signal; this signal becomes a sine wave.

That is, in a short time period like a half period of the commercial power supply, the sum total of instantaneous errors between the ideal signal waveform and the input current waveform information or the correction amounts is roughly zero because the magnitude of the input current is controlled by any other means (power control). Since the portion where the input current does not flow because of nonlinear load is corrected in a direction in which the input current is allowed to flow, the portion where the input current is large is decreased so that roughly zero holds true. Even for the nonlinear load, a correction is made as if the current waveform were assumed to be linear load and the voltage waveform of the commercial power supply is a sine wave and thus the ideal waveform becomes a sine wave like the current waveform flowing into linear load.

Thus, the input current is corrected at the opposite polarity to the waveform so as to cancel out change in the input current waveform and excess and deficiency with respect to the ideal waveform. Therefore, rapid current change in the commercial power supply period caused by nonlinear load of the magnetron, namely, distortion is canceled out in the control loop and input current waveform shaping is performed.

Further, the control loop thus operates based on the input current waveform information following the instantaneous value of the input current, so that if there are variations in the types and the characteristics of magnetrons or if there is ebm (anode-cathode voltage) fluctuation caused by the temperature of the anode of the magnetron and the load in the microwave oven and further if there is power supply voltage fluctuation, input current waveform shaping not affected by them can be performed.

Particularly in the invention, the switching transistor is controlled based on the instantaneously fluctuating input current waveform information. The instantaneous fluctuation of the input current is input directly to the mix circuit 81A in the form of the input current waveform information and is also reflected on the ON voltage information, so that the drive signal of the switching transistor excellent in suppression of the input current waveform distortion and follow up of the instantaneous fluctuation can be provided.

The subject of the invention is to convert the input current waveform information into the drive signal of the switching transistor of the inverter circuit so as to suppress distortion and the instantaneous fluctuation of the input current waveform. To accomplish the object, the power control information 91 is not particularly indispensable, because the power control information 91 is information to control power fluctuation in a long time period, namely, in a period longer than the commercial power supply period or so and is not information to correct the instantaneous fluctuation in a short period like a half period of AC intended by the invention. Therefore, adoption of the mix circuit 81A and the PWM comparator 82 is also only one example of the embodiment and a component corresponding to the conversion section for executing the above-described conversion may exist between the input current detection section and the switching transistor.

To use the power control information, it is not indispensable either to input the power control information 91 for controlling so that the output of the input current detection section becomes a predetermined value to the mix circuit 81A as in the above-described embodiment. That is, in the above-described embodiment, the power control information 91 originates from the current detection section 71 and the rectifying circuit 72 (FIG. 1) or the shunt resistor 86 and the amplification circuit 85 (FIG. 2) for detecting an input current; information for controlling so that the current or the voltage at any desired point of the inverter circuit 10 becomes a predetermined value can be input to the mix circuit 81A as the power control information. For example, information from the collector of the switching transistor 39 can be input to the comparison circuit 74 as it is or after it is smoothed through the smoothing circuit 73, and information after subjected to a comparison with the output setting signal in the comparison circuit 74 can be used as the power control information.

Next, FIG. 5 (b) shows comparison with the case where the input current is small with respect to FIG. 5 (a); (b1) shows input current waveform information when the input is small and corresponds to (a1) of FIG. 5 (*a*), (b2) shows ON voltage information and corresponds to (a2) of FIG. 5 (*a*), and (b3) shows the on width of the switching transistor and corresponds to (a7). Although not shown, the comparison processing with a sawtooth wave shown in (a3), (a4), (a5), and (a6) of FIG. 5 (*a*) is also performed in FIG. 5 (*b*) in the same manner, of course.

Second Embodiment

Figure 32:
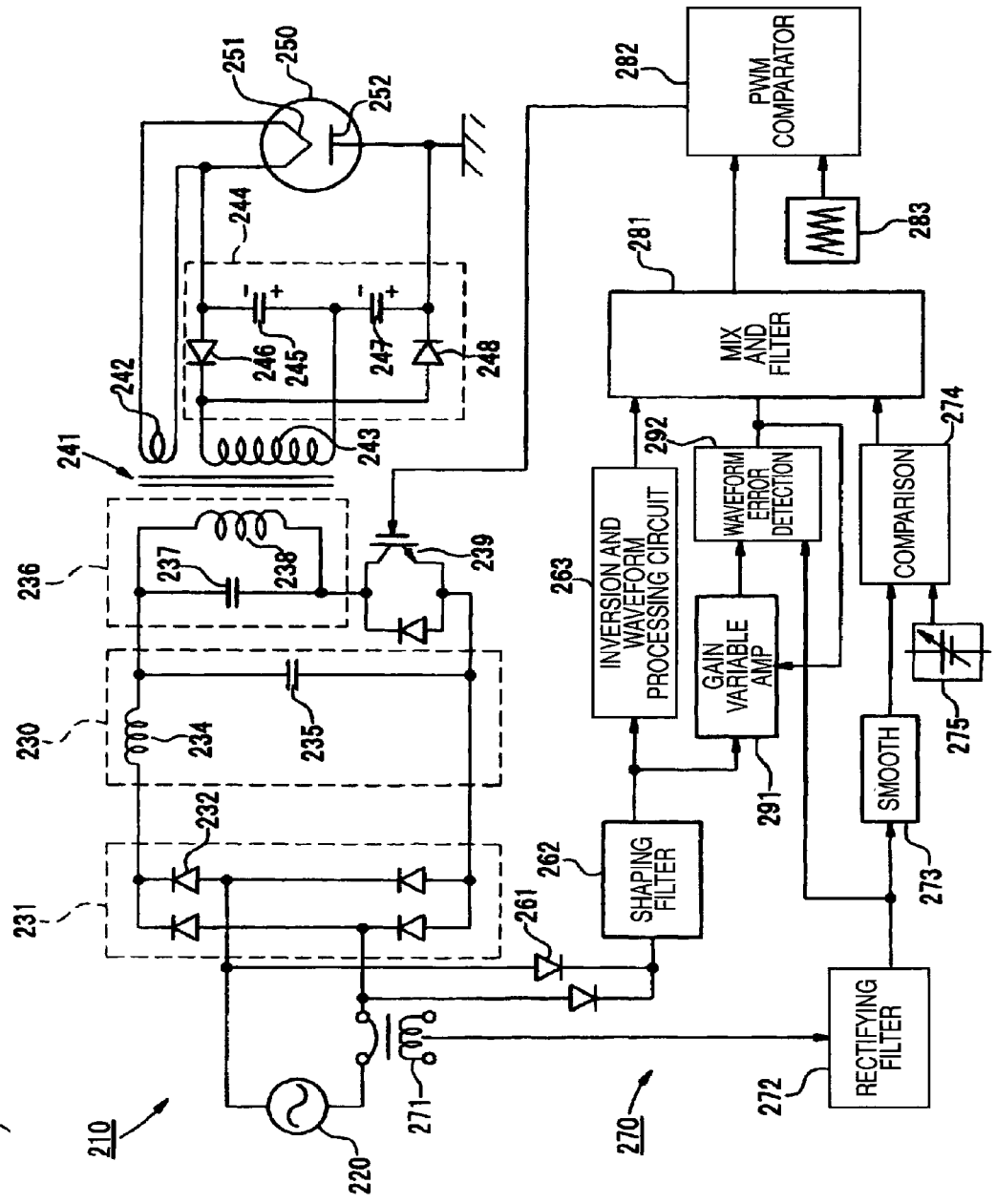
FIG. 32 is a diagram of the configuration of a power control unit for high-frequency dielectric heating in a related art.
Figure 33:
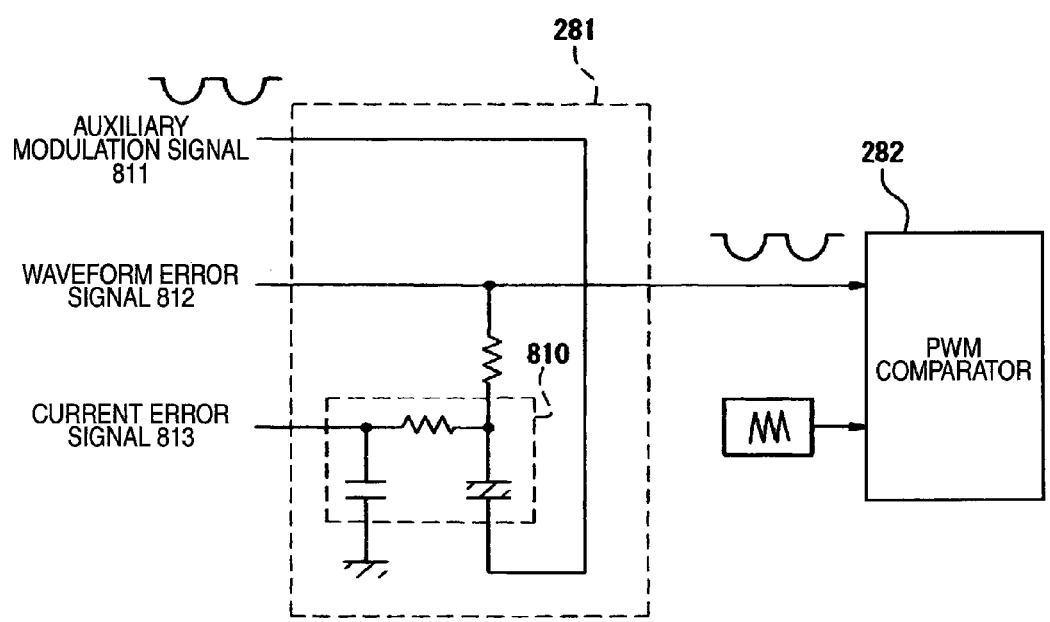
FIG. 33 is a diagram of the configuration of a mix circuit shown in FIG. 32.

Next, a second embodiment of the invention will be discussed. The second embodiment of the invention relates to the configuration of a control circuit. As compared with the related art example in FIG. 32, the diode 261, the shaping circuit 262, the gain variable amplifier 291, the inversion and waveform processing circuit 263, and the waveform error detection circuit 292 in FIG. 32 are omitted except that the inversion circuit is incorporated in the mix circuit 81A as shown in FIG. 1, so that drastic reduction is realized, the waveform error detection line is drastically simplified, practical miniaturization of the machine configuration is facilitated, the control procedure is simplified, and the processing time can be shortened and therefore the reliability of the machine is also improved.

Input current waveform information 90 and power control information 91 from the comparison circuit 74 are mixed and the mixed information is filtered and is converted into an on/off drive signal of the switching transistor 39 of the inverter circuit for use. As the circuitry is thus configured, the control loop using the input current waveform information 90 is specialized for waveform shaping of input current, the control loop using the power control information 91 is specialized for power control, the mutual control loops do not interfere with each other in the mix circuit 81A, and the conversion efficiency is held.

Third Embodiment

A third embodiment relates to an input current detection section. As shown in FIG. 1, the above-described input current detection section detects the input current to the inverter circuit with the CT 71, etc., and rectifies and outputs by the rectifying circuit 72. In this configuration, since the input current is detected using the CT, etc., a large signal can be taken out while the insulating property is held, so that the effect of input current waveform shaping is large and the quality of the input current improves.

In an example shown in FIG. 2, the input current detection section detects the unidirectional current after rectified by the rectifying circuit 31 of the inverter circuit through the shunt resistor 86 placed between the rectifying circuit 31 and the smoothing circuit 30, and amplifies the voltage occurring across the shunt resistor by the amplification circuit (amplifier) 85, and outputs the voltage. This configuration has the advantage that the input current detection section can be configured at a low cost because the detection section need not be insulated from electronic circuitry and rectification need not be performed either.

The amplification circuit 85 of the input current detection section shown in FIG. 2 is configured so as to attenuate the high-order frequency portion of the commercial power supply and the high-frequency portion of high-frequency switching frequency, etc., for preventing unnecessary resonance. Specifically, as shown in a detailed drawing of the input current detection section in FIG. 3, the amplification circuit 85 attenuates the high-order frequency portion of the commercial power supply and the high-frequency portion of high-frequency switching frequency, etc., using a high cutting capacitor as in FIG. 3 (*a*).

Further, as the high cutting capacitor of the amplification circuit 85 is inserted, for an occurring time delay, a resistor is inserted in series with the capacitor, phase lead compensation is added, an excessive time delay is prevented, and the stability of a control loop is ensured, as shown in a phase characteristic drawing of FIG. 3 (*b*). Also in the rectifying circuit 72 in FIG. 1, a configuration for attenuating the high frequency portion and a configuration for adding phase lead compensation for preventing an excessive time delay can be used.

Fourth Embodiment

A fourth embodiment relates to the mix circuit 81A shown in FIGS. 1 and 2. Input current waveform information 90 and power control information 91 are input to two terminals of the mix circuit 81A, as shown in a configuration drawing of the mix circuit in FIG. 4 (*a*). The input current waveform information 90 is subjected to inversion processing in an inversion circuit for correction output. Both signals are input to a filter circuit made up of C, R1, and R2 and are output to a PWM comparator 82 as ON voltage information 92 after they are filtered. The filter circuit cuts the high component of the power control output 91, as shown in an equivalent circuit diagram of FIG. 4 (*b*). In so doing, the high component hindering input current waveform shaping is cut, so that the quality of the input current waveform improves. On the other hand, a low cutting filter is formed for the input current waveform information 90 to provide waveform integrity, as shown in an equivalent circuit diagram of FIG. 4 (*c*).

Fifth Embodiment

Figure 6B:
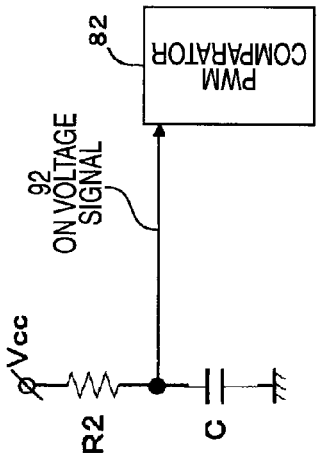
FIG. 6 is a diagram of the configuration of a mix circuit according to a fifth embodiment of the invention.
Figure 6C:
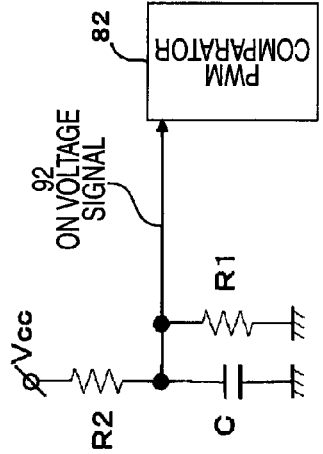
Figure 6A:
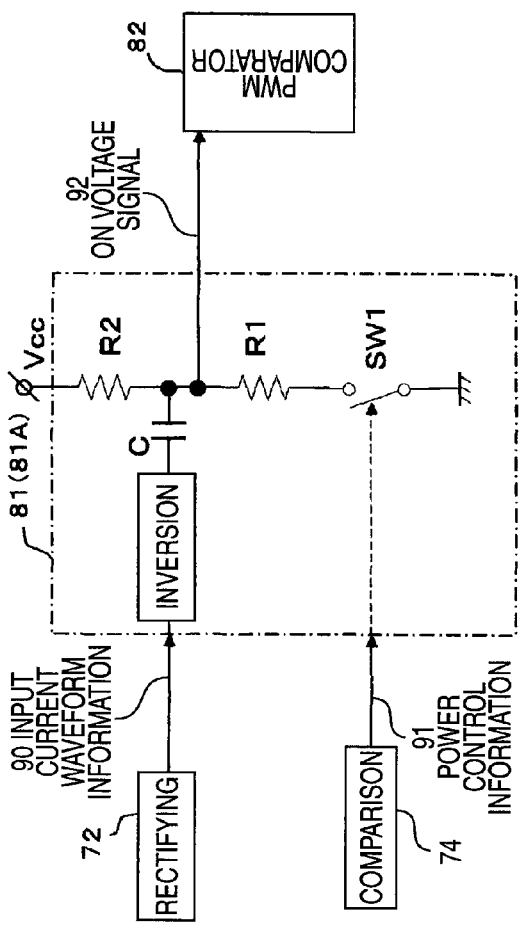

In a fifth embodiment of the invention, the characteristic of a mix circuit for mixing input current waveform information of an input current detection section and power control information for controlling so that output of the input current detection section becomes a predetermined value is controlled by providing a difference between the input current increase control time and the decrease control time, as shown in a configuration drawing of the mix circuit relating to the fifth embodiment in FIG. 6.

In a configuration drawing of FIG. 6 (*a*), SW1 is turned on/off according to power control information 91 for lowering/raising ON voltage information 92. At the input current increase control time, the SW1 is turned off and the ON voltage information is gradually raised according to a time constant of C*R2 for widening the on width of a switching transistor, as shown in an equivalent circuit of FIG. 6 (*b*).

At the input current decrease control time, the SW1 is turned on and the ON voltage information is rapidly lowered according to a time constant of C*{R1*R2/(R1+R2)} for narrowing the on width of the switching transistor, as shown in an equivalent circuit of FIG. 6 (*c*). That is, the circuit configuration of the mix circuit 81A is switched between the input current increase control time and the input current decrease control time. Particularly, at the input current increase control time, the time constant is set large and at the input current decrease control time, the time constant is set small.

Such a difference is provided, whereby a control characteristic for making a gentle response at the normal time and a control characteristic for making a rapid response for decreasing the input current to prevent parts destruction, etc., if the input current excessively rises for some reason can be implemented. The stability of a control characteristic for the nonlinear load of a magnetron is also secured.

Sixth Embodiment

Figure 7:
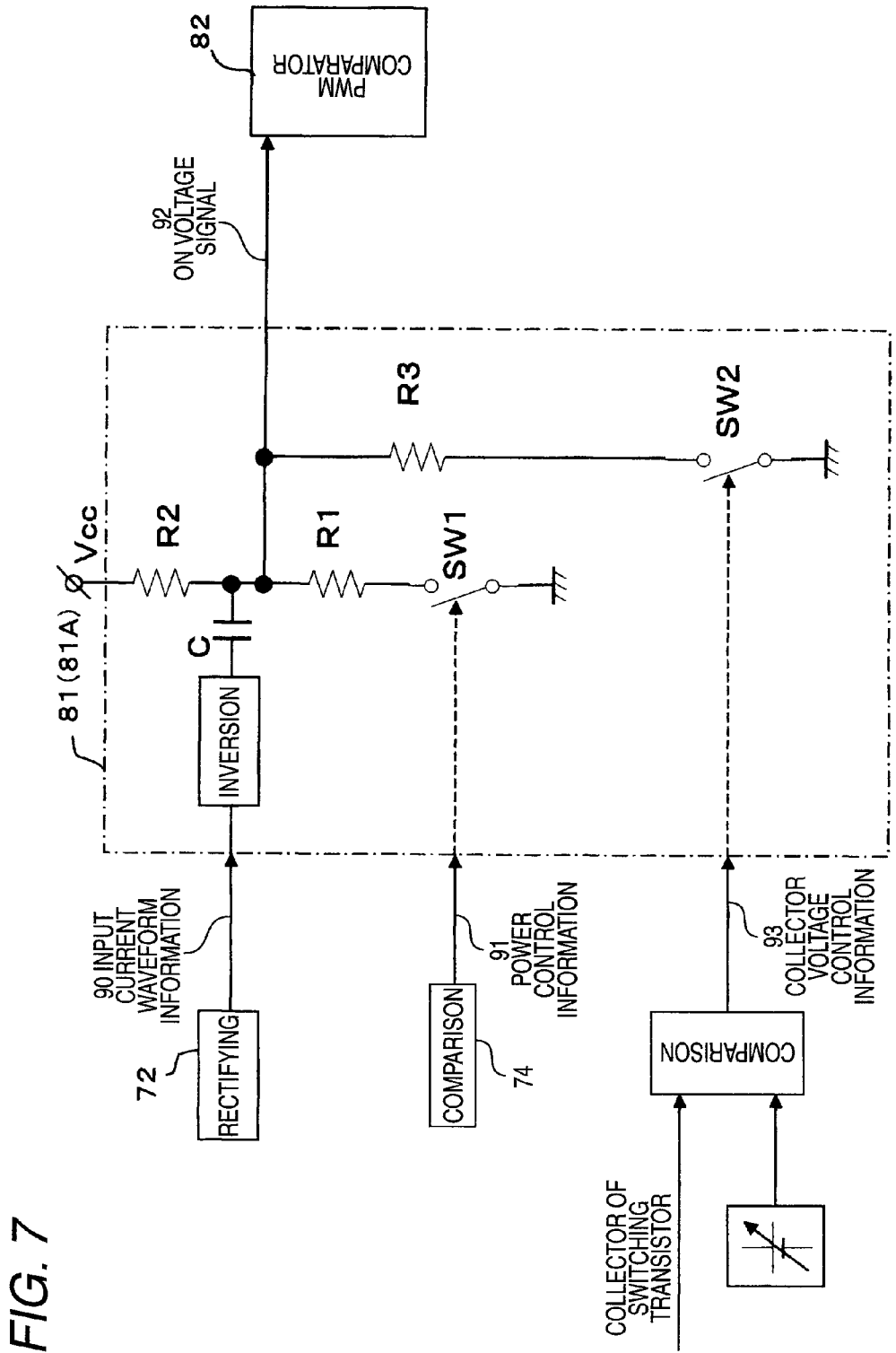
FIG. 7 is a diagram of the configuration of a mix circuit according to a sixth embodiment of the invention.

A sixth embodiment of the invention inputs collector voltage control information for controlling the collector voltage of the switching transistor 39 to a predetermined value to the mix circuit 81A, as shown in a configuration drawing of the mix circuit relating to the sixth embodiment in FIG. 7.

On/off control of SW2 is performed according to collector voltage control information 93 provided by making a comparison between the collector voltage and a reference value, as shown in FIG. 7. If the collector voltage is low, the SW2 is turned off and ON voltage information is gradually raised according to a time constant of C*R2 for widening the on width of the switching transistor. If the collector voltage is high, the SW2 is turned on and the ON voltage information is rapidly lowered according to a time constant of C*{R2*R3/(R2+R3)} for narrowing the on width of the switching transistor. That is, the circuit configuration of the mix circuit 81A is switched in response to the magnitude of the collector voltage of the switching transistor 39. Particularly, if the collector voltage is low, the time constant increases and if the collector voltage is high, the time constant decreases.

This control is effective for excessive voltage application prevention to a magnetron when the magnetron does not oscillate, namely, when the above-described power control does not function. After oscillation start of the magnetron, to invalidate the control so as not to affect power control, preferably the reference value to be compared with the collector voltage is set large as compared with that before the magnetron oscillation start.

Seventh Embodiment

Figure 8:
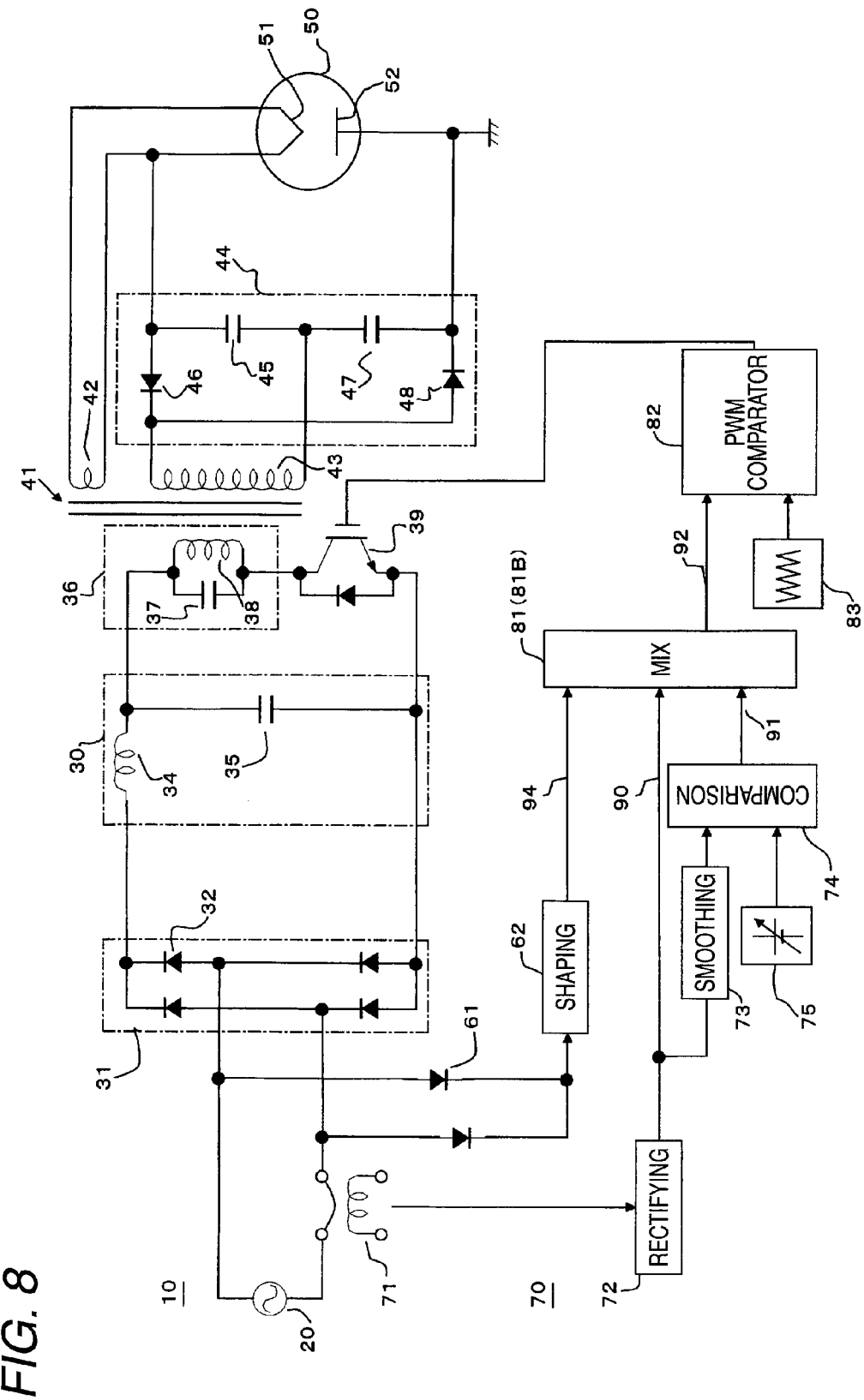
FIG. 8 is a diagram of the configuration of a power control unit for high-frequency dielectric heating according to a seventh embodiment of the invention.
Figure 9:
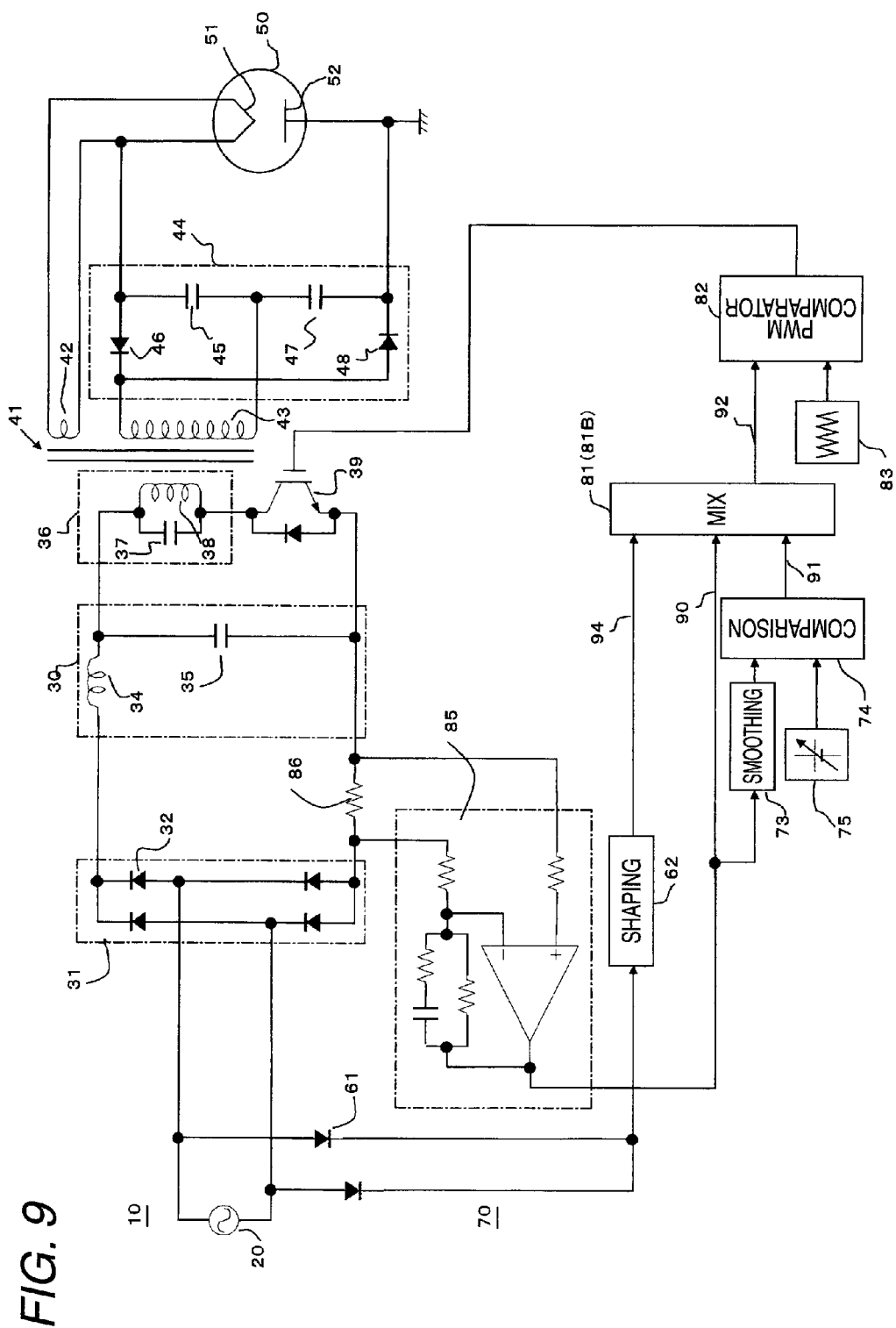
FIG. 9 is a diagram of the configuration of a power control unit for high-frequency dielectric heating having an input current detection section for detecting a unidirectional current according to a ninth embodiment of the invention.

FIG. 8 is a block diagram to describe a high-frequency heating unit according to a seventh embodiment of the invention. As shown in FIG. 8, in the embodiment, a control circuit 70 also includes an input voltage detection section made up of a pair of diodes 61 for detecting and rectifying voltage of an AC power supply 20 and a shaping circuit 62 for shaping the waveform of the rectified voltage to generate input voltage waveform information 94 in addition to the configuration of the first embodiment. Like that in FIG. 2, a current detection section of a shunt resistor 86 provided between the diode bridge type rectifying circuit 31 and the smoothing circuit 30 and an amplification circuit 85 for amplifying the voltage across the shunt resistor may make up an input current detection section and output thereof may be adopted as input current waveform information 90, as shown in FIG. 9. The shunt resistor 86 detects an input current after rectified in a single direction by the diode bridge type rectifying circuit 31.

In the embodiment, an input current waveform information detection system is simplified in such a manner that a mix circuit 81 (81B) selects the input current waveform information 90 or the input voltage waveform information 94, whichever is larger, mixes and filters the selected information and power control information 91 from a comparison circuit 74, and outputs ON voltage information 92 and a comparison is made between the ON voltage information and a sawtooth wave from a sawtooth wave generation circuit 83 in a PWM comparator 82 and pulse width modulation is performed for controlling turning on/off of a switching transistor 39 of an inverter circuit. Particularly in the embodiment, a configuration wherein the input current waveform information 90 is directly input to the mix circuit 81B is adopted.

FIG. 11 (a) shows an example of the mix circuit 81B. The mix circuit 81B has three input terminals. The power control information 91, the input current waveform information 90, and the input voltage waveform information 94 are added to the three terminals and are mixed in an internal circuit as shown in the figure.

As shown in FIG. 11 (b), a high-frequency cut filter is formed as shown in an AC equivalent circuit between the power control information 91 and output of the mix circuit 81B. Thus, the filter cuts the high frequency component contained in power control as interference with the input current waveform information to shape the input current waveform.

On the other hand, as shown in FIG. 11 (c), a low-frequency cut filter is formed as shown in an AC equivalent circuit between the input current waveform information 90 and the input voltage waveform information 94 and output of the mix circuit 81B. Therefore, the power control information 91 is converted into a DC component of output of the mix circuit 81B and the input current waveform information 90 and the input voltage waveform information 94 are converted into an AC component.

Therefore, the power control information 91 is converted into a DC component of output of the mix circuit 81B and the input current waveform information and the input voltage waveform information are converted into an AC component.

The seventh embodiment thus selects the input current waveform information 90 or the input voltage waveform information 94, whichever is larger, and converts the selected information into an on/off drive signal of the switching transistor 39 of the inverter circuit for use. Generally, a PWM inverter used with a microwave oven, etc., is known; a commercial AC power supply of 50 to 60 cycles is rectified to DC, the provided DC power supply is converted into a high frequency of about 20 to 50 kHz, for example, by the inverter, the raised high frequency is raised with a step-up transformer, and high voltage further rectified by a voltage multiplying rectifier is applied to a magnetron.

Figure 12A:
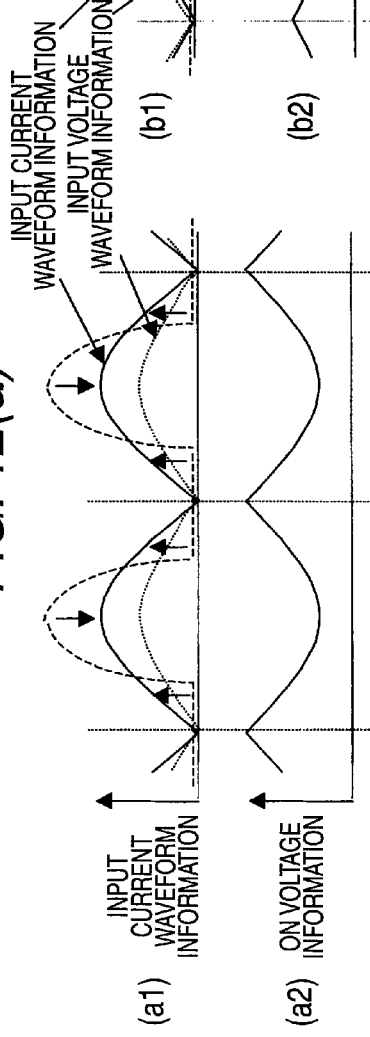
FIG. 12 is a drawing to show basic waveforms of sections of the power control unit for high-frequency dielectric heating shown in FIG. 8.
Figure 12B:
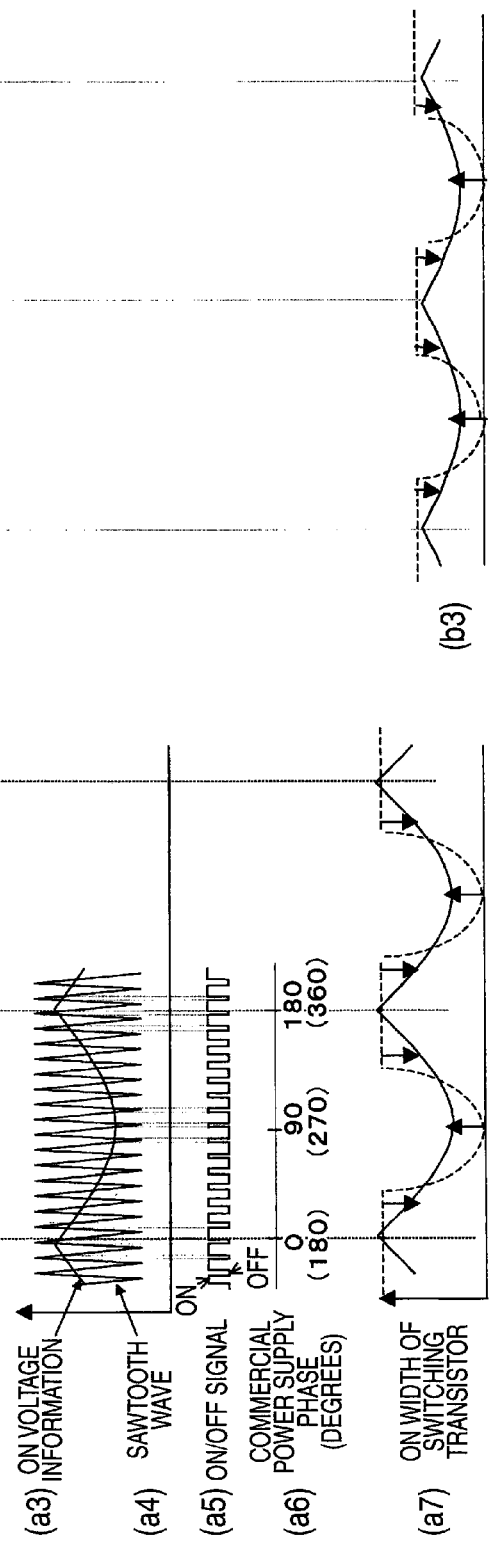

FIG. 12 is a drawing to describe waveforms provided according to the seventh embodiment of the invention. This example is when the magnetron normally oscillates, namely, a situation at the normal running time; the input current waveform information and the input voltage waveform information are converted into an on/off drive signal of the switching transistor 39 for use.

FIG. 12 is a drawing to describe waveforms provided according to the seventh embodiment of the invention; FIG. 12 (a) shows the case where input current is large and FIG. 12 (b) shows the case where input current is small. To obtain the on/off drive signal of the switching transistor 39, the current waveform is selected in FIG. 12 (a) and the voltage waveform (dotted line) is selected in FIG. 12 (b). The solid line represents the signal shape after correction by a power control unit of the invention mainly used in the description to follow and the dashed line represents the signal shape of instantaneously fluctuating output before correction from the AC power supply 20, as described later. The dotted line represents the input voltage waveform information.

In FIG. 12 (a), the waveform of input current waveform information in (a1) at the top is the input current waveform information 90 output by the rectifying circuit 72 in FIG. 8 and output by the amplifier 85 in FIG. 10, and the dashed line indicates the waveform before correction caused by the nonlinear load characteristic of the magnetron. The waveform of input voltage waveform information in (a1) is the input voltage waveform information 94 output from the rectifying circuit 62. The waveform in (a2) of FIG. 12 (a) is the ON voltage information 92 of correction output of the mix circuit 81B; the ON voltage information 92 changes in size following the input current waveform information 90, the input voltage waveform information 94, and the power control information 91 and further is output as an inverted waveform of (a1) to make complementary, correction of the distortion component of the input current.

(a3) of FIG. 12 (a) shows ON voltage information equivalent to the ON voltage information 92 shown in (a2) and the PWM comparator 82 makes a comparison between the ON voltage information and a sawtooth wave from the sawtooth wave generation circuit 83 for modulation shown in (a4) to generate a PWM signal of an on/off signal of the switching transistor 39. That is, as shown in the figure, the ON voltage information 92 in (a3) as a PWM command signal and the sawtooth wave in (a4) are input to the PWM comparator 82 for making a comparison therebetween and on time modulation of a pulse is executed with the time period over which the sawtooth wave and the ON voltage information 92 cross each other as the pulse width of the on time. In the portion where the amplitude value of the command signal (ON voltage information) 92 is large (in the proximity of 0 degrees, 180 degrees, where the input current is small), the time period crossing with the sawtooth wave is also large and thus the on time becomes long and the pulse width widens and correction is made to the polarity for raising the input current. In the portion where the amplitude value of the ON voltage information 92 is small (in the proximity of 90 degrees, 270 degrees, where the input current is large), the time period crossing with the sawtooth wave is also small and thus the on time becomes short and the pulse width also narrows and correction is made to the polarity for lowering the input current, namely, a pulse string of the on and off time periods as in (a5) is output as PWM signal. That is, since the ON voltage information (a2) is inverted as a correction waveform relative to the input current waveform information and the input voltage waveform information (a1), the on time is shortened like the pulse string signal in (a4) in the portion where the input of the input current waveform information and the input voltage waveform information (a1) is large (in the proximity of 90 degrees, 270 degrees) and the on time is prolonged in the portion where the input of the input current waveform information and the input voltage waveform information (a1) is small (in the zero cross proximity of 0 degrees, 180 degrees) for conversion to inversion output opposite to (a1). Accordingly, the correction effect of the input waveform is provided; particularly the effect is large in the zero cross proximity.

The waveform in (a7) at the bottom shows the ON width of the switching transistor 39. The ON voltage information (a3) of the correction waveform provided by inverting the 50-Hz (or 60-Hz) input current waveform information and input voltage waveform information shown in (a1) is compared with the high-frequency sawtooth wave in (a4), whereby the input current waveform information is converted into a high frequency of 20 kHz to 50 kHz, etc., by the inverter to generate the on/off signal in (a5). The switching transistor 39 is driven in response to the on/off signal (a5) and high frequency power is input to the primary side of the step-up transformer and raised high voltage is generated on the secondary side of the step-up transformer. To visualize how the on time of each pulse of the on/off signal (a5) changes within the period of commercial power supply, (a7) plots the on time information on the Y axis and connects the points.

In the description given above, the same signal as the state in which the input current from the AC power supply 20 is obtained in an ideal state (for example, sine wave) is shown. However, generally the input current from the AC power supply 20 is alienated from the ideal sine wave and fluctuates when viewed instantaneously. The dashed-line signal indicates such an actual state. As indicated by the dashed line, generally the actual signal is alienated from the state of the ideal signal and instantaneous fluctuation occurs even if it is viewed in the instantaneous time period of the half period of the commercial power supply (0 to 180 degrees). Such a signal shape occurs due to the voltage raising action of the transformer and the voltage doubler circuit, the smooth characteristic of the voltage doubler circuit, the magnetron characteristic that an anode current flows only when the voltage is ebm or more, etc. That is, it can be said that it is inevitable fluctuation in the inverter circuit for the magnetron.

In the power control unit of the invention, the input current detection section provides the input current waveform information (see (a1)) indicated by the dashed line reflecting the fluctuation state of the input current and if the input current waveform information is selected (FIG. 12 (a)), the later control is performed based on the input current waveform information (the input current fluctuation is independent of the input voltage waveform information and therefore the description of the input voltage waveform information is skipped). The control is performed so that the instantaneous fluctuation of the input current waveform information occurring in the period like a half period, for example, is suppressed so as to approach the ideal signal as indicated by the arrow. The suppression is accomplished by adjusting the drive signal of the switching transistor 39. Specifically, if the input current waveform information is smaller than the ideal signal, the above-described on time is made longer and the pulse width is made wider. If the input current waveform information is larger than the ideal signal, the above-described on time is made shorter and the pulse width is made narrower. Also in the instantaneous fluctuation in a further shorter time period, the fluctuating waveform is reflected on the on time information and a correction is made in a similar manner to that described above.

Correction as indicated by the arrow is made to the input current waveform information by the instantaneous fluctuation suppression action of the switching transistor 39 to which a drive signal is given, and input close to the ideal wave is given to the magnetron at all times. Illustration of (a3) and (a5) after the correction is omitted. The above-mentioned ideal signal is a virtual signal; this signal becomes a sine wave.

That is, in a short time period like a half period of the commercial power supply, the sum total of instantaneous errors between the ideal signal waveform and the input current waveform information or the correction amounts is roughly zero because the magnitude of the input current is controlled by any other means (power control). Since the portion where the input current does not flow because of nonlinear load is corrected in a direction in which the input current is allowed to flow, the portion where the input current is large is decreased so that roughly zero holds true. Even for the nonlinear load, a correction is made as if the current waveform were assumed to be linear load and the voltage waveform of the commercial power supply is a sine wave and thus the ideal waveform becomes a sine wave like the current waveform flowing into linear load.

Thus, the input current is corrected at the opposite polarity to the waveform so as to cancel out change in the input current waveform and excess and deficiency with respect to the ideal waveform. Therefore, rapid current change in the commercial power supply period caused by nonlinear load of the magnetron, namely, distortion is canceled out in the control loop and input current waveform shaping is performed.

Further, the control loop thus operates based on the input current waveform information following the instantaneous value of the input current, so that if there are variations in the types and the characteristics of magnetrons or if there is ebm (anode-cathode voltage) fluctuation caused by the temperature of the anode of the magnetron and the load in the microwave oven and further if there is power supply voltage fluctuation, input current waveform shaping not affected by them can be performed.

Particularly in the invention, the switching transistor is controlled based on the instantaneously fluctuating input current waveform information. The instantaneous fluctuation of the input current is input directly to the mix circuit 81B in the form of the input current waveform information and is also reflected on the ON voltage information, so that the drive signal of the switching transistor excellent in suppression of the input current waveform distortion and follow up of the instantaneous fluctuation can be provided.

In the invention, the input current waveform information or the input voltage waveform information having such information to suppress distortion and the instantaneous fluctuation of the input current waveform is converted into the drive signal of the switching transistor of the inverter circuit. To accomplish the object, the power control information 91 is not particularly indispensable, because the power control information 91 is information to control power fluctuation in a long time period, namely, in a period longer than the commercial power supply period or so and is not information to correct the instantaneous fluctuation in a short period like a half period of AC intended by the invention. Therefore, adoption of the mix circuit 81B and the PWM comparator 82 is also only one example of the embodiment and components corresponding to the selection section at least for selecting the input current waveform information or the input voltage waveform information, whichever is larger, as the mix circuit 81B and the conversion section for converting the information into the drive signal of the switching transistor as the PWM comparator 82 may exist between the input current detection section and the switching transistor.

To use the power control information, it is not indispensable either to input the power control information 91 for controlling so that the output of the input current detection section becomes a predetermined value to the mix circuit 81B as in the above-described embodiment. That is, in the above-described embodiment, the power control information 91 originates from the current detection section 71 and the rectifying circuit 72 (FIG. 1) or the shunt resistor 86 and the amplification circuit 85 (FIG. 2) for detecting an input current; information for controlling so that the current or the voltage at any desired point of the inverter circuit 10 becomes a predetermined value can be input to the mix circuit 81B as the power control information. For example, information from the collector of the switching transistor 39 can be input to the comparison circuit 74 as it is or after it is smoothed through a smoothing circuit 73, and information after subjected to a comparison with the output setting signal in the comparison circuit 74 can be used as the power control information.

Next, FIG. 12 (b) shows waveform comparison when the input current is small with respect to FIG. 12 (a); (b1) shows input current waveform information when the input is small and corresponds to (a1) of FIG. 12 (a), (b2) shows ON voltage information and corresponds to (a2) of FIG. 12 (a), and (b3) shows the on width of the switching transistor and corresponds to (a7). Although not shown, the comparison processing with a sawtooth wave shown in (a3), (a4), (a5), and (a6) of FIG. 12 (a) is also performed in FIG. 12 (b) in the same manner, of course.

If the input current is comparatively small and the value of the input current waveform information also becomes small as in FIG. 12 (b), the waveform shaping capability of the input current is degraded. Then, in the invention, if the input voltage waveform information (dotted line) is larger than the input current waveform information as in FIG. 12 (b), the input voltage waveform information is used for waveform shaping. In the embodiment, the input voltage is attenuated to generate input voltage waveform information and the input current is converted into a voltage to generate input current waveform information, whereby a direct size comparison can be made between the input current waveform information and the input voltage waveform information.

Thus, when the input current is controlled small, the input current waveform information becomes small and the input current waveform shaping capability is degraded. However, the input voltage waveform information larger than the current waveform is selected and input current waveform shaping is performed, so that degradation of the input current waveform shaping capability is suppressed. Therefore, if the input current is small, drastic lowering of the power factor can also be prevented. The amplitude of the input voltage waveform information (threshold value to determine whether or not the input current is small) can be realized by setting the attenuation rate from the commercial power supply voltage waveform (voltage division ratio) so that the amplitude becomes about the amplitude of the input current waveform information at the time of 50% to 20%, for example, of the maximum input current.

The description given above with reference to FIG. 12 is a description concerning the normal running time of the magnetron. Next, the action at the starting time of the magnetron will be discussed. The starting time refers to a state of the preparation stage before the magnetron starts to oscillate although a voltage is applied to the magnetron (corresponding to non-oscillation time). At this time, the impedance between the anode and the cathode of the magnetron becomes equal to infinity unlike that at the stationary running time.

By the way, in the invention, the voltage from the commercial AC power supply 20 is multiplied by the ON voltage information, namely, the commercial power supply voltage is amplitude-modulated according to the ON voltage information and is applied to the primary side of the transformer 41. The peak value of the applied voltage to the primary side relates to the applied voltage to the magnetron and the area defined by the applied voltage and the elapsed time relates to the supplied power to the heater.

In the invention, at the starting time at which the input current waveform information 90 is small, the input voltage waveform information 94 is also input to the mix circuit 81B. That is, the input voltage makes up for a shortage of the input current as a reference signal particularly at the starting time.

FIG. 13 is a drawing to make a comparison description between the operation when the input voltage waveform information is added and that when the input voltage waveform information is not added. FIG. 13 (a) shows the waveforms of ON voltage information, the applied voltage to the primary side of the transformer, the applied voltage to the magnetron, and heater input power when the input voltage waveform information is not added (at the stationary running time) from the top to the bottom.

FIG. 13 (b) describes the operation when the input voltage waveform information is added (at the starting time). FIG. 13 (a) and FIG. 13 (b) show the case where the peak value of the applied voltage to the primary side of the transformer is limited according to the configuration of a sixth embodiment, etc., described later. Further, in FIG. 13 (b), the peaks of the applied voltage to the primary side of the transformer and the applied voltage to the magnetron are suppressed by the action of the added input voltage waveform information and the waveforms show trapezoids. Like FIG. 13 (a), FIG. 13 (b) also shows the waveforms of ON voltage information, the applied voltage to the primary side of the transformer, the applied voltage to the magnetron, and heater input power from the top to the bottom.

As shown in FIG. 12, the on width of the switching transistor is large in the vicinity of phase 0 degrees, 180 degrees and thus the applied voltage to the primary side of the transformer and the applied voltage to the magnetron become comparatively large amplification widths. On the other hand, the on width of the switching transistor is small in the vicinity of phase 90 degrees, 270 degrees and thus the amplification width is comparatively suppressed and the whole drawing of the waveform becomes a trapezoid as a shape of suppressing the peak from the relative relationship with the amplification width at phase 0 degrees, 180 degrees.

Making a comparison between the applied voltages to the magnetron in FIG. 13 (a) and FIG. 13 (b), for the heater input powers when the applied voltages to the magnetron are the same, the heater input power in FIG. 13 (b) grows more than that in FIG. 13 (a) and the waveform area becomes large, so that the heater is heated in a short time and it is made possible to shorten the starting time.

Figure 14:
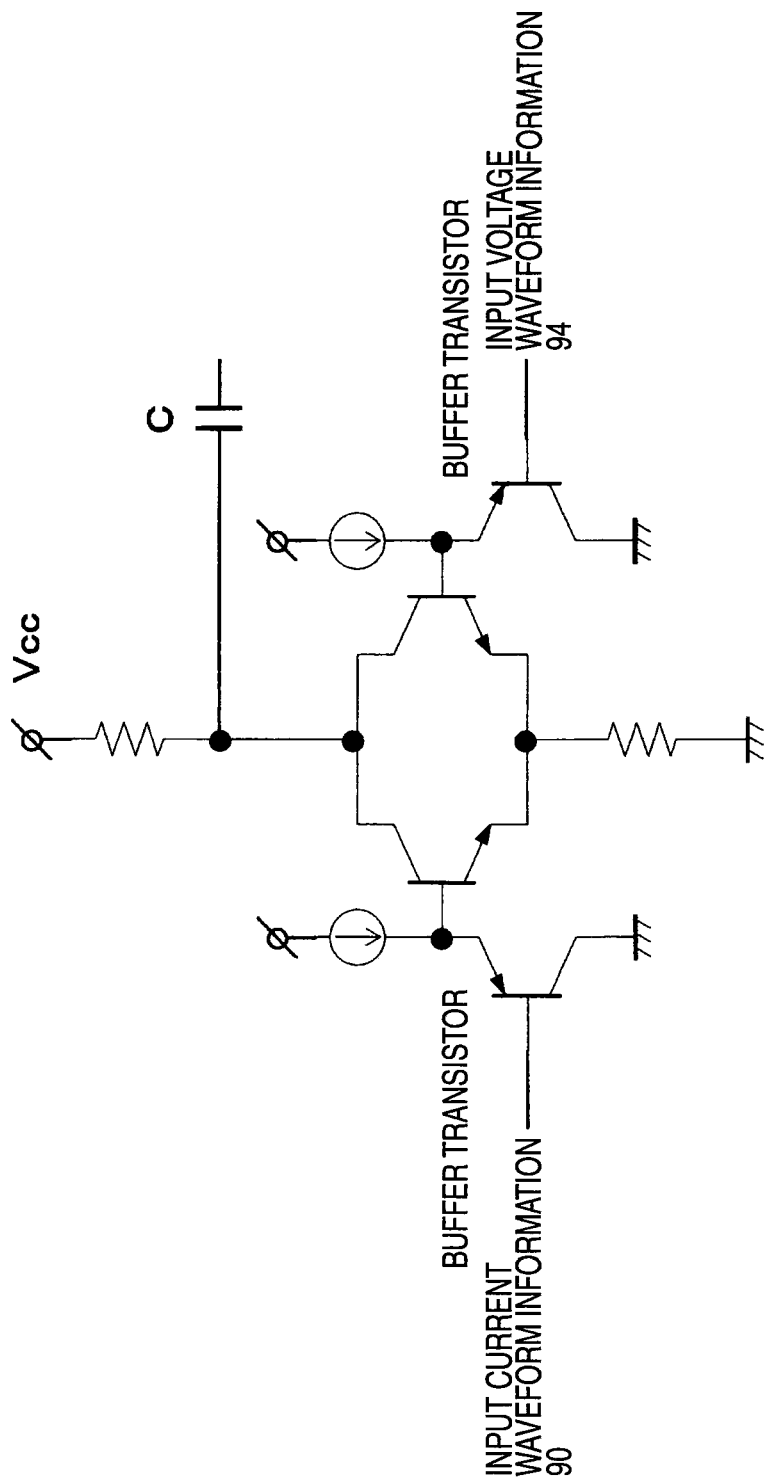
FIG. 14 is a circuit diagram to show one example of a comparison and selection circuit shown in FIG. 11.
Figure 16B:
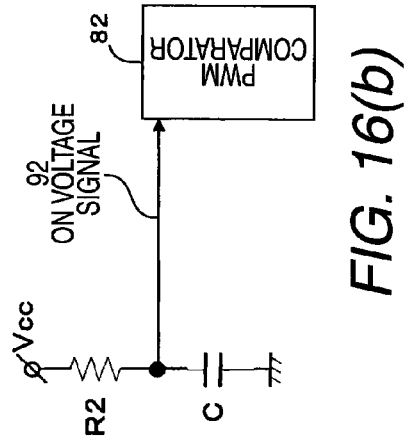
FIG. 16 is a diagram of the configuration of a mix circuit according to an eleventh embodiment of the invention.
Figure 16C:
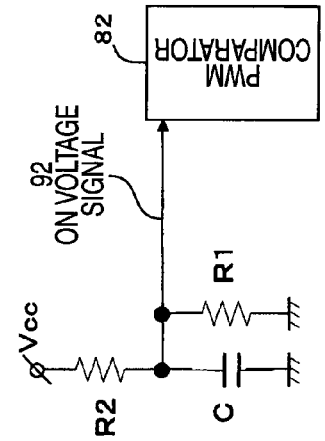
Figure 16A:
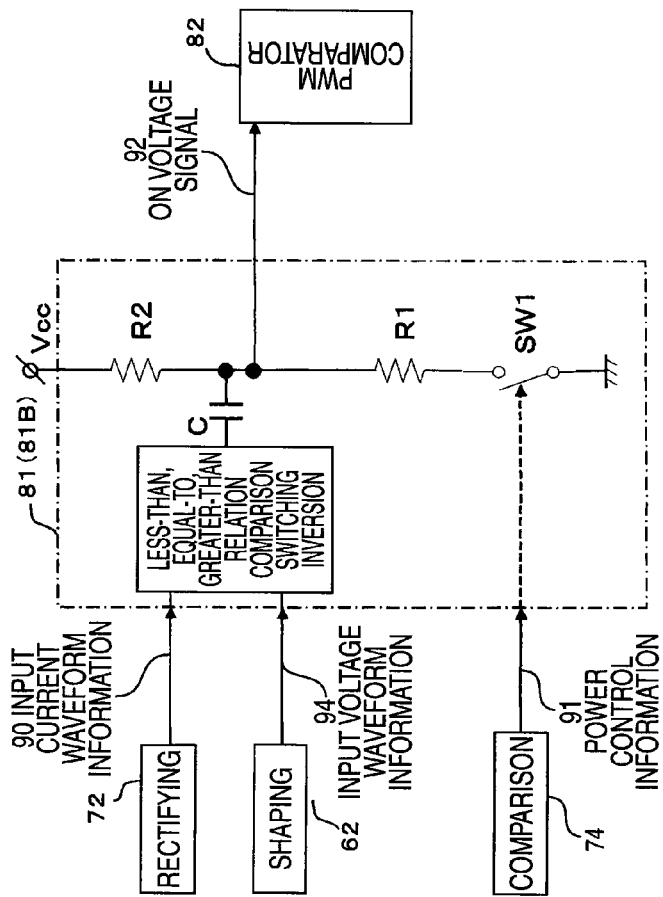
Figure 17:
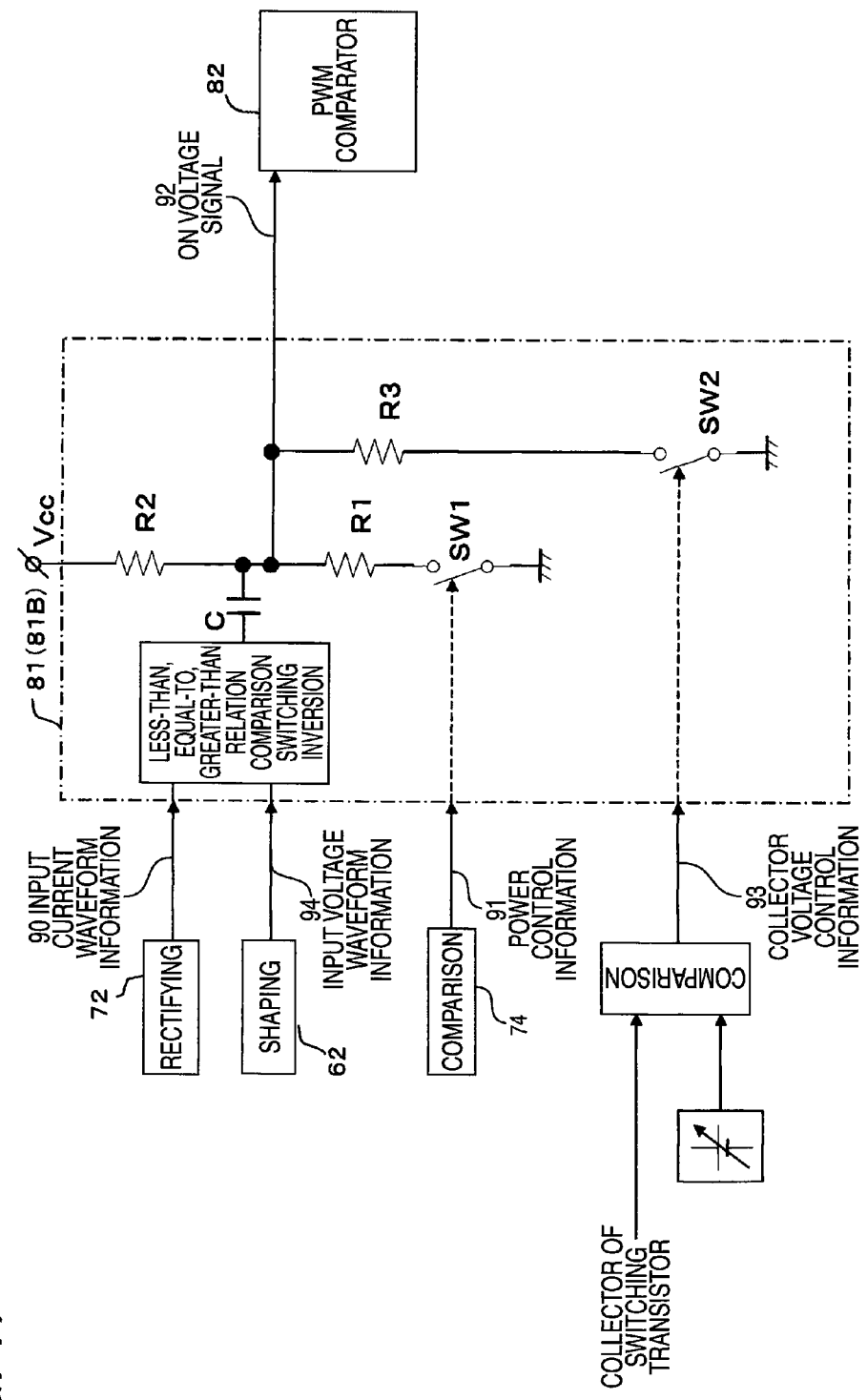
FIG. 17 is a diagram of the configuration of a mix circuit according to a twelfth embodiment of the invention.

FIG. 14 is a drawing to show one example of a comparison and inversion circuit (comparison and selection circuit; less-than, equal-to, greater-than relation comparison, switching, and inversion circuit) for selecting and inverting the input current waveform information or the input voltage waveform information, whichever is larger, used for the seventh embodiment of the invention. The comparison and inversion circuit is provided in the mix circuit 81B as shown in FIGS. 11, 16, and 17.

The input current waveform information 90 and the input voltage waveform information 94 are input to buffer transistors and outputs from the buffer transistors are input to two transistors with a common emitter resistor and a common collector resistor. The buffer transistors are provided for preventing interference between the input current waveform information 90 and the input voltage waveform information 94. The larger input signal is selected from the diode characteristic of the transistor and is output to the common connection point of the common emitter resistor to the two transistors and the transistor to which the selected signal is input is brought into conduction. The emitter current and the collector current of the transistor brought into conduction reflect the magnitude of the input signal. The magnitude of the collector current is reflected on the potential of the common connection point of the common collector resistor.

If the emitter voltage becomes high, the collector current becomes large and the voltage drop of the common collector resistor becomes large, namely, the collector voltage lowers and thus the polarity of the collector voltage is inverted relative to the input signal. The conversion coefficient of the signal also changes with the resistance value ratio between the collector resistor and the emitter resistor. From the viewpoint of interference with the power control signal, it is more effective to execute impedance conversion of the signal at the common collector connection point through buffer and connect it to the following capacitor. Thus, in the circuit, magnitude determination of the two signals and selection are automatically performed and the selected signal is inverted and output.

Eighth Embodiment

Next, an eighth embodiment of the invention will be discussed with reference to the accompanying drawing. The eighth embodiment of the invention relates to the configuration of a control circuit for selecting a signal of input current waveform information or input voltage waveform information, whichever is larger, mixes and filters the selected signal and power control information from a comparison circuit 74, and converts the result into an on/off drive signal of a switching transistor 39 of an inverter circuit for use.

In the eighth embodiment, the gain variable amplifier 291, the inversion and waveform processing circuit 263, the waveform error detection circuit 292, and the like in FIG. 32 are omitted as shown in FIG. 8, so that drastic reduction is realized and simplification and miniaturization can be accomplished. Further, the starting time can be shortened according to the simple configuration and a safety measure for preventing excessive voltage application to a magnetron anode 52 is also added, so that the reliability of the products improves.

As the circuitry is thus configured, a control loop using input current waveform information 90 is specialized for waveform shaping of input current, a control loop using power control information 91 is specialized for power control, the mutual controls do not interfere with each other, and the conversion efficiency is held.

Nine Embodiment

A ninth embodiment of the invention relates to an input current detection section. As shown in FIG. 8, it detects the input current to the inverter circuit with a CT 71, etc., and rectifies and outputs by a rectifying circuit 72. In this configuration, since the input current is detected using the CT, etc., a large signal can be taken out while the insulating property is held, so that the effect of input current waveform shaping is large and the quality of the input current improves.

In an example shown in FIG. 9, the input current detection section detects the unidirectional current after rectified by a rectifying circuit 31 of an inverter circuit through a shunt resistor 86 placed between the rectifying circuit 31 and a smoothing circuit 30, and amplifies the voltage occurring across the shunt resistor by an amplification circuit (amplifier) 85, and outputs the voltage. This configuration has the advantage that the input current detection section can be configured at a low cost because the detection section need not be insulated from electronic circuitry and rectification need not be performed either.

As shown in FIG. 9, the amplification circuit 85 of the input current detection section is configured so as to attenuate the high-order frequency portion of the commercial power supply and the high-frequency portion of high-frequency switching frequency, etc., for preventing unnecessary resonance. Specifically, as shown in a detailed drawing of the input current detection section in FIG. 3, the amplification circuit 85 attenuates the high-order frequency portion of the commercial power supply and the high-frequency portion of high-frequency switching frequency, etc., using a high cutting capacitor as in FIG. 10 (a).

Figure 15:
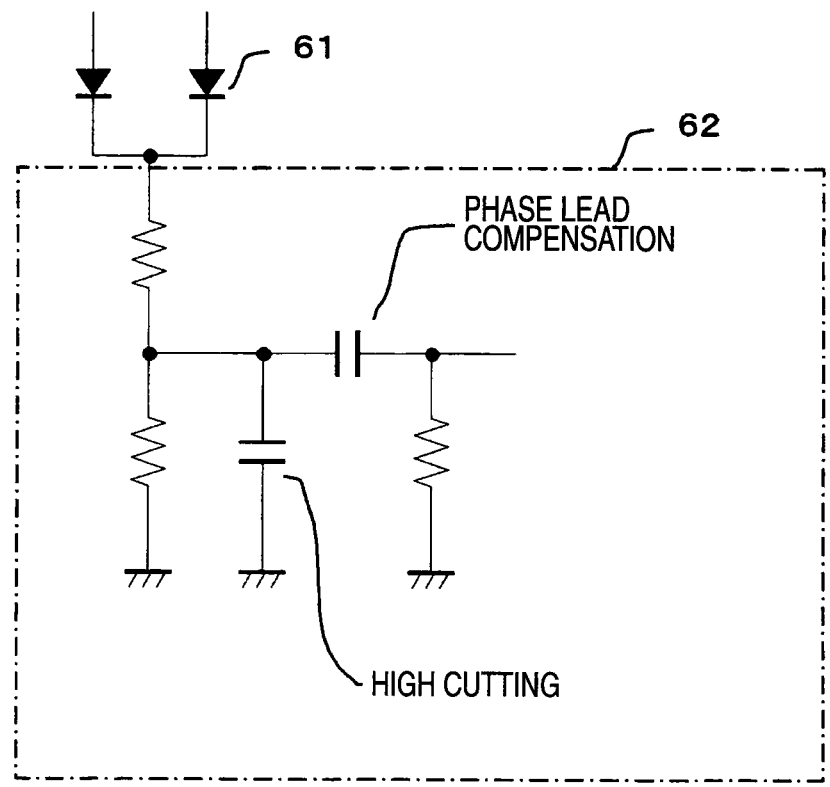
FIG. 15 is a detailed circuit diagram of a shaping circuit shown in FIG. 8.

Further, as the high cutting capacitor of the amplification circuit 85 is inserted, for an occurring time delay, a resistor is inserted in series with the capacitor, phase lead compensation is added, an excessive time delay is prevented, and the stability of a control loop is ensured, as shown in a phase characteristic drawing of FIG. 10 (b). Also in a shaping circuit 62 in FIG. 8, a configuration for attenuating the high frequency portion (parallel insertion of capacitor) and a configuration for adding phase lead compensation (series insertion of capacitor) for preventing an excessive time delay can be used as shown in FIG. 15.

Tenth Embodiment

A tenth embodiment of the invention relates to a mix circuit 81B, which is provided with three terminals for inputting input current waveform information 90, input voltage waveform information 94, and power control information 91, as shown in FIG. 11 (a). The input current waveform information 90 and the input voltage waveform information 94 are input to a comparison and inversion circuit as shown in FIG. 14 and are subjected to comparison and inversion processing. The signal provided by performing the processing and the power control information 91 are input to a filter circuit made up of C, R1, and R2 and are filtered and then the result is output to a PWM comparator 82 as ON voltage information 92. The filter circuit cuts the high component of the power control information 91, as shown in an equivalent circuit diagram of FIG. 11 (b). In so doing, the component hindering input current waveform shaping is cut, so that the quality of the input current waveform improves. On the other hand, a low cutting filter is formed for the input current waveform information 90 and the input voltage waveform information 94 to provide waveform integrity, as shown in an equivalent circuit diagram of FIG. 11 (c).

Eleventh Embodiment

In an eleventh embodiment of the invention, the characteristic of a mix circuit 81B for mixing input current waveform information 90 of an input current detection section, input voltage waveform information 94 of the input current detection section, and power control information 91 for controlling so that output of the input current detection section becomes a predetermined value is controlled by providing a difference between the input current increase control time and the decrease control time. FIG. 16 is a diagram of the configuration of the mix circuit of the eleventh embodiment.

In a configuration drawing of FIG. 16 (a), SW1 is turned on/off according to the power control information 91 for lowering/raising ON voltage information 92. At the input current increase control time, the SW1 is turned off and the ON voltage information is gradually raised according to a time constant of C*R2 for widening the on width of a switching transistor, as shown in an equivalent circuit of FIG. 16 (b).

At the input current decrease control time, the SW1 is turned on and the ON voltage information is rapidly lowered according to a time constant of C*{R1*R2/(R1+R2)} for narrowing the on width of the switching transistor, as shown in an equivalent circuit of FIG. 16 (c). That is, the circuit configuration of the mix circuit 81B is switched between the input current increase control time and the input current decrease control time. Particularly, at the input current increase control time, the time constant is set large and at the input current decrease control time, the time constant is set small.

Such a difference is provided, whereby a control characteristic for making a gentle response at the normal time and a control characteristic for making a rapid response for decreasing the input current to prevent parts destruction, etc., if the input current excessively rises for some reason can be implemented. The stability of a control characteristic for the nonlinear load of a magnetron is also secured.

Twelfth Embodiment

A twelfth embodiment of the invention inputs collector voltage control information for controlling the collector voltage of the switching transistor 39 to a predetermined value to the mix circuit 81B, as shown in a configuration drawing of the mix circuit relating to the twelfth embodiment in FIG. 17.

On/off control of SW2 is performed according to collector voltage control information 93 provided by making a comparison between the collector voltage and a reference value, as shown in FIG. 17. If the collector voltage is low, the SW2 is turned off and ON voltage information is gradually raised according to a time constant of C*R2 for widening the on width of the switching transistor. If the collector voltage is high, the SW2 is turned on and the ON voltage information is rapidly lowered according to a time constant of C*{R2*R3/(R2+R3)} for narrowing the on width of the switching transistor. That is, the circuit configuration of the mix circuit 81B is switched in response to the magnitude of the collector voltage of the switching transistor 39. Particularly, if the collector voltage is low, the time constant increases and if the collector voltage is high, the time constant decreases.

This control is effective for excessive voltage application prevention to a magnetron when the magnetron does not oscillate, namely, when the above-described power control does not function. After oscillation start of the magnetron, to invalidate the control so as not to affect power control, preferably the reference value to be compared with the collector voltage is set large as compared with that before the magnetron oscillation start.

Thirteenth Embodiment

Figure 18:
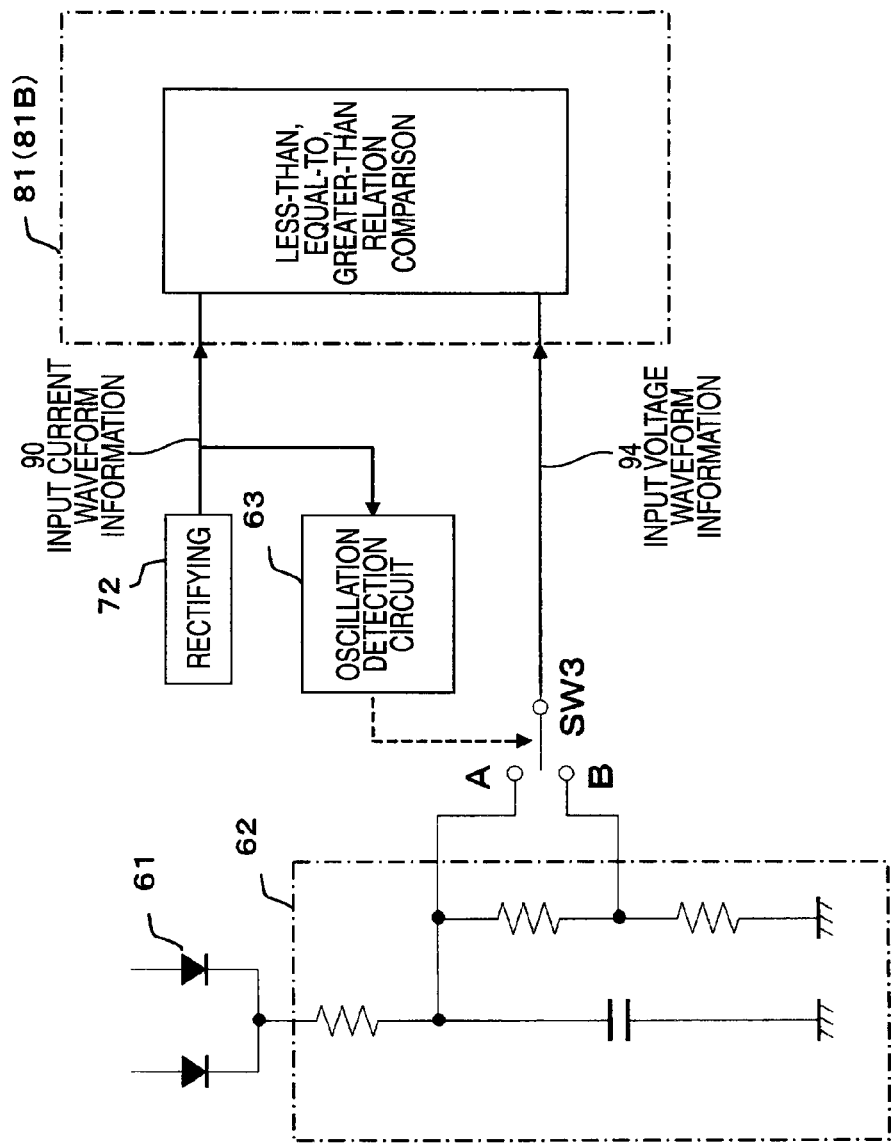
FIG. 18 is a drawing to show a switching circuit of input voltage waveform information according to a thirteenth embodiment of the invention.

A thirteenth embodiment of the invention shown in FIG. 18 adopts a configuration for switching the addition amount of input voltage waveform information to input current waveform information before and after oscillation of a magnetron. In the thirteenth embodiment, a changeover switch SW3 is provided between the shaping circuit 62 and the mix circuit 81B in FIG. 8 and an oscillation detection circuit 63 for detecting oscillation start of the magnetron from output of a rectifying circuit 72 is also provided. The connection point of the changeover switch SW3 with the shaping circuit 62 is switched between A and B according to the output of the oscillation detection circuit 63. The shaping circuit 62 is provided with three voltage dividing resistors connected in series between a diode and ground for dividing and outputting power supply voltage information from commercial power supply voltage. The power supply voltage information at the connection point A nearer to a commercial power supply 20 is large because the attenuation amount from the commercial power supply voltage is small as compared with the connection point B near to the ground. A capacitor provided in the shaping circuit 62 suppresses entry of noise into the power supply voltage information from the commercial power supply.

At the starting time of the magnetron (corresponding to non-oscillation time), the impedance between the anode and the cathode of the magnetron becomes equal to infinity unlike that at the stationary running time. Since such a difference between the stationary running time and the starting time affects the state of input current through a transformer 41, the oscillation detection circuit 63 can determine whether or not the magnetron is at the starting time from the current value obtained from the rectifying circuit 72.

When the magnetron being started is detected from the output of the oscillation detection circuit 63, the SW3 is switched to the position of the connection point A. In this case, a larger signal (input voltage waveform information) is input to the mix circuit 81B and the starting time is shortened as compared with switching to the position of the connection point B as described above.

When the oscillation start is detected by the oscillation detection circuit 63, the SW3 is switched to the position of the connection point B and the signal is attenuated and thus input current waveform shaping when the input current is large is not hindered and the power factor when the input current is small is improved. Thus, the amplitude switching means of the power supply voltage information before and after the oscillation start of the magnetron is included, whereby if the amplitude of the power supply voltage information after the oscillation start is set to the same as that when no amplitude switching means is included, the amplitude before the oscillation start can be set large, so that the effect of shortening the starting time described above becomes larger.

The oscillation detection circuit includes a configuration using the characteristic that when the magnetron starts to oscillate, the input current increases, for example, for comparing output of an input current detection section with an oscillation detection threshold level by a comparator, etc., and latching the output of the comparator, or the like.

Fourteenth Embodiment

Figure 19:
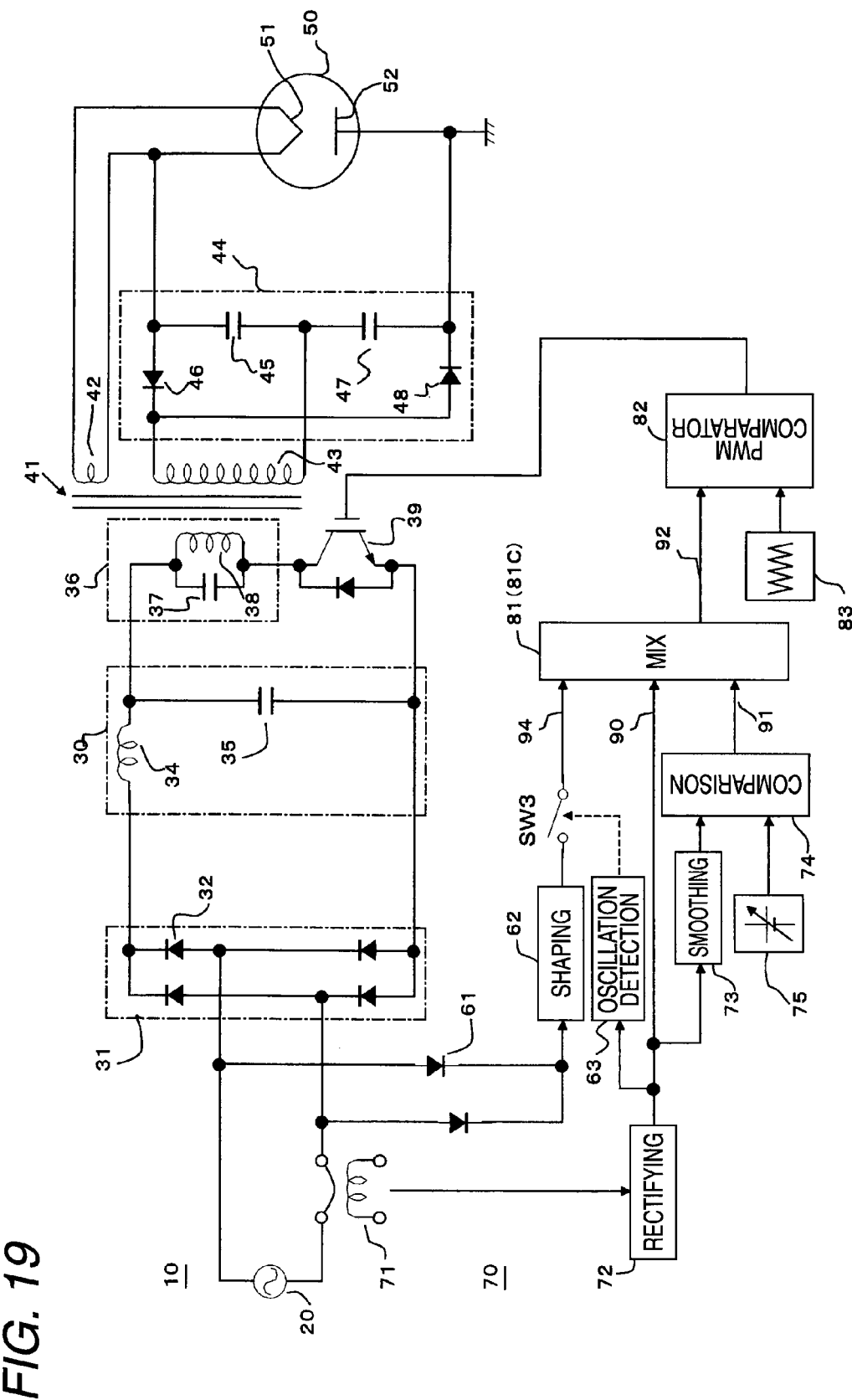
FIG. 19 is a diagram of the configuration of a power control unit for high-frequency dielectric heating according to a fourteenth embodiment of the invention.

FIG. 19 is a block diagram to describe a high-frequency heating unit according to a fourteenth embodiment of the invention. As shown in FIG. 19, in the embodiment, a control circuit 70 includes an oscillation detection circuit 63 for forming an oscillation detection section for detecting whether or not an electric current signal provided by a rectifying circuit 72 is at a predetermined level or whether or not a magnetron is oscillated in addition to the components of the second embodiment. The oscillation detection circuit 63 detects the magnetron starting to oscillate according to the level of the electric current signal and classifies the time before the detection as a non-oscillation state and the time after the detection as an oscillation state with the detection time as a boundary. If the oscillation detection circuit 63 determines that the state is non-oscillation, it turns on a changeover switch SW3 placed between a shaping circuit 62 and a mix circuit 81 (81C). In other words, the changeover switch SW3 allows an input voltage detection section to output input voltage waveform information 94 until the oscillation detection circuit 63 detects oscillation of a magnetron 50. It should be noted that although the magnetron repeats oscillation and non-oscillation matching the period of the commercial power supply still after the oscillation start of the magnetron, turning on the changeover switch SW3 based on the non-oscillation mentioned here, namely, the non-oscillation after the oscillation start is not involved in the invention.

Figure 20:
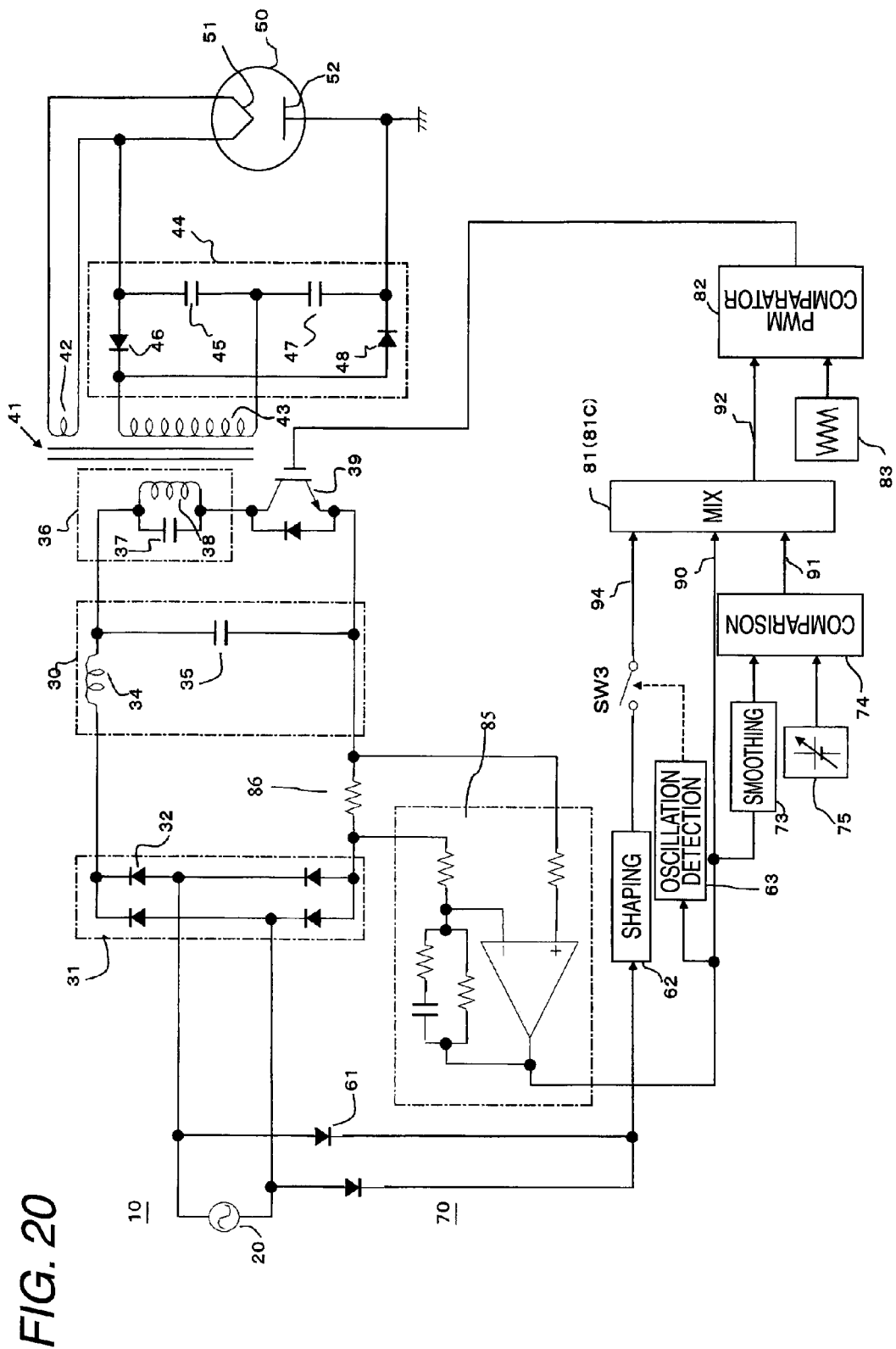
FIG. 20 is a diagram of the configuration of a power control unit for high-frequency dielectric heating having an input current detection section according to a sixteenth of the invention.

Like that in FIG. 2, FIG. 9, a current detection section of a shunt resistor 86 provided between a diode bridge type rectifying circuit 31 and a smoothing circuit 30 and an amplification circuit 85 for amplifying the voltage across the shunt resistor may make up an input current detection section and output thereof may be adopted as input current waveform information 90, as shown in FIG. 20. The shunt resistor 86 detects an input current after rectified in a single direction by the diode bridge type rectifying circuit 31.

In the embodiment, an input current waveform information detection system is simplified in such a manner that the input current waveform information 90, power control information 91 from a comparison circuit 74, and the input voltage waveform information 94 (when the SW3 is on) are added, the mix circuit 81C mixes and filters the information and outputs ON voltage information 92 and a comparison is made between the ON voltage information and a sawtooth wave from a sawtooth wave generation circuit 83 in a PWM comparator 82 and pulse width modulation is performed for controlling turning on/off of a switching transistor 39 of an inverter circuit. Particularly in the embodiment, a configuration wherein the input current waveform information 90 is directly input to the mix circuit 81C is adopted.

The PWM comparator 82 is a pulse width modulation circuit for superposing the ON voltage information 92 and a sawtooth wave of a predetermined carrier on each other to generate a drive signal of the switching transistor 39. However, this portion may be configured as a conversion section for converting the ON voltage information 92 into a drive signal of the switching transistor of the inverter circuit so that the on time is shortened in the portion where the input current from an AC power supply 20 is large and the on time is prolonged in the portion where the input current is small; the configuration is not limited. Particularly, in the invention, the conversion section converts the input current waveform information 90 and the input voltage waveform information 94 output until oscillation of the magnetron 50 is detected into the drive signal of the switching transistor 39 of the inverter circuit.

For the on/off control of the switching transistor 39 relative to the input current waveform information, conversion is executed at the polarity for shortening the on time when the input current is large and prolonging the on time when the input current is small. Therefore, to provide such a waveform, the input current waveform information is subjected to inversion processing in the mix circuit 81C (described later) for use.

Figure 21:
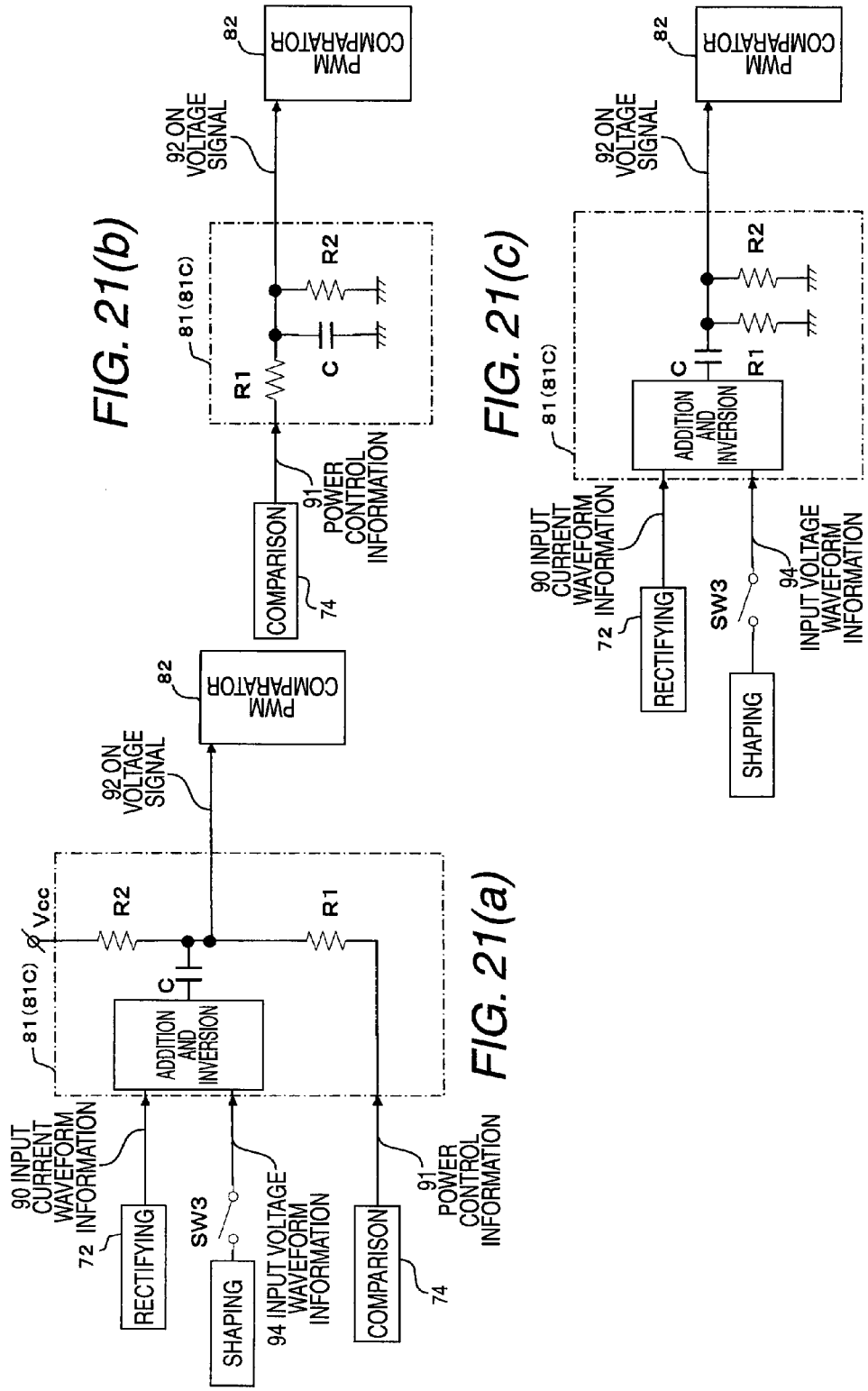
FIG. 21 is a circuit diagram of a mix circuit according to a seventeenth embodiment of the invention.

FIG. 21 (a) shows an example of the mix circuit 81C. The mix circuit 81C has three input terminals. The power control information 91, the input current waveform information 90, and the input voltage waveform information 94 through the SW3 are added to the terminals and are mixed in an internal circuit as shown in the figure.

As shown in FIG. 21 (b), a high-frequency cut filter is formed as shown in an AC equivalent circuit between the power control information 91 and output of the mix circuit 81C. Thus, the filter cuts the high frequency component contained in power control as interference with the input current waveform information 90 to shape the input current waveform.

On the other hand, as shown in FIG. 21 (c), a low-frequency cut filter is formed as shown in an AC equivalent circuit between the input current waveform information 90 and the input voltage waveform information 94 and output of the mix circuit 81C. Therefore, the power control information 91 is converted into a DC component of output of the mix circuit 81C and the input current waveform information 90 and the input voltage waveform information 94 are converted into an AC component.

The fourteenth embodiment thus converts the input current waveform information 90 or a signal provided by adding the input voltage waveform information 94 to the input current waveform information 90 at the non-oscillation time of the magnetron into an on/off drive signal of the switching transistor 39 of the inverter circuit for use. Generally, the inverter used with a microwave oven, etc., is known; a commercial AC power supply of 50 to 60 cycles is rectified to DC, the provided DC power supply is converted into a high frequency of about 20 to 50 kHz, for example, by the inverter, the provided high frequency is raised with a step-up transformer, and high voltage further rectified by a voltage multiplying rectifier is applied to a magnetron.

In the fourteenth embodiment, when the magnetron normally oscillates, namely, in a situation at the normal running time, waveforms similar to those in FIG. 5 in the first embodiment are obtained. At this time, the oscillation detection circuit 63 determines that the magnetron is under the normal running from the current value obtained from the rectifying circuit 72, and turns off the SW3. Therefore, at the running time, a diode 61 and the shaping circuit 62 do not act and the input voltage waveform information 94 is not generated.

On the other hand, at the starting time of the magnetron (corresponding to the non-oscillation time), the impedance between the anode and the cathode of the magnetron becomes equal to infinity unlike that at the stationary running time. Since such a difference between the stationary running time and the starting time affects the state of input current through a transformer 41, the oscillation detection circuit 63 can determine whether or not the magnetron is at the starting time from the current value obtained from the rectifying circuit 72. If the oscillation detection circuit 63 determines that the magnetron is at the starting time, it turns on the SW3. Therefore, at the starting time, the diode 61 and the shaping circuit 62 act and the input voltage waveform information 94 is generated.

In the embodiment, at the starting time at which the input current waveform information 90 is small, the input voltage waveform information 94 is input to the mix circuit 81 through the changeover switch SW3. That is, the input voltage makes up for a shortage of the input current as a reference signal particularly at the starting time.

Also in the embodiment, the operation when the input voltage waveform information is added and that when the input voltage waveform information is not added show similar characteristics to those in FIG. 13 in the seventh embodiment.

In this case, the oscillation detection circuit includes a configuration using the characteristic that when the magnetron starts to oscillate, the input current increases, for example, for comparing output of an input current detection section with an oscillation detection threshold level by a comparator, etc., and latching the output of the comparator, or the like. The detection value is added to the SW3.

Figure 22:
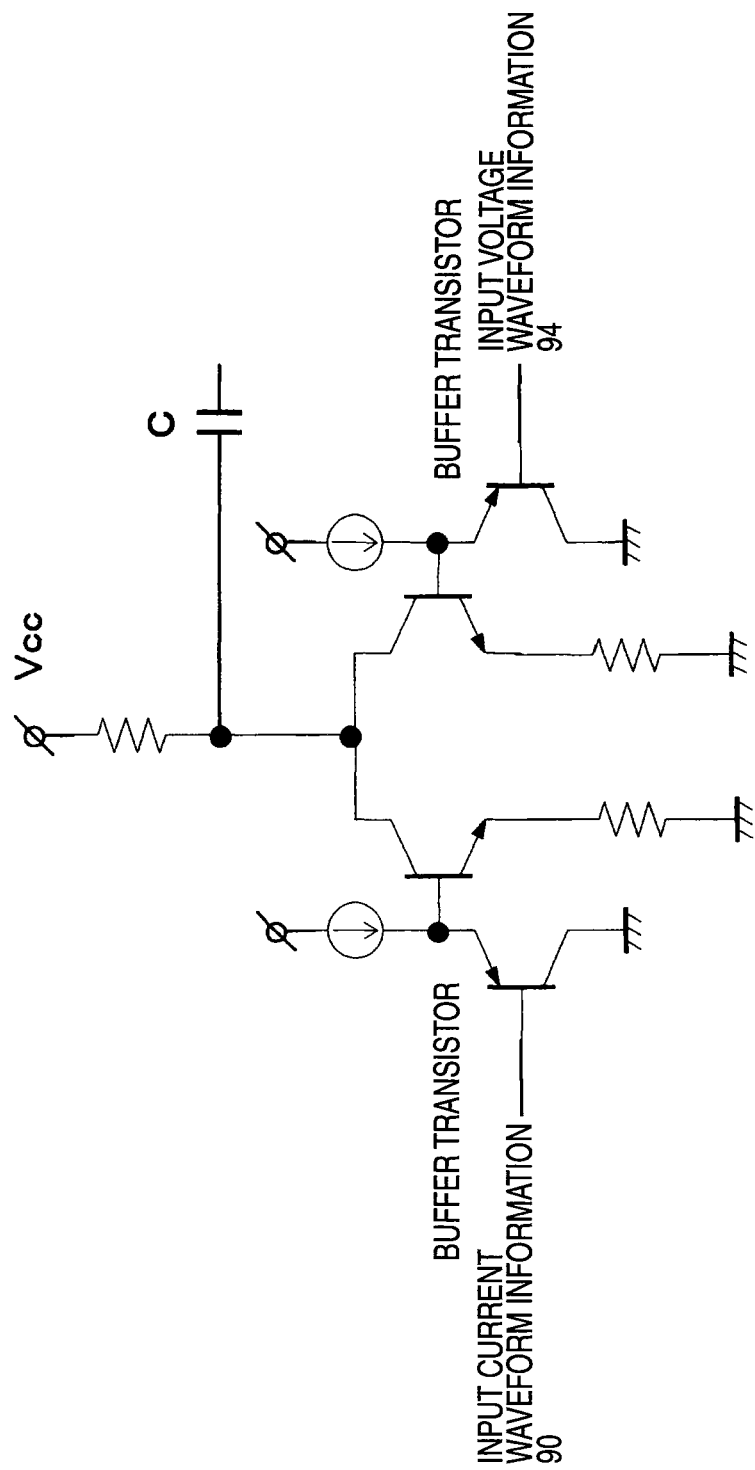
FIG. 22 is a diagram to show one example of an addition circuit shown in FIG. 21.
Figure 23B:
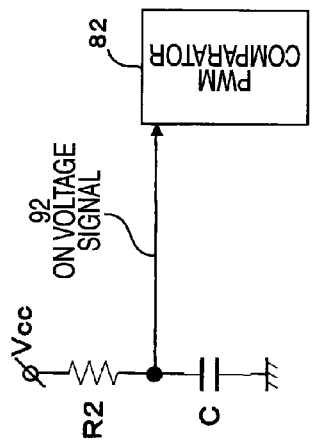
FIG. 23 is a circuit diagram of a mix circuit according to an eighteenth seventeenth embodiment of the invention.
Figure 23C:
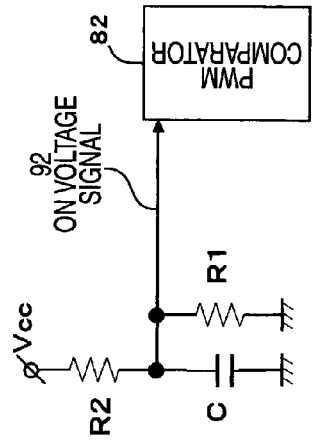
Figure 23A:
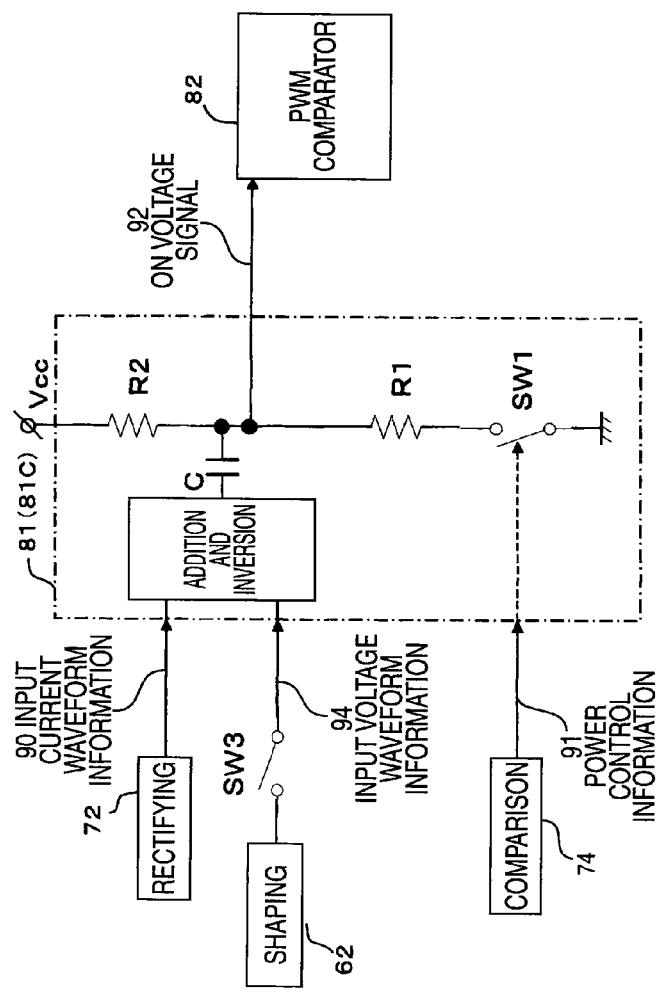
Figure 24:
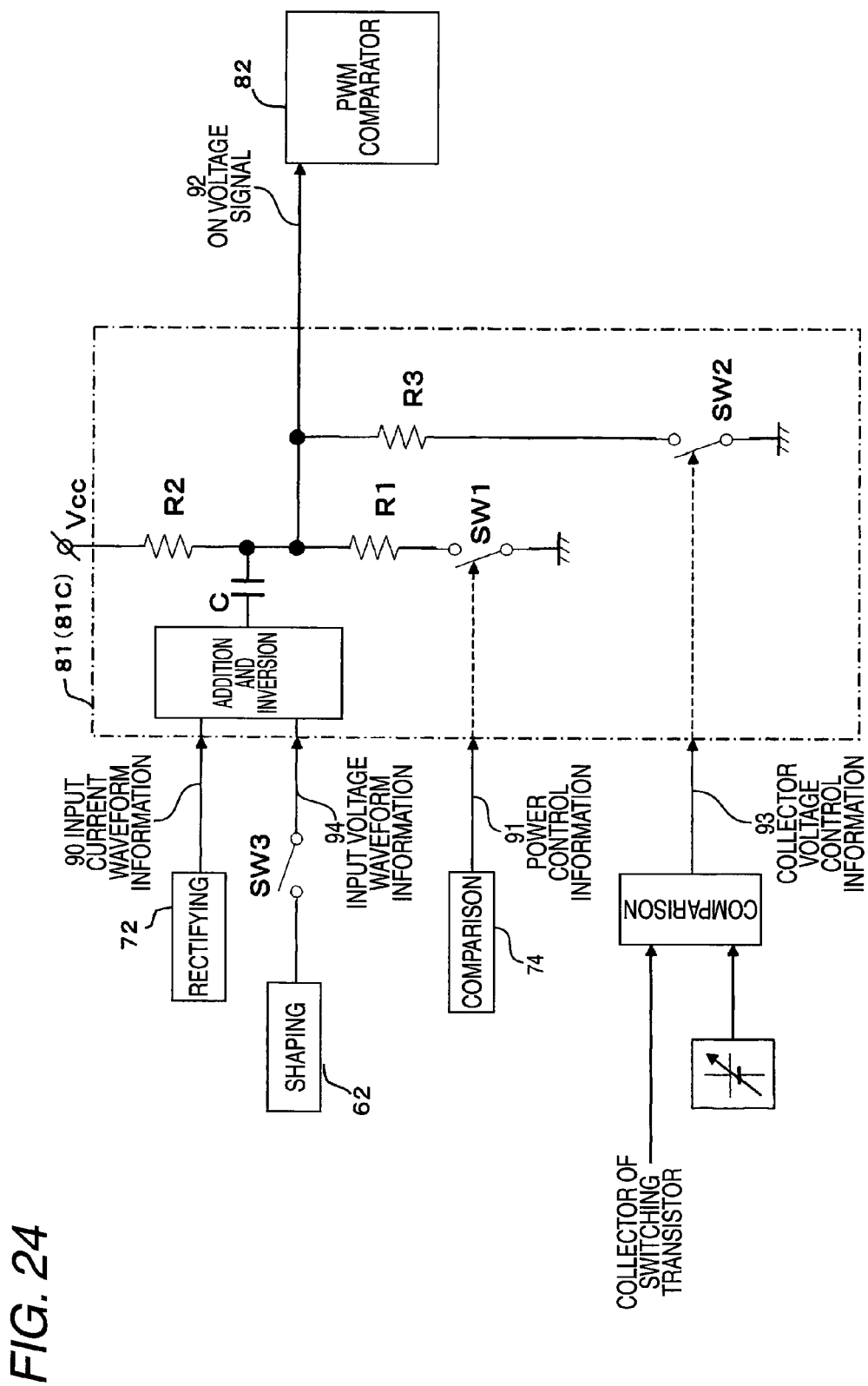
FIG. 24 is a diagram of the configuration of a mix circuit according to a nineteenth embodiment of the invention.

FIG. 22 is a drawing to show one example of an addition and inversion circuit for adding the input current waveform information or the input voltage waveform information. The addition and inversion circuit is provided in the mix circuit 81 as shown in FIGS. 21, 23, and 24.

The input current waveform information 90 and the input voltage waveform information 94 are input to buffer transistors and outputs from the buffer transistors are input to two transistors with a common collector resistor. The buffer transistors are provided for preventing interference between the input current waveform information 90 and the input voltage waveform information 94. A current (emitter current) responsive to the magnitude of an input signal flows into an emitter resistor of each of the two transistors and voltage drop occurs in the common collector resistor in response to the value resulting from adding the emitter currents.

If the emitter voltage becomes high, the current becomes large and the voltage drop becomes large, namely, the collector voltage lowers and thus the polarity of the collector voltage is inverted relative to the input signal. The conversion coefficient of the signal also changes with the resistance value ratio between the collector resistor and the emitter resistor.

From the viewpoint of interference with the power control signal, it is more effective to execute impedance conversion of the signal at the common collector connection point through buffer and connect it to the following capacitor. Thus, the circuit adds the two signals and inverts the result for output.

Fifteenth Embodiment

A fifteenth embodiment of the invention relates the configuration of a control circuit (conversion section) for mixing and filtering input current waveform information and a signal to which input voltage waveform information is further added at the non-oscillation time of a magnetron and power control information from a comparison circuit 47 and converts the result into an on/off drive signal of a switching transistor 39 of an inverter circuit for use.

In the fifteenth embodiment, the gain variable amplifier 291, the inversion and waveform processing circuit 263, the waveform error detection circuit 292, and the like in FIG. 32 are omitted as shown in FIG. 1, so that drastic reduction is realized and simplification and miniaturization can be accomplished. Further, input voltage waveform information 94 is added to input current waveform information 90 and heater power at the starting time is increased for shortening the starting time according to the simple configuration and a safety measure for preventing excessive voltage application to a magnetron anode 52 is also added, so that the reliability of the products improves.

As the circuitry is thus configured, a control loop using the input current waveform information 90 is specialized for waveform shaping of input current, a control loop using power control information 91 is specialized for power control, the mutual controls do not interfere with each other, and the conversion efficiency is held.

Sixteenth Embodiment

A sixteenth embodiment of the invention relates to an input current detection section. As shown in FIG. 19, it detects the input current to the inverter circuit with a CT 71, etc., and rectifies and outputs by a rectifying circuit 72. In this configuration, since the input current is detected using the CT, etc., a large signal can be taken out while the insulating property is held, so that the effect of input current waveform shaping is large and the quality of the input current improves.

In an example shown in FIG. 20, the input current detection section detects the unidirectional current after rectified by a rectifying circuit 31 of an inverter circuit through a shunt resistor 86 placed between the rectifying circuit 31 and a smoothing circuit 30, and amplifies the voltage occurring across the shunt resistor by an amplification circuit (amplifier) 85, and outputs the voltage. This configuration has the advantage that the input current detection section can be configured at a low cost because the detection section need not be insulated from electronic circuitry and rectification need not be performed either.

Seventeenth Embodiment

A seventeenth embodiment of the invention relates to a mix circuit 81C, which is provided with three terminals for inputting input current waveform information 90, input voltage waveform information 94, and power control information 91, as shown in FIG. 21 (*a*). According to the configuration, heater input power is compensated for and the starting time can be shortened.

The input current waveform information 90 and the input voltage waveform information 94 (when SW3 is on) are input to an addition and inversion circuit as shown in FIG. 22 and are subjected to addition and inversion processing. The signal provided by performing the processing and the power control information 91 are input to a filter circuit made up of C, R1, and R2 and are filtered and then the result is output to a PWM comparator 82 as ON voltage information 92. The filter circuit cuts the high component of the power control information 91, as shown in an equivalent circuit diagram of FIG. 21 (b). In so doing, the component hindering input current waveform shaping is cut, so that the quality of the input current waveform improves. On the other hand, a low cutting filter is formed for the input current waveform information 90 and the input voltage waveform information 94 to provide waveform integrity, as shown in an equivalent circuit diagram of FIG. 21 (c).

Eighteenth Embodiment

In an eleventh embodiment of the invention, the characteristic of a mix circuit for mixing input current waveform information of an input current detection section, input voltage waveform information of the input current detection section, and power control information for controlling so that output of the input current detection section becomes a predetermined value is controlled by providing a difference between the input current increase control time and the decrease control time. FIG. 23 is a diagram of the configuration of the mix circuit of the eighteenth embodiment.

In a configuration drawing of FIG. 23 (a), SW1 is turned on/off according to power control information 91 for lowering/raising ON voltage information 92. At the input current increase control time, the SW1 is turned off and the ON voltage information is gradually raised according to a time constant of C*R2 for widening the on width of a switching transistor, as shown in an equivalent circuit of FIG. 23 (b).

At the input current decrease control time, the SW1 is turned on and the ON voltage information is rapidly lowered according to a time constant of C*{R1*R2/(R1+R2)} for narrowing the on width of the switching transistor, as shown in an equivalent circuit of FIG. 23 (c). That is, the circuit configuration of a mix circuit 81C is switched between the input current increase control time and the input current decrease control time. Particularly, at the input current increase control time, the time constant is set large and at the input current decrease control time, the time constant is set small.

Such a difference is provided, whereby a control characteristic for making a gentle response at the normal time and a control characteristic for making a rapid response for decreasing the input current to prevent parts destruction, etc., if the input current excessively rises for some reason can be implemented. The stability of a control characteristic for the nonlinear load of a magnetron is also secured.

Nineteenth Embodiment

Figure 28:
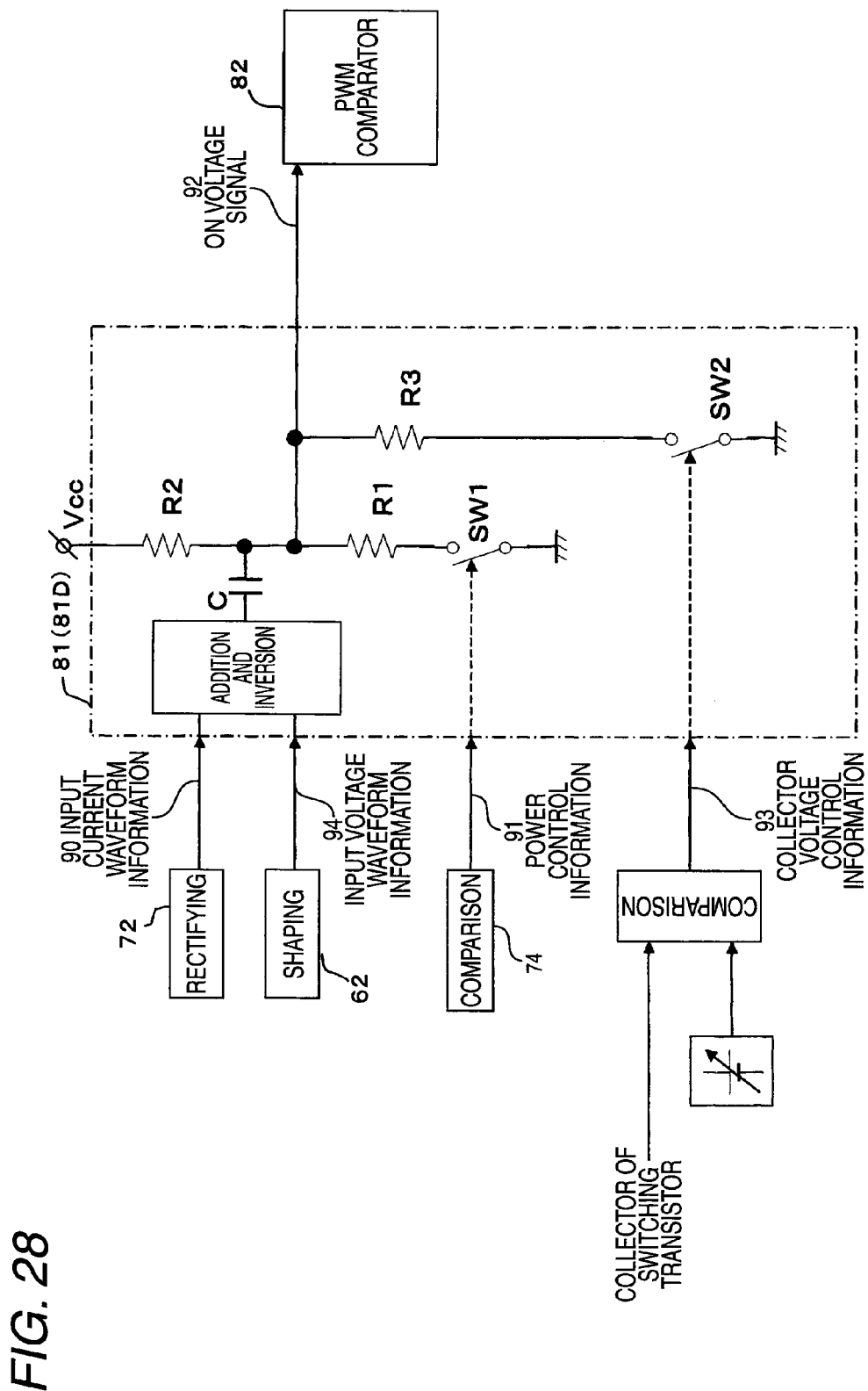
FIG. 28 is a diagram of the configuration of a mix circuit according to a twenty-third embodiment of the invention.

A nineteenth embodiment of the invention inputs collector voltage control information for controlling the collector voltage of the switching transistor 39 to a predetermined value to the mix circuit 81C, as shown in a configuration drawing of the mix circuit relating to the nineteenth embodiment in FIG. 28.

On/off control of SW2 is performed according to collector voltage control information 93 provided by making a comparison between the collector voltage and a reference value, as shown in FIG. 28. If the collector voltage is low, the SW2 is turned off and ON voltage information is gradually raised according to a time constant of C*R2 for widening the on width of the switching transistor. If the collector voltage is high, the SW2 is turned on and the ON voltage information is rapidly lowered according to a time constant of C*{R2*R3/(R2+R3)} for narrowing the on width of the switching transistor. That is, the circuit configuration of the mix circuit 81C is switched in response to the magnitude of the collector voltage of the switching transistor 39. Particularly, if the collector voltage is low, the time constant increases and if the collector voltage is high, the time constant decreases.

Figure 25:
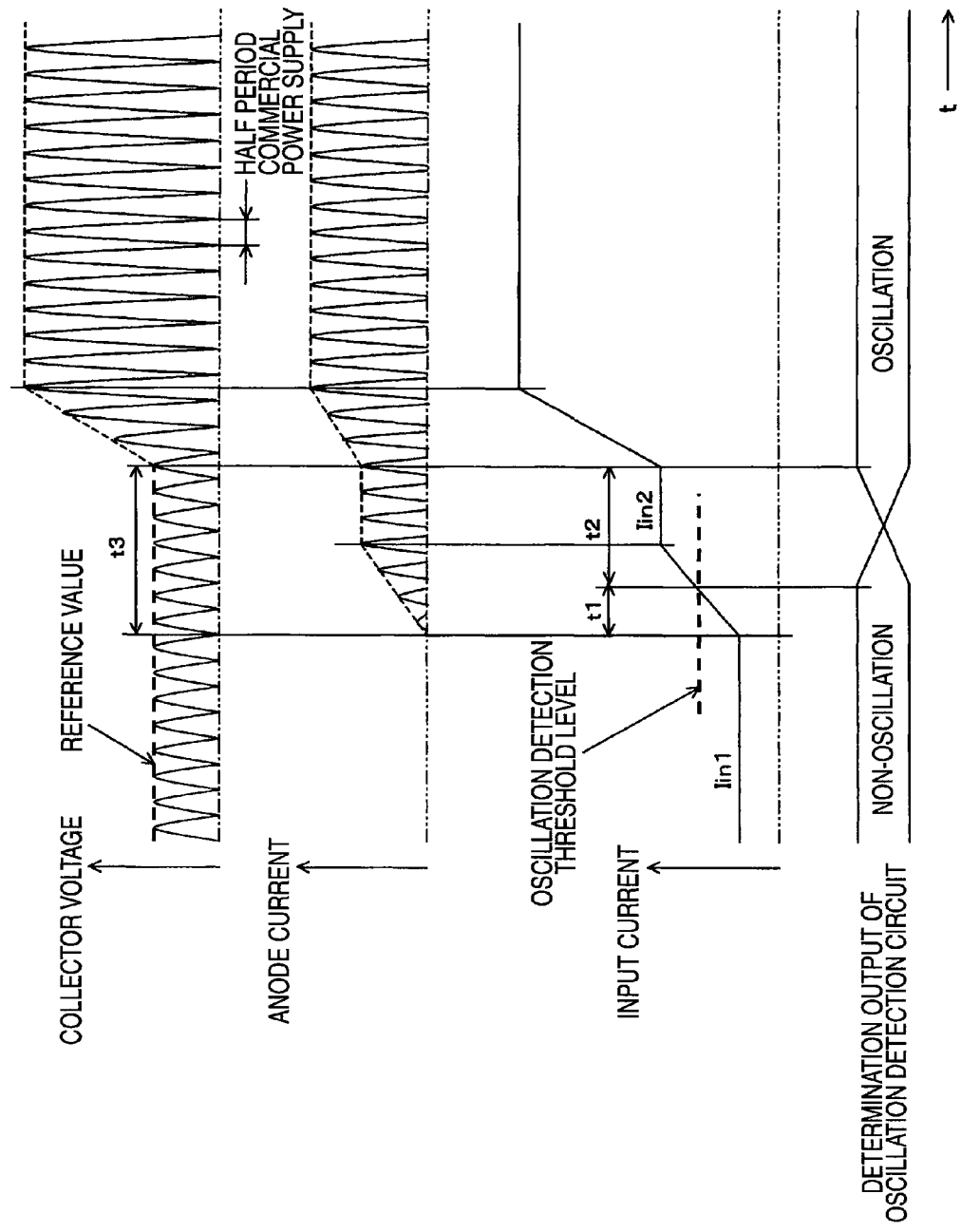
FIG. 25 is a time sequence chart concerning oscillation detection of a magnetron.

FIG. 25 is a time sequence chart concerning oscillation detection of a magnetron; it shows change in anode current and collector voltage accompanying change in input current. Before a magnetron 50 starts to oscillate, the secondary side impedance of a transformer 41 is very large. That is, the impedance between the anode and the cathode of the magnetron is infinite. Therefore, almost no power is consumed in the secondary side impedance of the transformer and the collector voltage of the transistor 39 is controlled (limited) to a predetermined value and thus the input current to an oscillation detection circuit 63 is small (Iin1 in FIG. 25).

On the other hand, after the oscillation start of the magnetron 50, the impedance between the anode and the cathode of the magnetron lessens and the secondary side impedance of the transformer also lessens. Therefore, such a heavy load (magnetron) is driven with the collector voltage of the transistor 39 controlled (limited) to the predetermined value, so that the input current to the oscillation detection circuit 63 increases as compared with that before the oscillation start (Iin2 in FIG. 25).

The oscillation detection threshold level of the oscillation detection circuit 63 described above is preset between Iin1 and Iin2 as shown in FIG. 25. That is, the fact that a clear difference occurs in the input current before and after the oscillation start while the collector voltage is maintained at a given level is used as determination material. In the example shown in the figure, the time required for the input current to the oscillation detection circuit 63 to arrive at the threshold level after the input current starts to increase with an increase in the anode current is t1 and the time required for the oscillation detection circuit 63 to then determine the oscillation start is t2. At this time, for time t3=t1+t2, the collector voltage control functions until the circuit determines the oscillation start although oscillation starts.

This control is effective for excessive voltage application prevention to the magnetron when the magnetron does not oscillate, namely, when the above-described power control does not function. After the oscillation start of the magnetron, to invalidate the control so as not to affect power control, preferably the reference value to be compared with the collector voltage is set large as compared with that before the oscillation start of the magnetron.

Twelfth Embodiment

A high-frequency heating unit according to a twelfth embodiment of the invention has a similar general configuration to that of the seventh embodiment shown in FIG. 8. In the twelfth embodiment, an input current waveform information detection system is simplified in such a manner that a mix circuit 81 (81D) mixes and filters input current waveform information 90, input voltage waveform information 94, and power control information 91 from a comparison circuit 74, and outputs ON voltage information 92 and a comparison is made between the ON voltage information and a sawtooth wave from a sawtooth wave generation circuit 83 in a PWM comparator 82 and pulse width modulation is performed for controlling turning on/off of a switching transistor 39 of an inverter circuit. Particularly in the embodiment, a configuration wherein the input current waveform information 90 is directly input to the mix circuit 81D is adopted.

FIG. 26 (a) shows an example of the mix circuit 81D. The mix circuit 81D has three input terminals. The power control information 91, the input current waveform information 90, and the input voltage waveform information 94 are added to the terminals and are mixed in an internal circuit as shown in the figure.

As shown in FIG. 26 (b), a high-frequency cut filter is formed as shown in an AC equivalent circuit between the power control information 91 and output of the mix circuit 81D. Thus, the filter cuts the high frequency component contained in power control as interference with the input current waveform information to shape the input current waveform.

On the other hand, as shown in FIG. 26 (c), a low-frequency cut filter is formed as shown in an AC equivalent circuit between the input current waveform information 90 and the input voltage waveform information 94 and output of the mix circuit 81D. Therefore, the power control information 91 is converted into a DC component of output of the mix circuit 81D and the input current waveform information 90 and the input voltage waveform information 94 are converted into an AC component.

The twelfth embodiment thus converts the input current waveform information 90 and the input voltage waveform information 94 into an on/off drive signal of the switching transistor 39 of the inverter circuit for use. Generally, a PWM inverter used with a microwave oven, etc., is known; a commercial AC power supply of 50 to 60 cycles is rectified to DC, the provided DC power supply is converted into a high frequency of about 20 to 50 kHz, for example, by the inverter, the provided high frequency is raised with a step-up transformer, and high voltage further rectified by a voltage multiplying rectifier is applied to a magnetron.

In the embodiment, when the magnetron normally oscillates, namely, in a situation at the normal running time, waveform information similar to that shown in FIG. 12 in the seventh embodiment is obtained. In the twelfth embodiment, both the input current waveform information and the input voltage waveform information are converted into an on/off drive signal of the switching transistor 39 for use.

In a power control unit of the embodiment, an input current detection section provides the input current waveform information (see (a1)) indicated by the dashed line reflecting the fluctuation state of the input current in FIG. 12 and the later control is performed based on the input current waveform information (the input current fluctuation is independent of the input voltage waveform information and therefore the description of the input voltage waveform information is skipped). The control is performed so that the instantaneous fluctuation of the input current waveform information occurring in the period like a half period, for example, is suppressed so as to approach the ideal signal as indicated by the arrow. The suppression is accomplished by adjusting the drive signal of the switching transistor 39. Specifically, if the input current waveform information is smaller than the ideal signal, the above-described on time is made longer and the pulse width is made wider. If the input current waveform information is larger than the ideal signal, the above-described on time is made shorter and the pulse width is made narrower. Also in the instantaneous fluctuation in a further shorter time period, the fluctuating waveform is reflected on the on time information and a correction is made in a similar manner to that described above.

In the invention, the input current waveform information (and addition with the input voltage waveform information) having the information so as to suppress distortion and the instantaneous fluctuation of the input current waveform is converted into the drive signal of the switching transistor of the inverter circuit. To accomplish the object, the power control information 91 is not particularly indispensable, because the power control information 91 is information to control power fluctuation in a long time period, namely, in a period longer than the commercial power supply period or so and is not information to correct the instantaneous fluctuation in a short period like a half period of AC intended by the invention. Therefore, adoption of the mix circuit 81D and the PWM comparator 82 is also only one example of the embodiment and components corresponding to the addition section at least for adding the input current waveform information and the input voltage waveform information as the mix circuit 81D and the conversion section for converting the information into the drive signal of the switching transistor as the PWM comparator 82 may exist between the input current detection section and the switching transistor.

By the way, if the input current is comparatively small as in FIG. 12 (b), the value of the input current waveform information also becomes small and thus the waveform shaping capability of the input current is degraded. Again, attention is focused on the input voltage waveform information. It is considered that the input voltage is substantially constant if the input current is lessened. Therefore, it can be expected that input voltage waveform information of a given size can be acquired at all times regardless of the magnitude of the input current (comparison between FIG. 12 (a1) and FIG. 12 (b1)).

In the invention, not only the input current waveform information, but also the input voltage waveform information is input to the mix circuit 81D. Therefore, if the input current is comparatively small, while the input voltage waveform information performs rough input current waveform shaping (long-period fluctuation correction), the input current waveform information performs fine input current waveform shaping (short-period fluctuation correction like a half period) and degradation of the input current waveform shaping capability is suppressed. That is, actual input current fluctuation is kept track of with reference to input voltage fluctuation and a phase shift of the input current relative to the input voltage decreases. Therefore, if the input current is small, drastic lowering of the power factor can also be prevented. For the operation when the input voltage waveform information is added and that when the input voltage waveform information is not added, those similar to those in FIG. 13 are obtained.

Twenty-First Embodiment

A fourth embodiment of the invention relates to a mix circuit 81D, which is provided with three terminals for inputting input current waveform information 90, input voltage waveform information 94, and power control information 91, as shown in FIG. 26 (a). The input current waveform information 90 and the input voltage waveform information 94 are input to an addition and inversion circuit as shown in FIG. 2 and are subjected to addition and inversion processing. The signal provided by performing the processing and the power control information 91 are input to a filter circuit made up of C, R1, and R2 and are filtered and then the result is output to a PWM comparator 82 as ON voltage information 92. The filter circuit cuts the high component of the power control information 91, as shown in an equivalent circuit diagram of FIG. 26 (*b*). In so doing, the component hindering input current waveform shaping is cut, so that the quality of the input current waveform improves. On the other hand, a low cutting filter is formed for the input current waveform information 90 and the input voltage waveform information 94 to provide waveform integrity, as shown in an equivalent circuit diagram of FIG. 26 (*c*).

Twenty-Second Embodiment

Figure 27B:
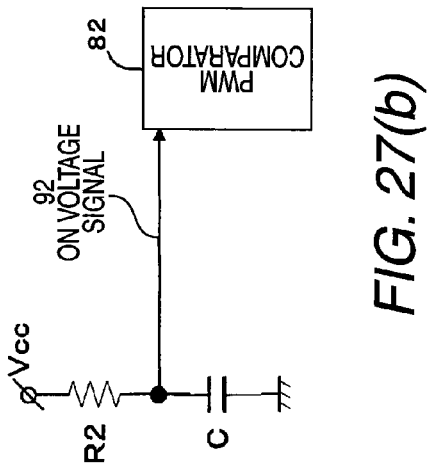
FIG. 27 is a diagram of the configuration of a mix circuit according to a twenty-second embodiment of the invention.
Figure 27C:
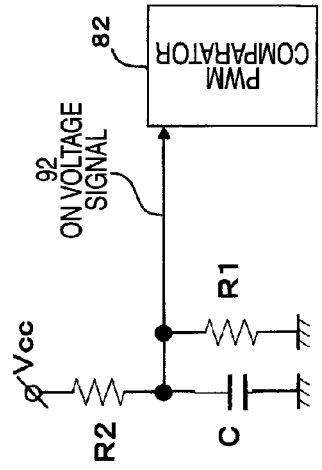
Figure 27A:
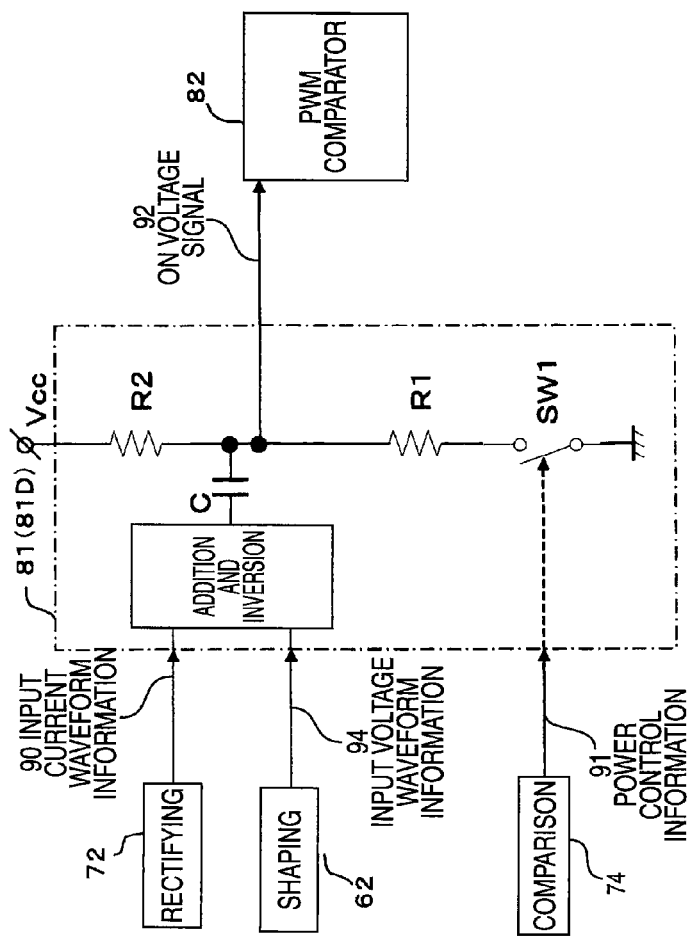

In a twenty-second embodiment of the invention, the characteristic of a mix circuit 81D for mixing input current waveform information 90 of an input current detection section, input voltage waveform information 94 of the input current detection section, and power control information 91 for controlling so that output of the input current detection section becomes a predetermined value is controlled by providing a difference between the input current increase control time and the decrease control time. FIG. 27 is a diagram of the configuration of the mix circuit of the twenty-second embodiment.

In a configuration drawing of FIG. 27 (*a*), SW1 is turned on/off according to the power control information 91 for lowering/raising ON voltage information 92. At the input current increase control time, the SW1 is turned off and the ON voltage information is gradually raised according to a time constant of C*R2 for widening the on width of a switching transistor, as shown in an equivalent circuit of FIG. 27 (*b*).

At the input current decrease control time, the SW1 is turned on and the ON voltage information is rapidly lowered according to a time constant of C*{R1*R2/(R1+R2)} for narrowing the on width of the switching transistor, as shown in an equivalent circuit of FIG. 27 (*c*). That is, the circuit configuration of the mix circuit 81D is switched between the input current increase control time and the input current decrease control time. Particularly, at the input current increase control time, the time constant is set large and at the input current decrease control time, the time constant is set small.

Such a difference is provided, whereby a control characteristic for making a gentle response at the normal time and a control characteristic for making a rapid response for decreasing the input current to prevent parts destruction, etc., if the input current excessively rises for some reason can be implemented. The stability of a control characteristic for the nonlinear load of a magnetron is also secured.

Twenty-Third Embodiment

A twenty-third embodiment of the invention inputs collector voltage control information for controlling the collector voltage of the switching transistor 39 to a predetermined value to the mix circuit 81D, as shown in a configuration drawing of the mix circuit relating to the twenty-third embodiment in FIG. 28.

On/off control of SW2 is performed according to collector voltage control information 93 provided by making a comparison between the collector voltage and a reference value, as shown in FIG. 28. If the collector voltage is low, the SW2 is turned off and ON voltage information is gradually raised according to a time constant of C*R2 for widening the on width of the switching transistor. If the collector voltage is high, the SW2 is turned on and the ON voltage information is rapidly lowered according to a time constant of C*{R2*R3/(R2+R3)} for narrowing the on width of the switching transistor. That is, the circuit configuration of the mix circuit 81D is switched in response to the magnitude of the collector voltage of the switching transistor 39. Particularly, if the collector voltage is low, the time constant increases and if the collector voltage is high, the time constant decreases.

This control is effective for excessive voltage application prevention to a magnetron when the magnetron does not oscillate, namely, when the above-described power control does not function. After oscillation start of the magnetron, to invalidate the control so as not to affect power control, preferably the reference value to be compared with the collector voltage is set large as compared with that before the magnetron oscillation start.

Twenty-Fourth Embodiment

Figure 29:
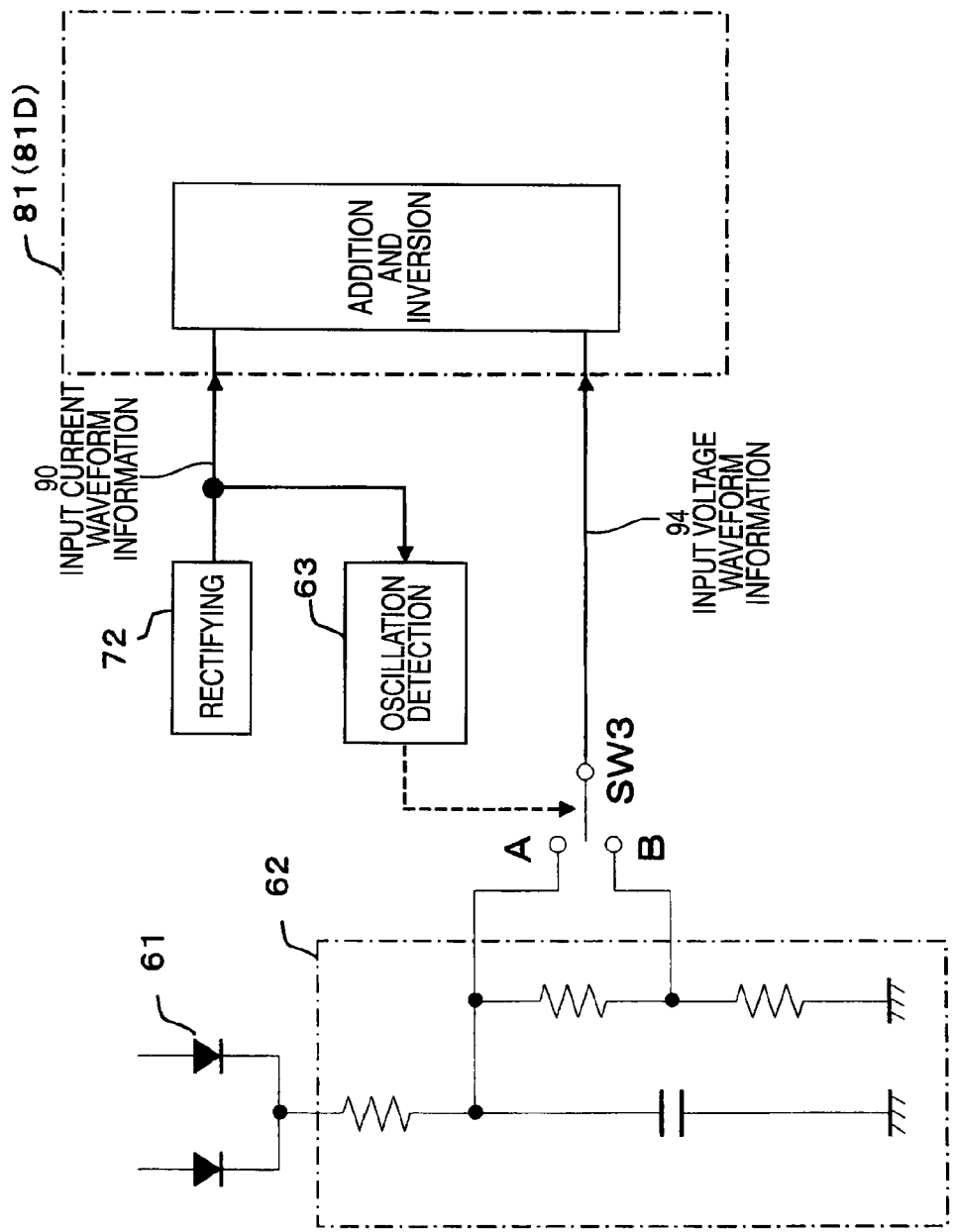
FIG. 29 is a drawing to show a switching circuit of input voltage waveform information according to a twenty-fourth embodiment of the invention.
Figure 30:
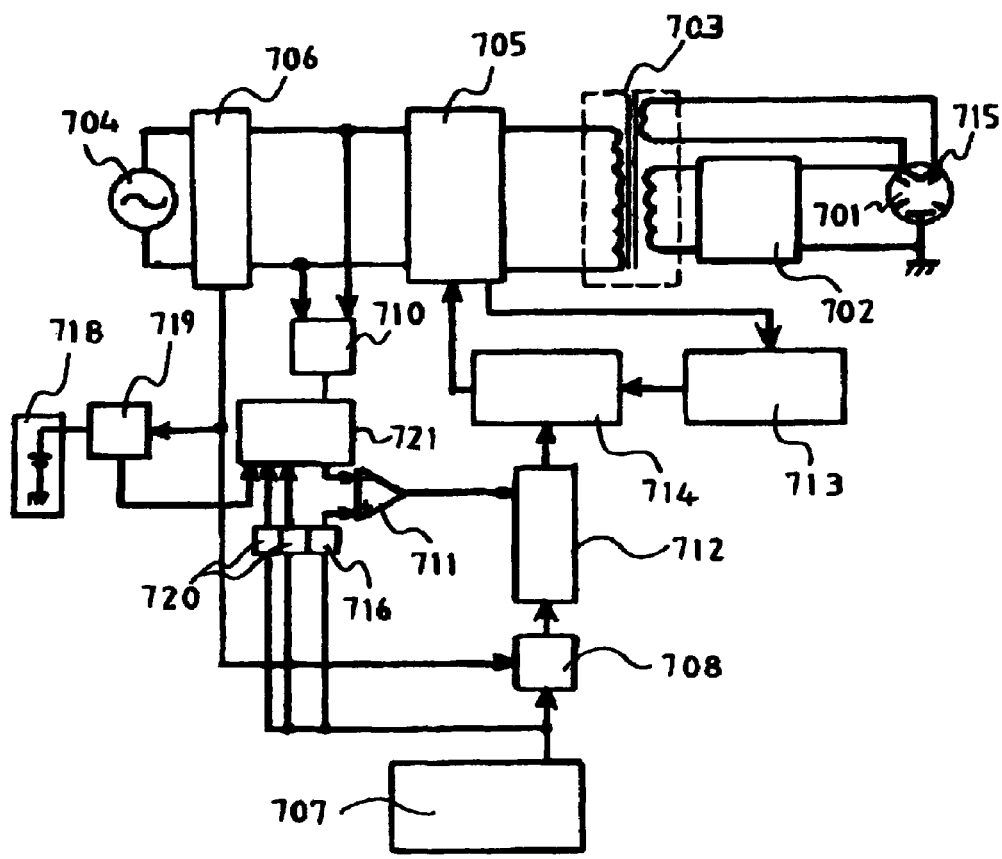
FIG. 30 is a diagram of the configuration of a high-frequency heating unit in a related art.
Figure 31A:
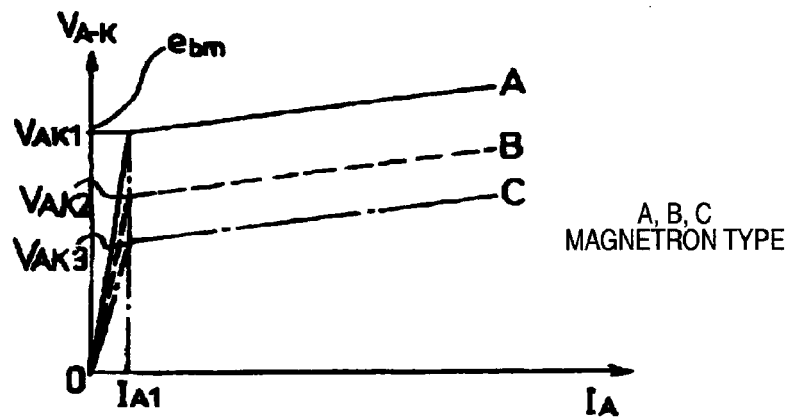
FIG. 31 is anode cathode application voltage-anode current characteristic drawings of the high-frequency heating unit shown in FIG. 30.
Figure 31B:
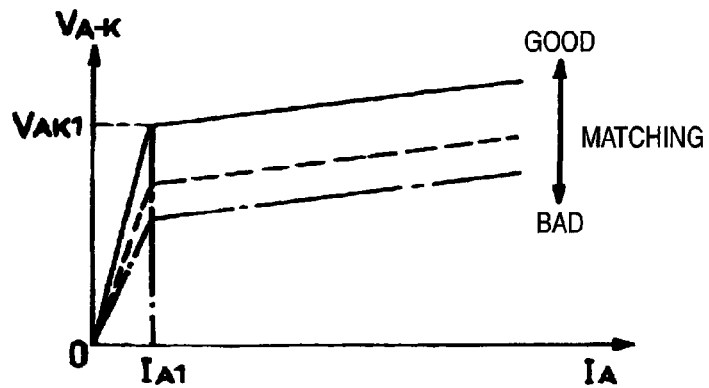
Figure 31C:
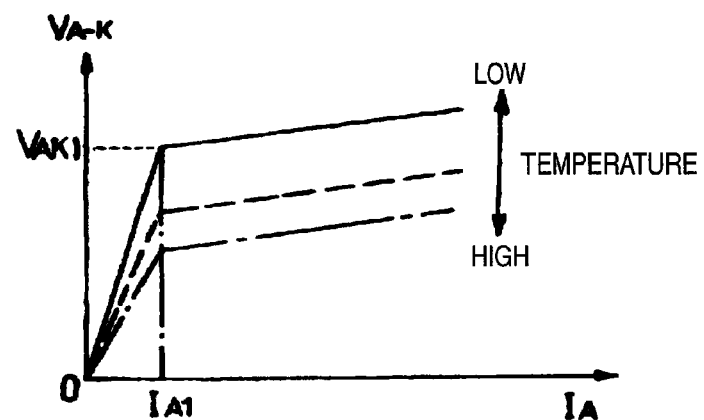

A twenty-fourth embodiment of the invention shown in FIG. 29 adopts a configuration for switching the addition amount of input voltage waveform information to input current waveform information before and after oscillation of a magnetron. In the twenty-fourth embodiment, a changeover switch SW3 is provided between the shaping circuit 62 and the mix circuit 81C in FIG. 8 (in the embodiment, 81D) and an oscillation detection circuit 63 for detecting oscillation start of the magnetron from output of a rectifying circuit 72 is also provided. The connection point of the changeover switch SW3 with the shaping circuit 62 is switched between A and B according to the output of the oscillation detection circuit 63. The shaping circuit 62 is provided with three voltage dividing resistors connected in series between a diode and ground for dividing and outputting power supply voltage information from commercial power supply voltage. The power supply voltage information at the connection point A nearer to a commercial power supply 20 is large because the attenuation amount from the commercial power supply voltage is small as compared with the connection point B near to the ground. A capacitor provided in the shaping circuit 62 suppresses entry of noise into the power supply voltage information from the commercial power supply.

At the starting time of the magnetron (corresponding to the non-oscillation time), the impedance between the anode and the cathode of the magnetron becomes equal to infinity unlike that at the stationary running time. Since such a difference between the stationary running time and the starting time affects the state of input current through a transformer 41, the oscillation detection circuit 63 can determine whether or not the magnetron is at the starting time from the current value obtained from the rectifying circuit 72.

When the magnetron being started is detected from the output of the oscillation detection circuit 63, the SW3 is switched to the position of the connection point A. In this case, a larger signal (input voltage waveform information) is input to the mix circuit 81D and the starting time is shortened as compared with switching to the position of the connection point B as described above.

When the oscillation start is detected by the oscillation detection circuit 63, the SW3 is switched to the position of the connection point B and the signal is attenuated and thus input current waveform shaping when the input current is large is not hindered and the power factor when the input current is small is improved.

The oscillation detection circuit includes a configuration using the characteristic that when the magnetron starts to oscillate, the input current increases, for example, for comparing output of an input current detection section with an oscillation detection threshold level by a comparator, etc., and latching the output of the comparator, or the like.

This application is based on Japanese Patent Application Nos. 2005-340555, 2005-340556, 2005-340557, and 2005-340558 filed on Nov. 25, 2005, which are incorporated herein by reference.

While the embodiments of the invention have been described, it is to be understood that the invention is not limited to the items disclosed in the embodiments and the invention also intends that those skilled in the art make changes, modifications, and application based on the Description and widely known arts, and the changes, the modifications, and the application are also contained in the scope to be protected.

INDUSTRIAL APPLICABILITY

According to the power control for high-frequency dielectric heating in the invention, a control loop is formed for correcting input current by inverting so that the portion where the input current is large becomes small and the portion where the input current is small becomes large. Therefore, if there are variations in the types and the characteristics of magnetrons, anode-cathode voltage fluctuation, power supply voltage fluctuation, etc., input current waveform shaping not affected by them can be obtained according to a simpler configuration and stable output of the magnetron is accomplished according to a simple configuration.

The invention claimed is:

1. A power control unit for high-frequency dielectric heating for controlling an inverter circuit for rectifying voltage of an AC power supply, modulating an on time of high frequency switching of a switching transistor, and converting into high frequency power, said power control unit for high-frequency dielectric heating comprising:
    an input current detection section for detecting an input current from the AC power supply to the inverter circuit and outputting input current waveform information;
    a conversion section for converting the input current waveform information into a drive signal of the switching transistor of the inverter circuit so that instantaneous fluctuation of the input current waveform information is suppressed; and
    a mix circuit being connected between said input current detection section and said conversion section for inverting the input current waveform information, which is directly input to the mix circuit, and mixing the input current waveform information, as inverted by the mix circuit, and power control information for controlling so that current or voltage at an arbitrary point of the inverter circuit becomes a predetermined value and generating an on voltage signal,
    wherein said conversion section converts the on voltage signal into the drive signal so that the on time is shortened in the portion where the input current is large and that the on time is prolonged in the portion where the input current is small.

2. The power control unit for high-frequency dielectric heating as claimed in claim 1, wherein the mix circuit mixes the input current waveform information and power control information for controlling so that the output of said input current detection section becomes a predetermined value and generates the on voltage signal.

3. The power control unit for high-frequency dielectric heating as claimed in claim 2 further comprising:
    a comparison circuit for making a comparison between the input current and an output setting signal and outputting the power control information.

4. The power control unit for high-frequency dielectric heating as claimed in claim 2, wherein said input current detection section detects and outputs a unidirectional current after the input current of the inverter circuit is rectified.

5. The power control unit for high-frequency dielectric heating as claimed in claim 4, wherein said input current detection section has a shunt resistor for detecting the unidirectional current after the input current of the inverter circuit is rectified and an amplification circuit for amplifying voltage occurring across the shunt resistor,
    inputs output provided by the amplification circuit directly to the mix circuit as the input current waveform information, and
    further comprises a comparison circuit for making a comparison between the output provided by the amplification circuit and an output setting signal and outputting the power control information.

6. The power control unit for high-frequency dielectric heating as claimed in claim 1, wherein the mix circuit has a configuration for cutting a high component of the power control information.

7. The power control unit for high-frequency dielectric heating as claimed in claim 1, wherein the mix circuit is switched between a circuit configuration established for an increase of the input current and another circuit configuration established for a decrease of the input current.

8. The power control unit for high-frequency dielectric heating as claimed in claim 7, wherein the mix circuit has a time constant increased at the increase control time of the input current and decreased at the decrease control time of the input current.

9. The power control unit for high-frequency dielectric heating as claimed in claim 1, wherein collector voltage control information for controlling collector voltage of the switching transistor to a predetermined value is input to the mix circuit and a configuration of the mix circuit is switched in response to a magnitude of the collector voltage.

10. The power control unit for high-frequency dielectric heating as claimed in claim 9, wherein a time constant of the mix circuit increases when the collector voltage is low and decreases when the collector voltage is high.

11. The power control unit for high-frequency dielectric heating as claimed in claim 1, wherein said conversion section is implemented as a pulse width conversion circuit for superposing the on voltage signal and a predetermined carrier on each other to generate the drive signal of the switch transistor.

* * * * *